(12) United States Patent
Schmeski et al.

(10) Patent No.: US 12,551,053 B2
(45) Date of Patent: Feb. 17, 2026

(54) PORTABLE GRILLS HAVING REVERSIBLE STEAM TRAY ASSEMBLIES

(71) Applicant: Weber-Stephen Products LLC, Palatine, IL (US)

(72) Inventors: Kevin James Schmeski, Romeoville, IL (US); Sean Alan Yakes, Schaumberg, IL (US); Derek Edward Schmitz, Chicago, IL (US); Karol Polaczek, Jr., Hickory Hills, IL (US); Paul Richard Hunt, Lake Zurich, IL (US)

( * ) Notice: Subject to any disclaimer, the term of this patent is extended or adjusted under 35 U.S.C. 154(b) by 359 days.

(21) Appl. No.: 18/170,449

(22) Filed: Feb. 16, 2023

(65) Prior Publication Data

US 2023/0363583 A1 Nov. 16, 2023

Related U.S. Application Data

(60) Provisional application No. 63/340,321, filed on May 10, 2022.

(51) Int. Cl.
*A47J 37/06* (2006.01)

(52) U.S. Cl.
CPC ....... *A47J 37/0664* (2013.01); *A47J 37/0629* (2013.01)

(58) Field of Classification Search
CPC .......................... A47J 37/0664; A47J 37/0629
(Continued)

(56) References Cited

U.S. PATENT DOCUMENTS 5,782,165 A * 7/1998 Glenboski ............. A47J 27/004
99/425
5,957,038 A * 9/1999 Shimazaki ............. A47J 36/08
99/413

(Continued)

FOREIGN PATENT DOCUMENTS

EP 1057437 B1 5/2004

OTHER PUBLICATIONS

International Bureau, "International Preliminary Report on Patentability," issued in connection with International Patent Application No. PCT/US2023/062939, mailed Nov. 21, 2024, 8 pages.
(Continued)

*Primary Examiner* — Michael G Hoang
*Assistant Examiner* — Elizabeth Ann Laughlin
(74) *Attorney, Agent, or Firm* — Avantech Law, LLP

(57) ABSTRACT

Example portable grills having reversible steam tray assemblies are disclosed. An example portable grill includes a cookbox, a heating element, a water pan, and a steam tray. The heating element is located within the cookbox. The water pan is located within the cookbox above the heating element. The water pan includes a bottom wall. The steam tray is located within the water pan. The steam tray includes a horizontally-oriented support wall having a plurality of openings extending therethrough. The steam tray is configured to be reversibly positioned within the water pan in a first orientation and a second orientation. The support wall is spaced from the bottom wall by a first distance when the steam tray is positioned in the first orientation. The support wall is spaced from the bottom wall by a second distance greater than the first distance when the steam tray is positioned in the second orientation.

20 Claims, 35 Drawing Sheets

(58) Field of Classification Search
USPC .................................................... 126/52 R
See application file for complete search history.

(56) References Cited

U.S. PATENT DOCUMENTS

| | | | |
|---|---|---|---|
| 6,252,204 B1* | 6/2001 | Po-Hei | A47J 37/0676 99/400 |
| 6,267,047 B1 | 7/2001 | Mosher, II et al. | |
| 6,386,092 B1 | 5/2002 | Grohs | |
| 6,818,868 B2* | 11/2004 | Grohs | A47J 37/0676 99/422 |
| 6,844,529 B2 | 1/2005 | Grohs | |
| 7,007,592 B2 | 3/2006 | Citrynell et al. | |
| 7,270,122 B2 | 9/2007 | Jones | |
| 7,331,278 B2 | 2/2008 | Stokes, Jr. | |
| 7,342,202 B2 | 3/2008 | Bachinski et al. | |
| 8,030,598 B2 | 10/2011 | Bachinski et al. | |
| 8,584,580 B2 | 11/2013 | Barrett | |
| 9,215,949 B1 | 12/2015 | Cloutier et al. | |
| 9,808,107 B2 | 11/2017 | Baker | |
| 10,238,133 B2 | 3/2019 | Kallos | |
| 10,945,558 B2 | 3/2021 | Rheaume | |
| 2003/0217647 A1 | 11/2003 | Jones | |
| 2004/0031785 A1 | 2/2004 | Muftic | |
| 2006/0163242 A1* | 7/2006 | Ciancimino | A47J 37/0694 219/450.1 |
| 2007/0090103 A1* | 4/2007 | France | A47J 27/16 219/400 |
| 2008/0216672 A1* | 9/2008 | Glynn | A47J 37/10 99/450 |
| 2008/0245357 A1 | 10/2008 | Meether et al. | |
| 2012/0111312 A1 | 5/2012 | Kim | |
| 2012/0237647 A1 | 9/2012 | Dobert et al. | |
| 2014/0261012 A1 | 9/2014 | Perez, Jr. et al. | |
| 2015/0000537 A1 | 1/2015 | Blackburn | |
| 2016/0022093 A1 | 1/2016 | Gramola et al. | |
| 2016/0033141 A1 | 2/2016 | Rizzuto | |
| 2016/0106261 A1 | 4/2016 | Cloutier et al. | |
| 2016/0128510 A1 | 5/2016 | Jones | |
| 2017/0089590 A1 | 3/2017 | Bruin-Slot et al. | |
| 2020/0297162 A1 | 9/2020 | Boniotti | |
| 2020/0315389 A1* | 10/2020 | Stewart | A47J 37/0623 |
| 2021/0088222 A1* | 3/2021 | Kitayama | A21B 1/36 |
| 2021/0177201 A1* | 6/2021 | Rheaume | A23B 4/052 |
| 2022/0000312 A1 | 1/2022 | Motzkus et al. | |
| 2025/0024995 A1* | 1/2025 | Upadhyaya | A47J 37/0704 |

OTHER PUBLICATIONS

International Searching Authority, "International Search Report," issued in connection with International Patent Application No. PCT/US2023/062939, mailed on Jun. 8, 2023, 3 pages.

International Searching Authority, "Notification of Transmittal," issued in connection with International Patent Application No. PCT/US2023/062939, mailed on Jun. 8, 2023, 2 pages.

International Searching Authority, "Written Opinion," issued in connection with International Patent Application No. PCT/US2023/062939, mailed on Jun. 8, 2023, 6 pages.

IP Australia, "Examination Report No. 1," issued in connection with Australian Patent Application No. 2023269111, dated Oct. 7, 2025, 3 pages.

IP Australia, "Notice of Acceptance," issued in connection with Australian Patent Application No. 2023269111, dated Nov. 27, 2025, 3 pages.

* cited by examiner

SECTION B-B

SECTION C-C

SECTION A-A

SECTION D-D

SECTION E-E

SECTION A-A

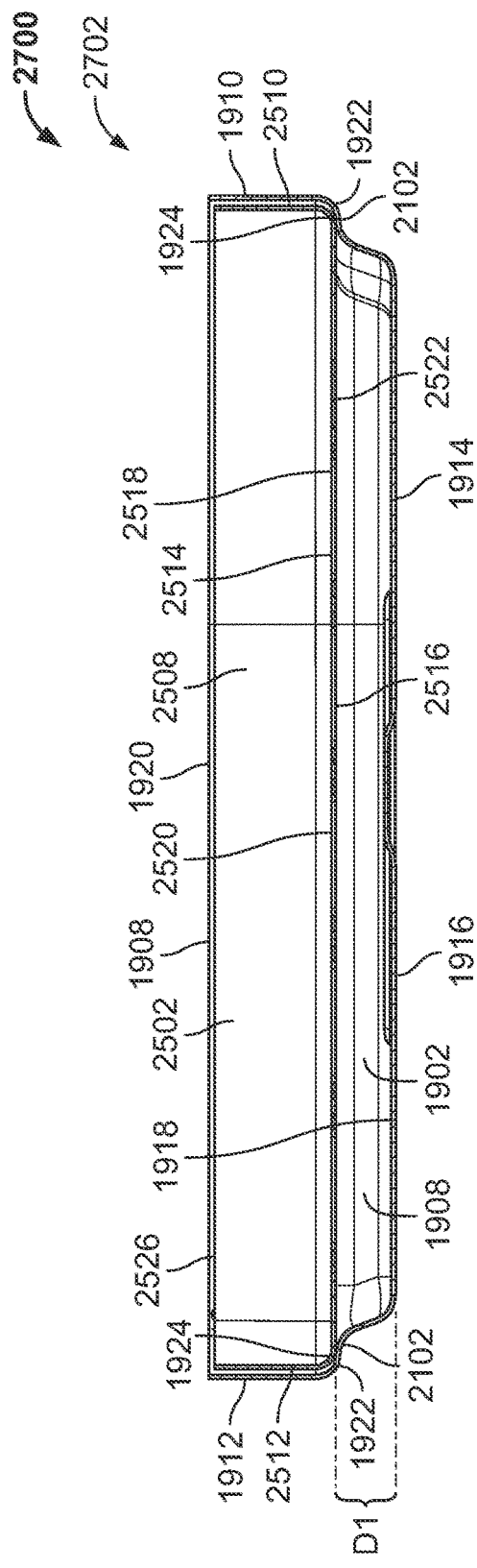
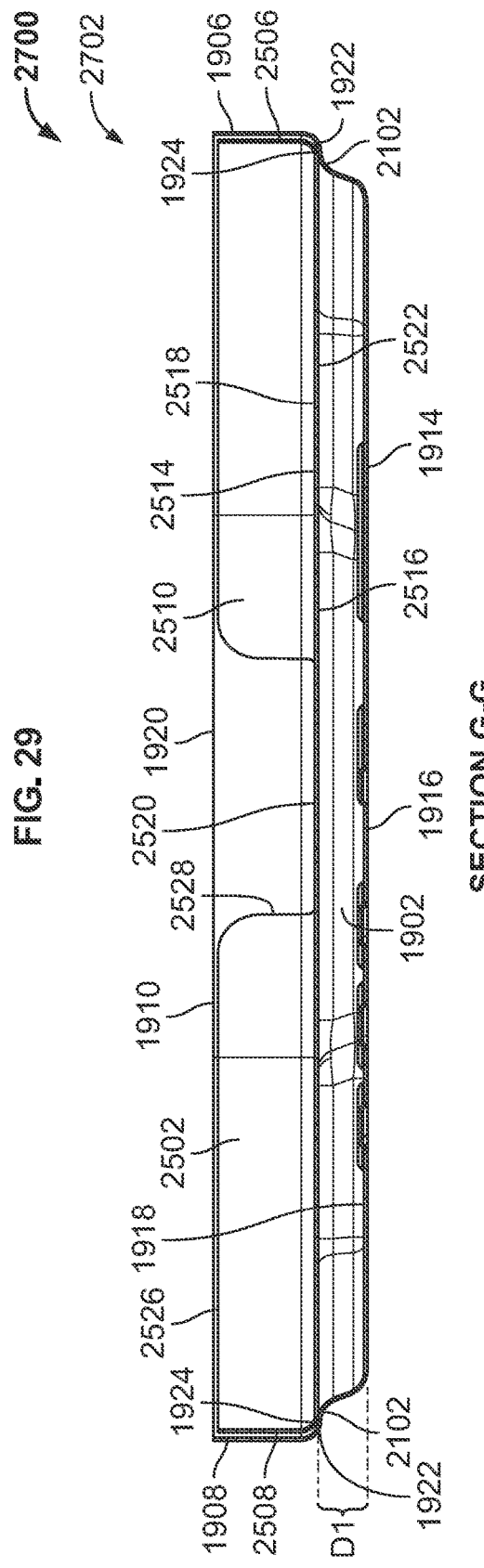

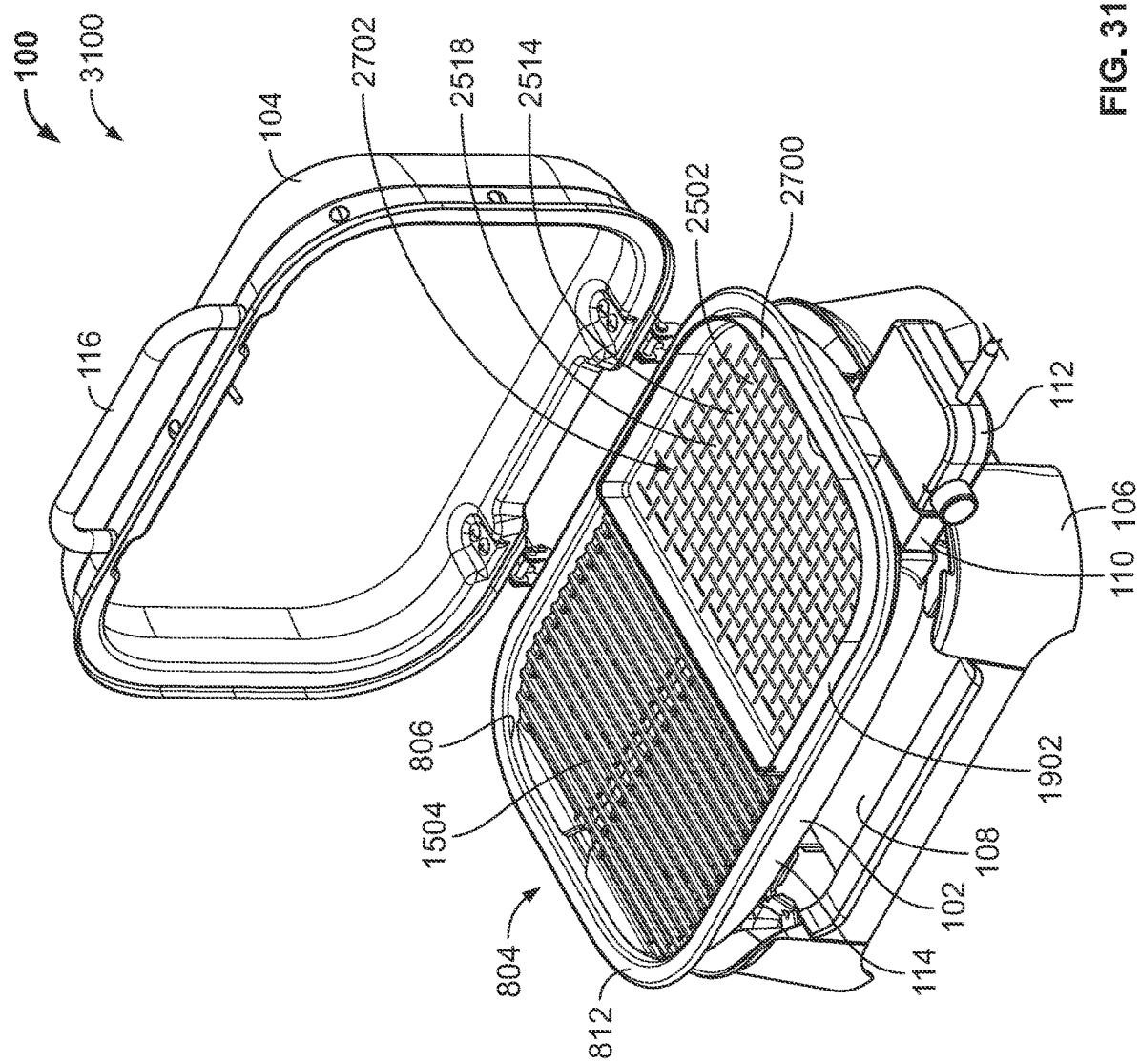

SECTION A-A

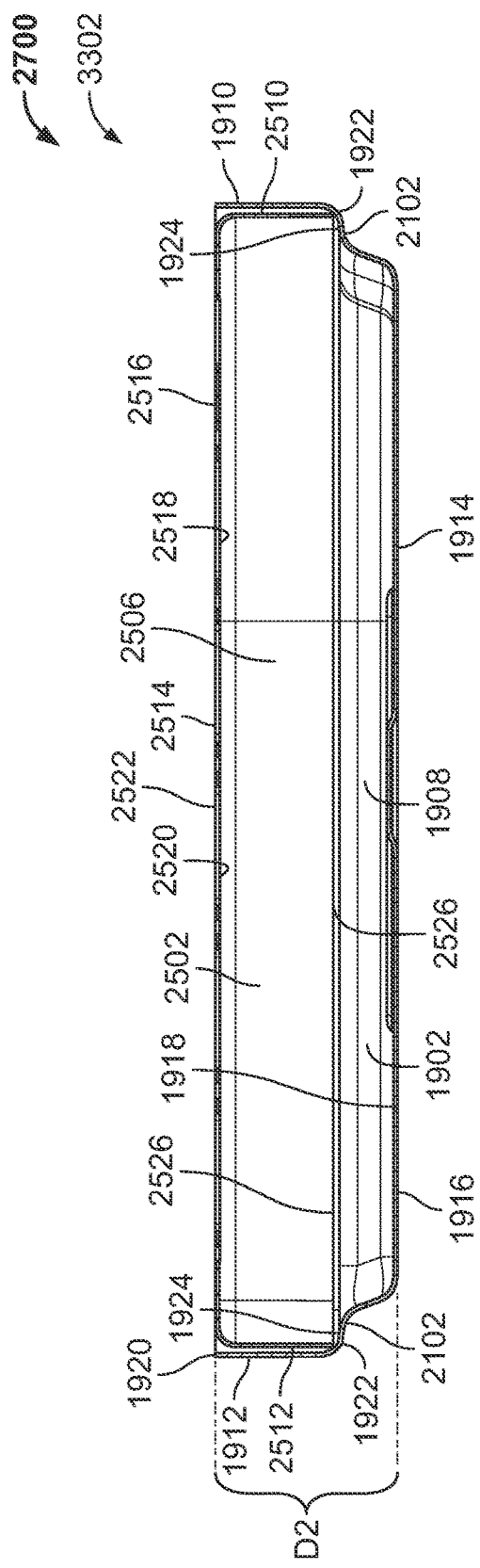
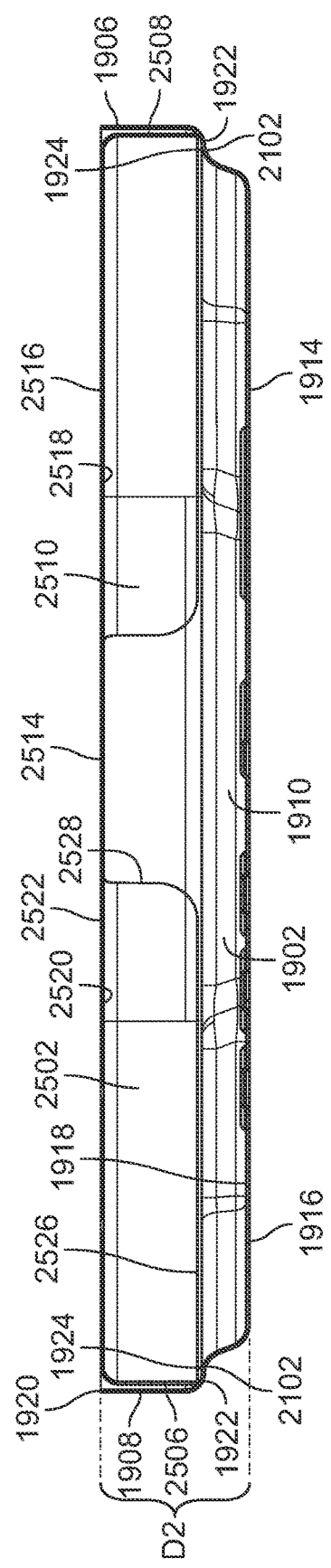

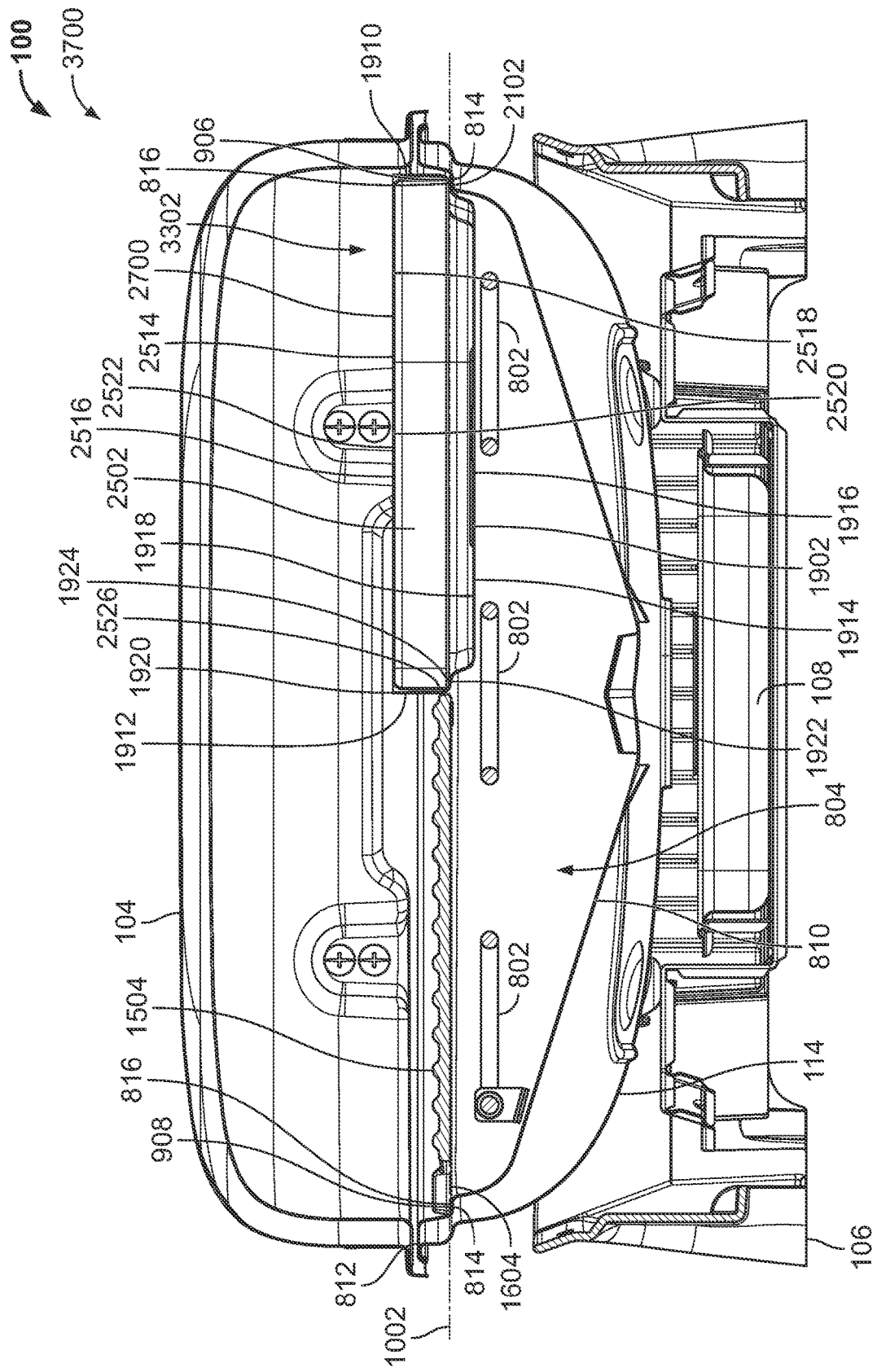

PORTABLE GRILLS HAVING REVERSIBLE STEAM TRAY ASSEMBLIES

RELATED APPLICATIONS

This application claims priority to U.S. Provisional Patent Application No. 63/340,321, filed May 10, 2022. The entirety of U.S. Provisional Patent Application No. 63/340,321 is hereby incorporated by reference herein.

FIELD OF THE DISCLOSURE

This disclosure relates generally to portable grills and, more specifically, to portable grills having reversible steam tray assemblies.

BACKGROUND

Portable grills typically include a cookbox, a base configured to support the cookbox, a lid configured to cover the cookbox so as to form a cooking chamber, and one or more heat-generating component(s) located within the cookbox and/or within the cooking chamber. In some examples, the portable grill can be implemented as an electric portable grill, with the heat-generating component(s) being implemented as one or more electrically-powered heating element(s). In other examples, the portable grill can instead be implemented as a gas portable grill, with the heat-generating component(s) being implemented as one or more gas burner(s). Portable grills also typically include one or more cooking surface(s) located within the cookbox and/or within the cooking chamber at a position above and/or over the heat-generating component(s). The cooking surface(s) is/are typically implemented as one or more grilling grate(s) that is/are configured to support one or more item(s) of food to be grilled within the cooking chamber.

BRIEF DESCRIPTION OF THE DRAWINGS

FIG. 29 is a cross-sectional view of the steam tray assembly of FIGS. 27 and 28 taken along section F-F of FIG. 28, with the steam tray assembly shown arranged in the first steam tray configuration of FIGS. 27 and 28.

FIG. 30 is a cross-sectional view of the steam tray assembly of FIGS. 27-29 taken along section G-G of FIG. 28, with the steam tray assembly shown arranged in the first steam tray configuration of FIGS. 27-29.

FIG. 31 is a perspective view of the portable grill of FIGS. 1-11, with the lid of the portable grill shown in the open position, and with the cookbox of the portable grill shown arranged in an example fourth cookbox configuration.

FIG. 35 is a cross-sectional view of the steam tray assembly of FIGS. 27-34 taken along section H-H of FIG. 34, with the steam tray assembly shown arranged in the second steam tray configuration of FIGS. 33 and 34.

FIG. 36 is a cross-sectional view of the steam tray assembly of FIGS. 27-35 taken along section I-I of FIG. 34, with the steam tray assembly shown arranged in the second steam tray configuration of FIGS. 33-35.

FIG. 38 is a cross-sectional view of the portable grill of FIGS. 1-11 taken along section A-A of FIG. 6, with the lid of the portable grill shown in the closed position, and with the cookbox of the portable grill shown arranged in the fifth cookbox configuration of FIG. 37.

Figure 1:
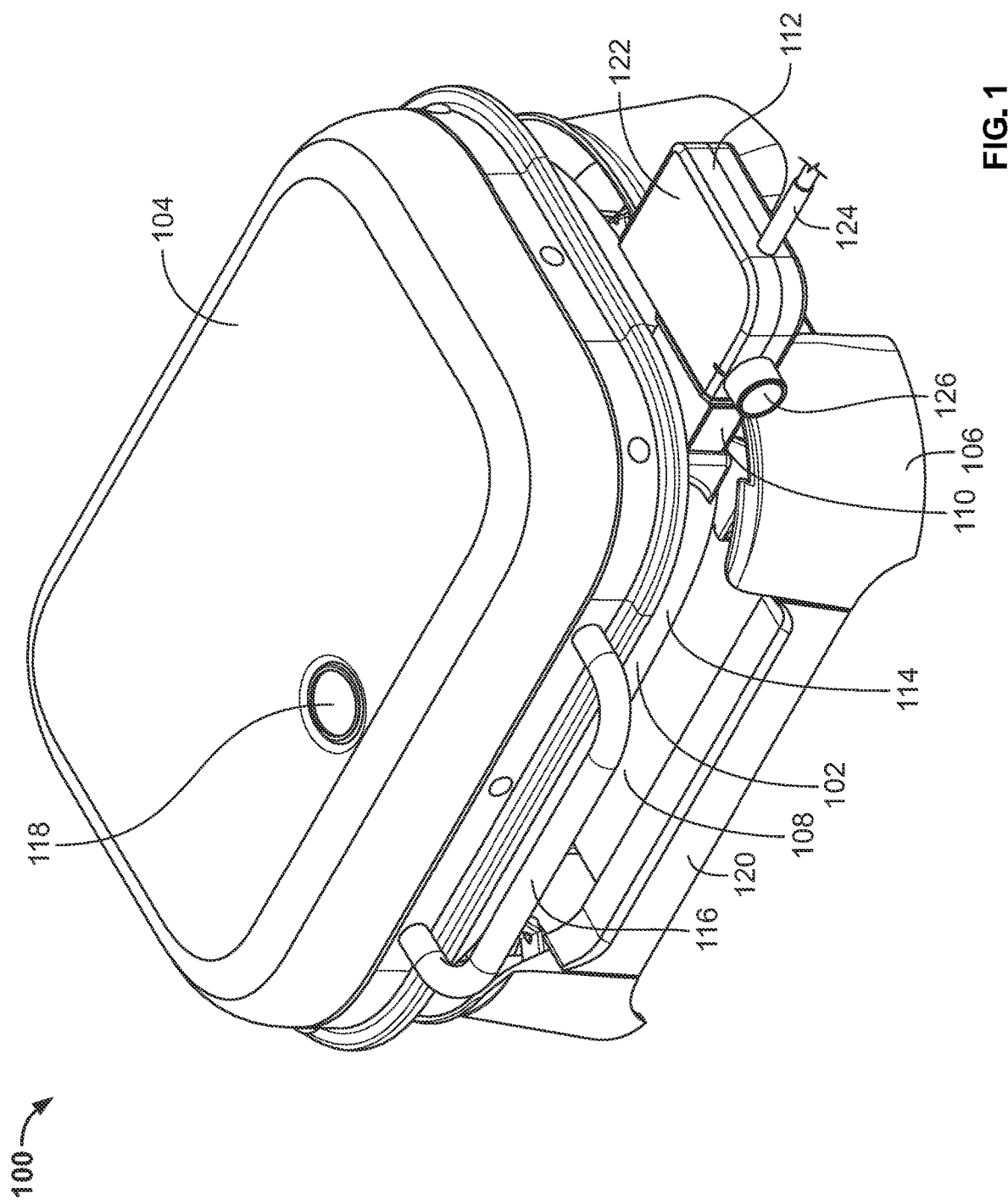
FIG. 1 is a perspective view of an example portable grill constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Portable grills having reversible steam tray assemblies are disclosed herein. In some examples disclosed herein, a portable grill includes a cookbox, a heating element, a water pan, and a steam tray. In some disclosed examples, the heating element is located within the cookbox. In some disclosed examples, the water pan is located within the cookbox above the heating element. In some disclosed examples, the water pan has a bottom wall. In some disclosed examples, the steam tray is located within the water pan. In some disclosed examples, the steam tray includes a horizontally-oriented support wall having a plurality of openings extending therethrough. In some disclosed examples, the steam tray is advantageously configured to be reversibly positioned within the water pan in two different orientations that respectively position the support wall of the steam tray at two different distances (e.g., two different heights) relative to the bottom wall of the water pan and/or relative to the heating element of the portable grill. In some disclosed examples, the support wall is to be spaced from the bottom wall by a first distance when the steam tray is positioned in a first one of the two different orientations. In some disclosed examples, the support wall is to be spaced from the bottom wall by a second distance greater than the first distance when the steam tray is positioned in a second one of the two different orientations.

The above-identified features as well as other advantageous features of example portable grills having reversible steam tray assemblies as disclosed herein are further described below in connection with the figures of the application. As used herein in a mechanical context, the term "configured" means sized, shaped, arranged, structured, oriented, positioned, and/or located. For example, in the context of a first object configured to fit within a second object, the first object is sized, shaped, arranged, structured, oriented, positioned, and/or located to fit within the second object. As used herein in an electrical and/or computing context, the term "configured" means arranged, structured, and/or programmed. For example, in the context of a controller configured to perform a specified operation, the controller is arranged, structured, and/or programmed (e.g., based on machine-readable instructions) to perform the specified operation.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween; without other parts therebetween; with the first and second parts touching; or without the first and second parts being in direct contact with one another. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, the phrase "in electrical communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, the term "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processor circuitry is/are best suited to execute the computing task(s).

Figure 2:
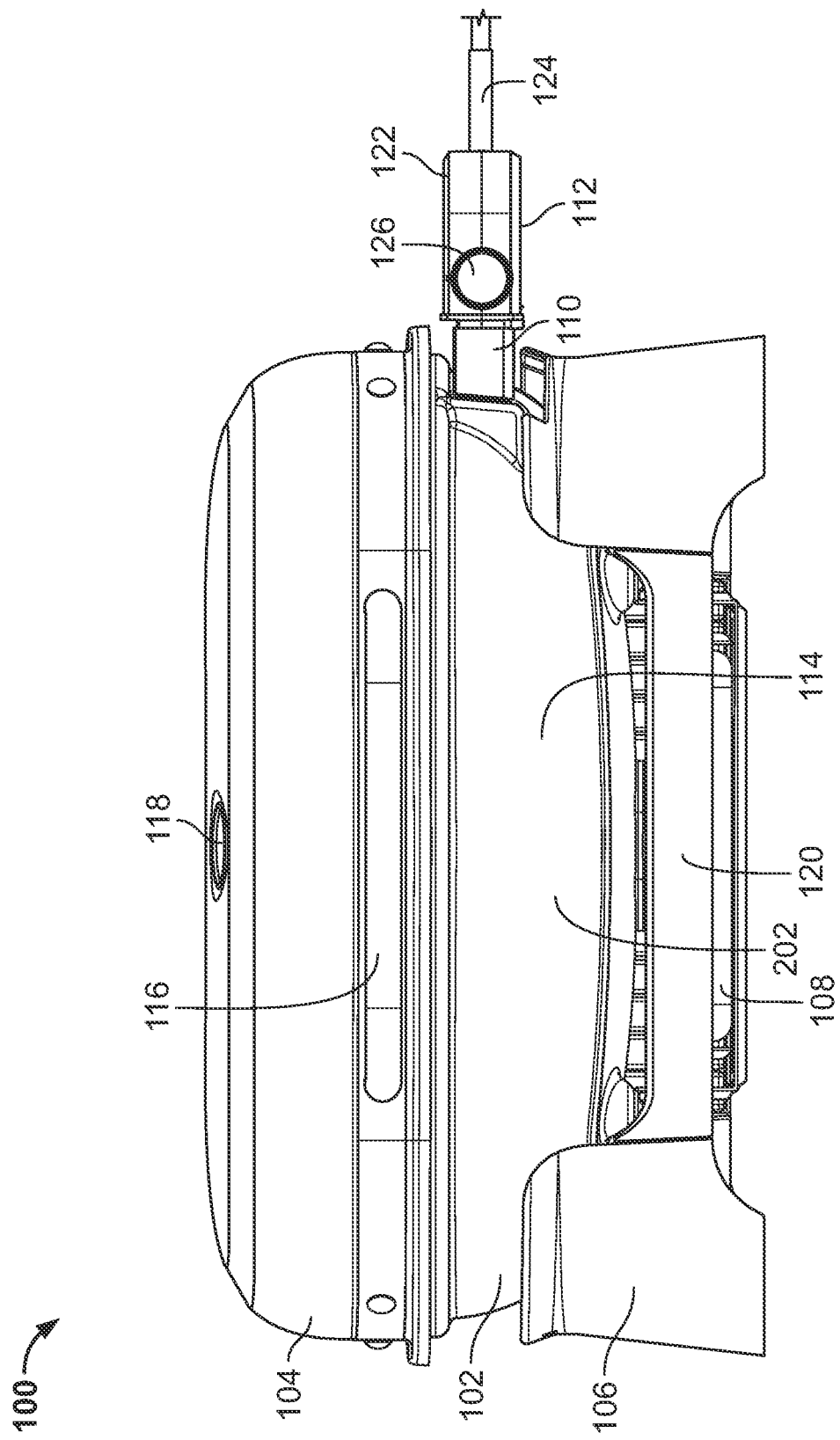
FIG. 2 is a front view of the portable grill of FIG. 1.
Figure 3:
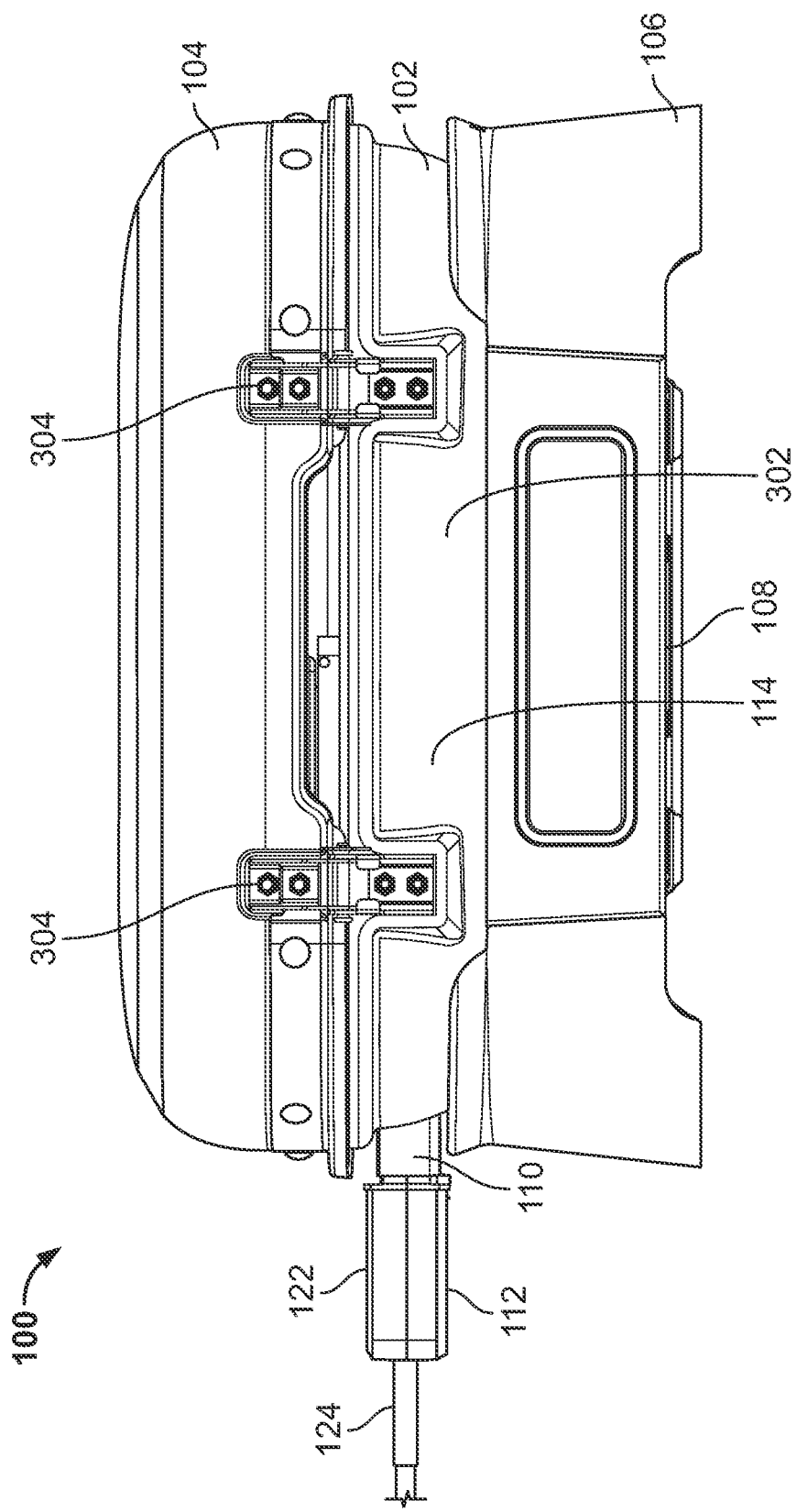
FIG. 3 is a rear view of the portable grill of FIGS. 1 and 2.
Figure 4:
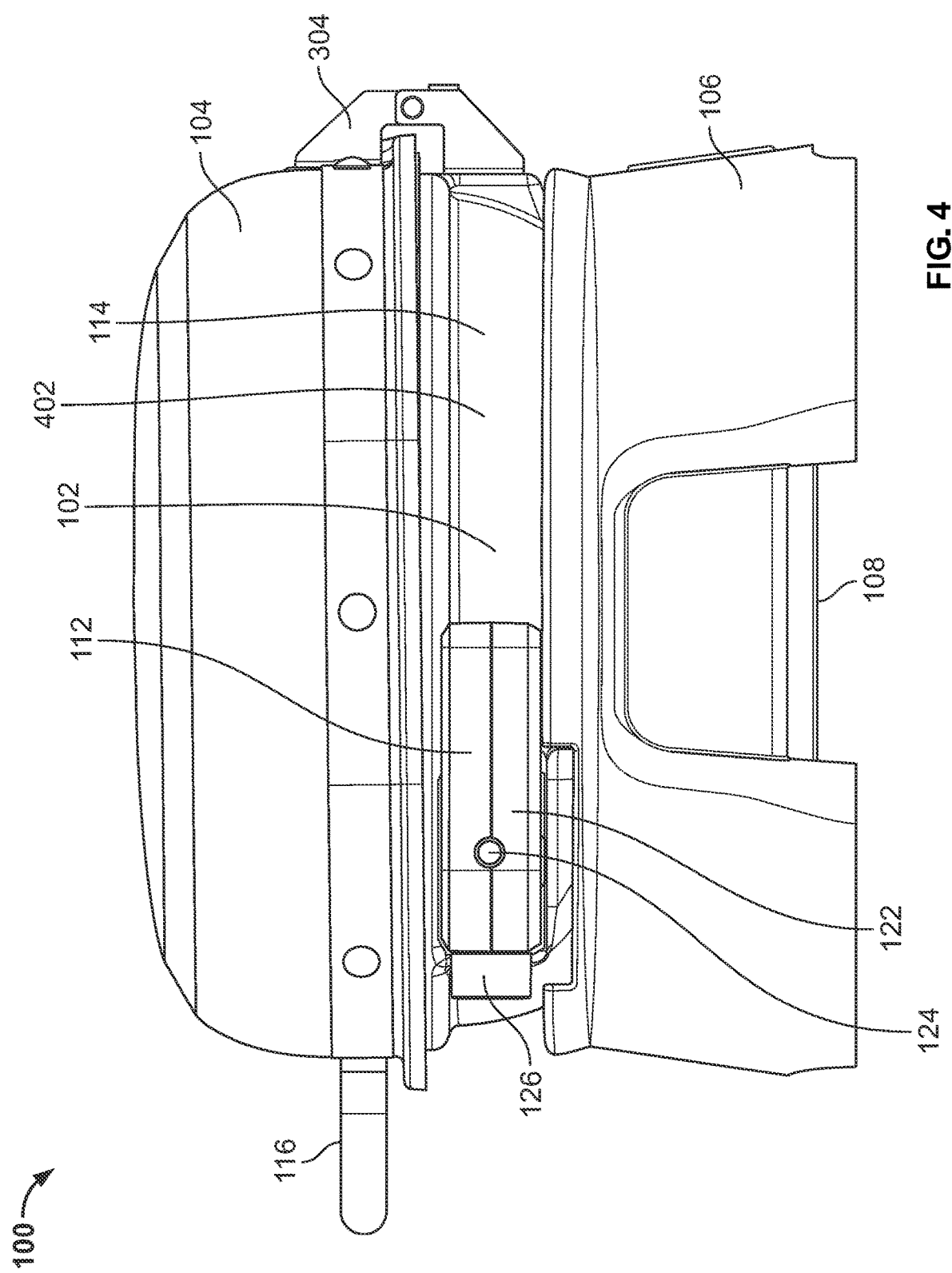
FIG. 4 is a right side view of the portable grill of FIGS. 1-3.
Figure 5:
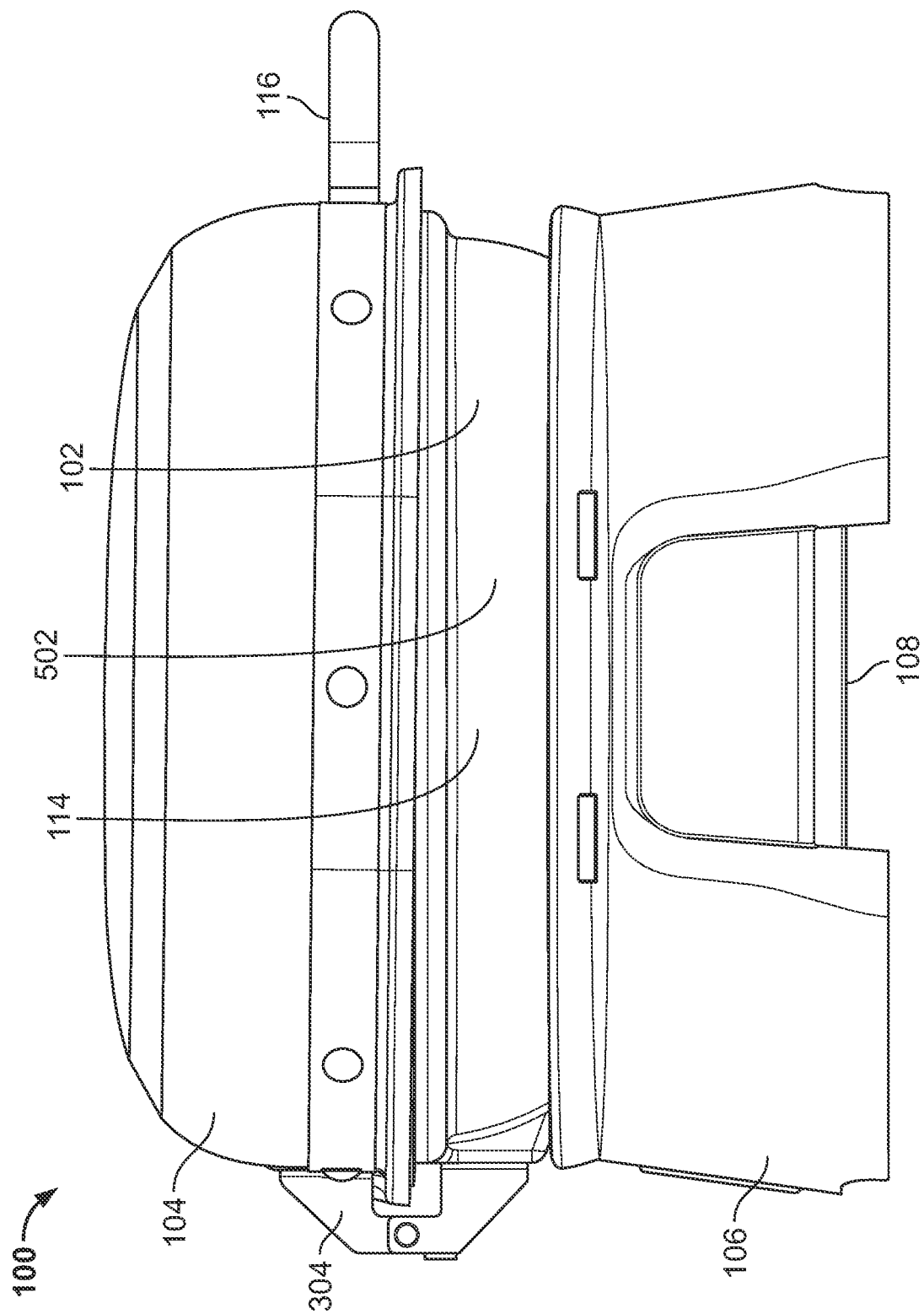
FIG. 5 is a left side view of the portable grill of FIGS. 1-4.
Figure 6:
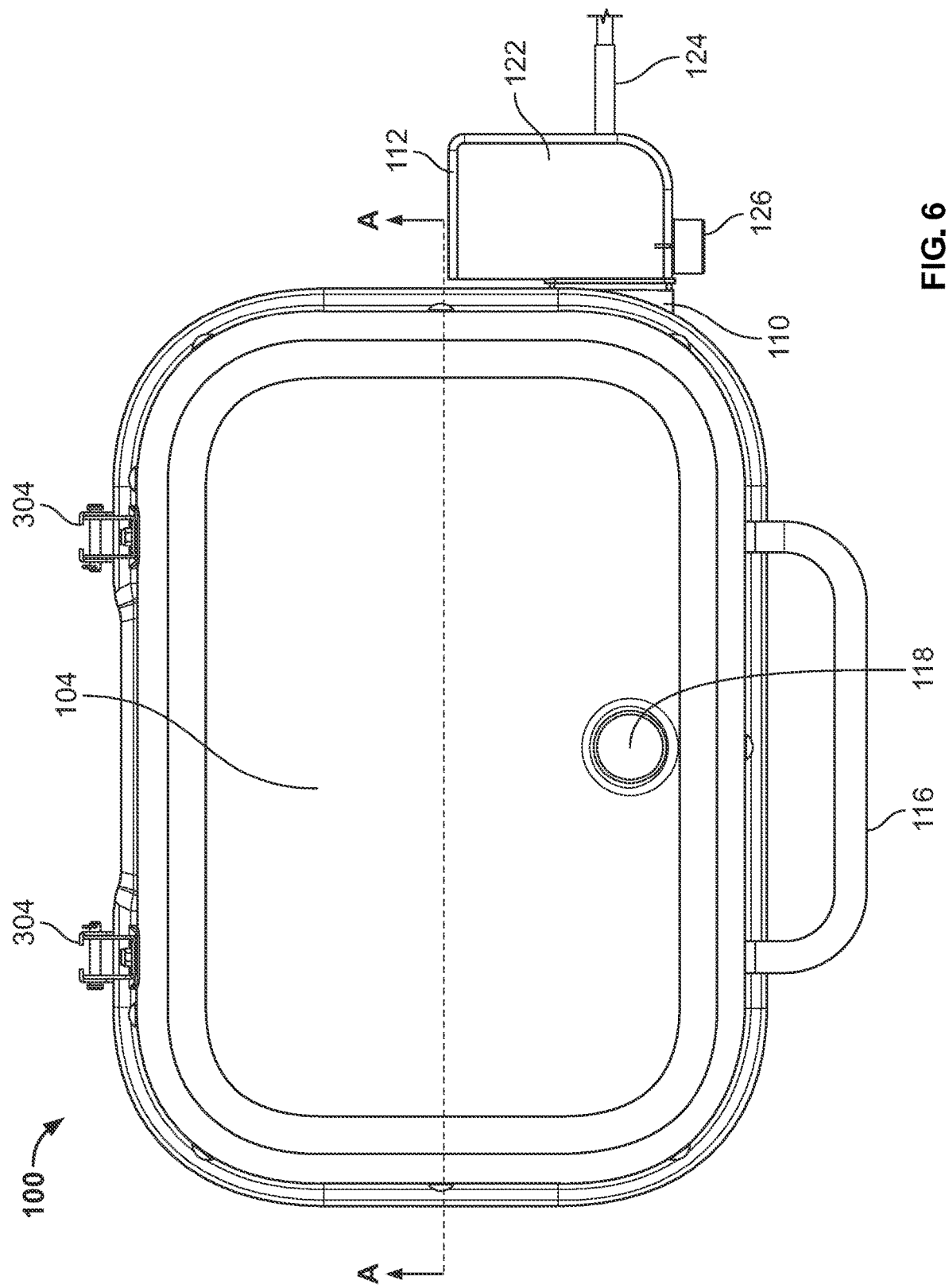
FIG. 6 is a top view of the portable grill of FIGS. 1-5.
Figure 7:
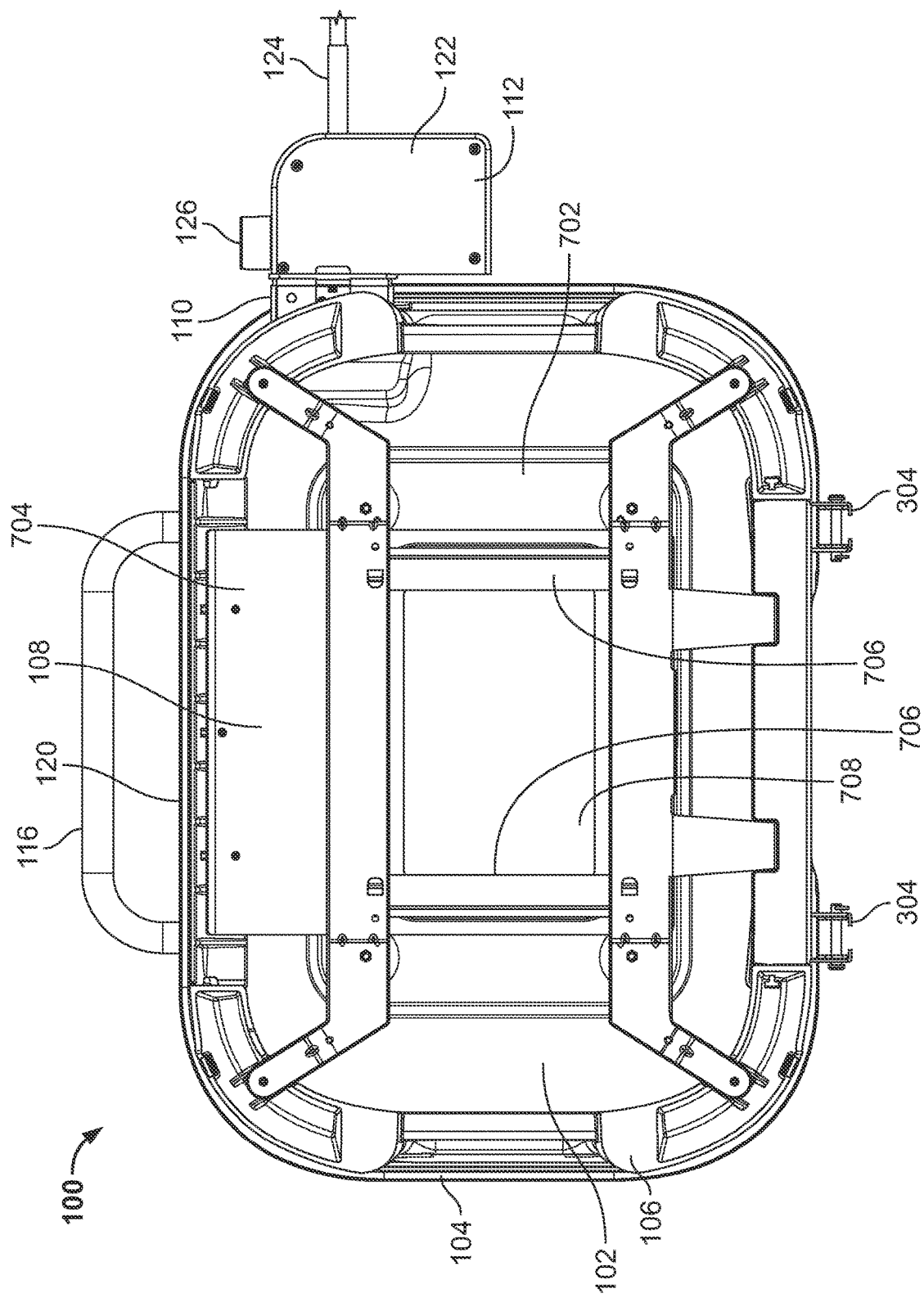
FIG. 7 is a bottom view of the portable grill of FIGS. 1-6.

FIG. 1 is a perspective view of an example portable grill 100 constructed in accordance with the teachings of this disclosure. FIG. 2 is a front view of the portable grill 100 of FIG. 1. FIG. 3 is a rear view of the portable grill 100 of FIGS. 1 and 2. FIG. 4 is a right side view of the portable grill 100 of FIGS. 1-3. FIG. 5 is a left side view of the portable grill 100 of FIGS. 1-4. FIG. 6 is a top view of the portable grill 100 of FIGS. 1-5. FIG. 7 is a bottom view of the portable grill 100 of FIGS. 1-6. The portable grill 100 of FIGS. 1-7 includes an example cookbox 102, an example lid 104, an example base 106, an example waste management assembly 108, an example power supply receptacle 110, and an example power supply 112.

Figure 8:
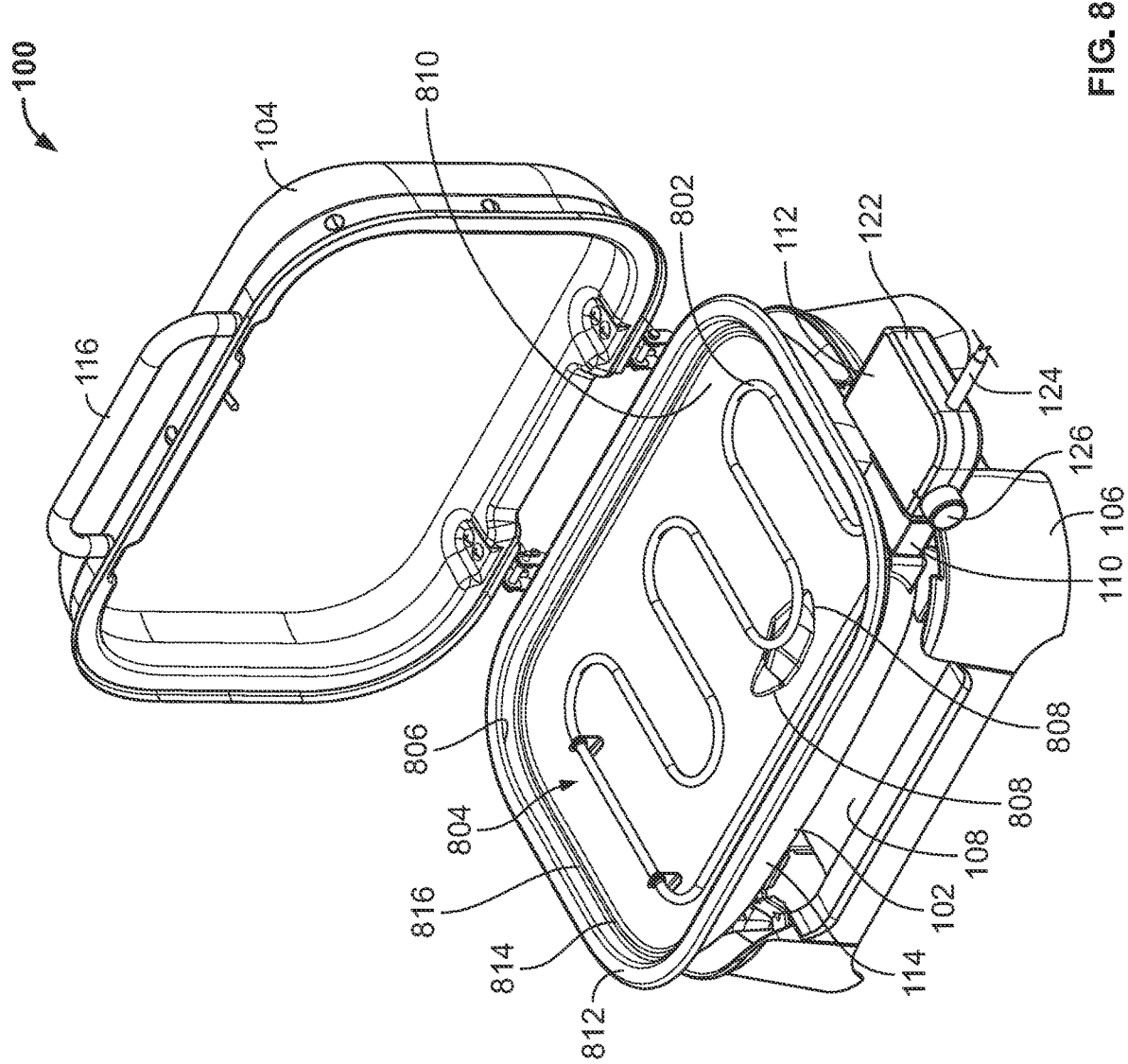
FIG. 8 is a perspective view of the portable grill of FIGS. 1-7, with the lid of the portable grill shown in an open position.
Figure 9:
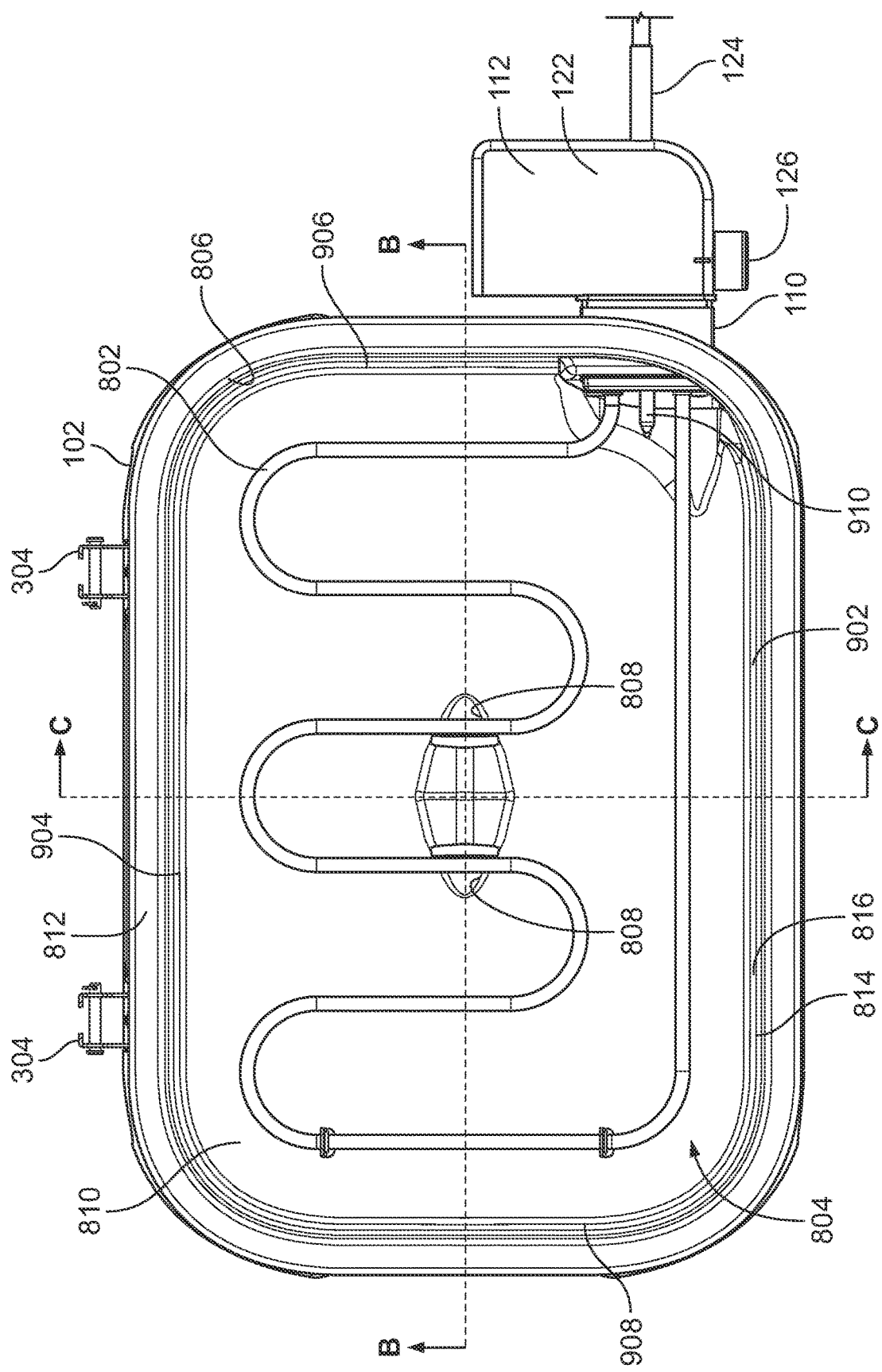
FIG. 9 is a top view of the portable grill of FIGS. 1-8, with the lid of the portable grill removed to enhance the viewability of the interior of the cookbox of the portable grill.
Figure 10:
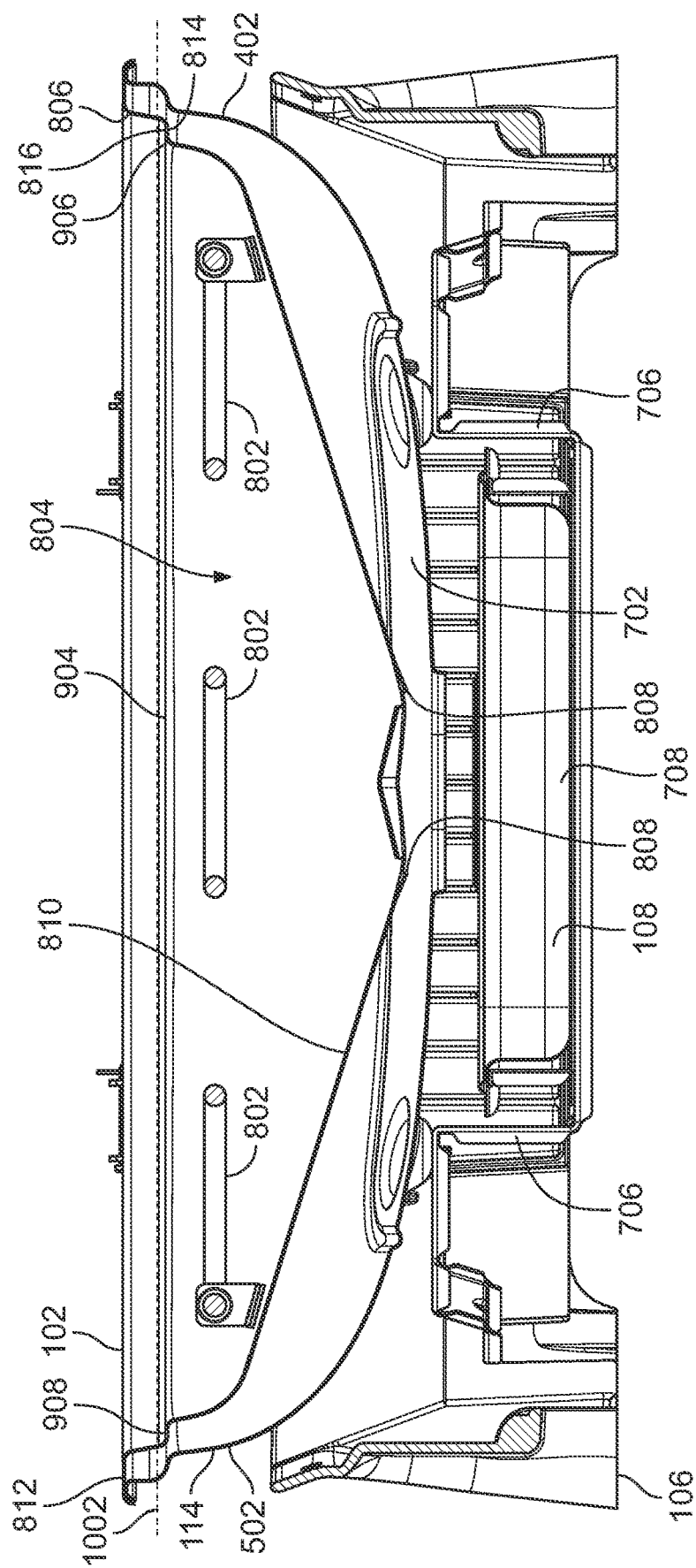
FIG. 10 is a cross-sectional view of the portable grill of FIGS. 1-9 taken along section B-B of FIG. 9.
Figure 11:
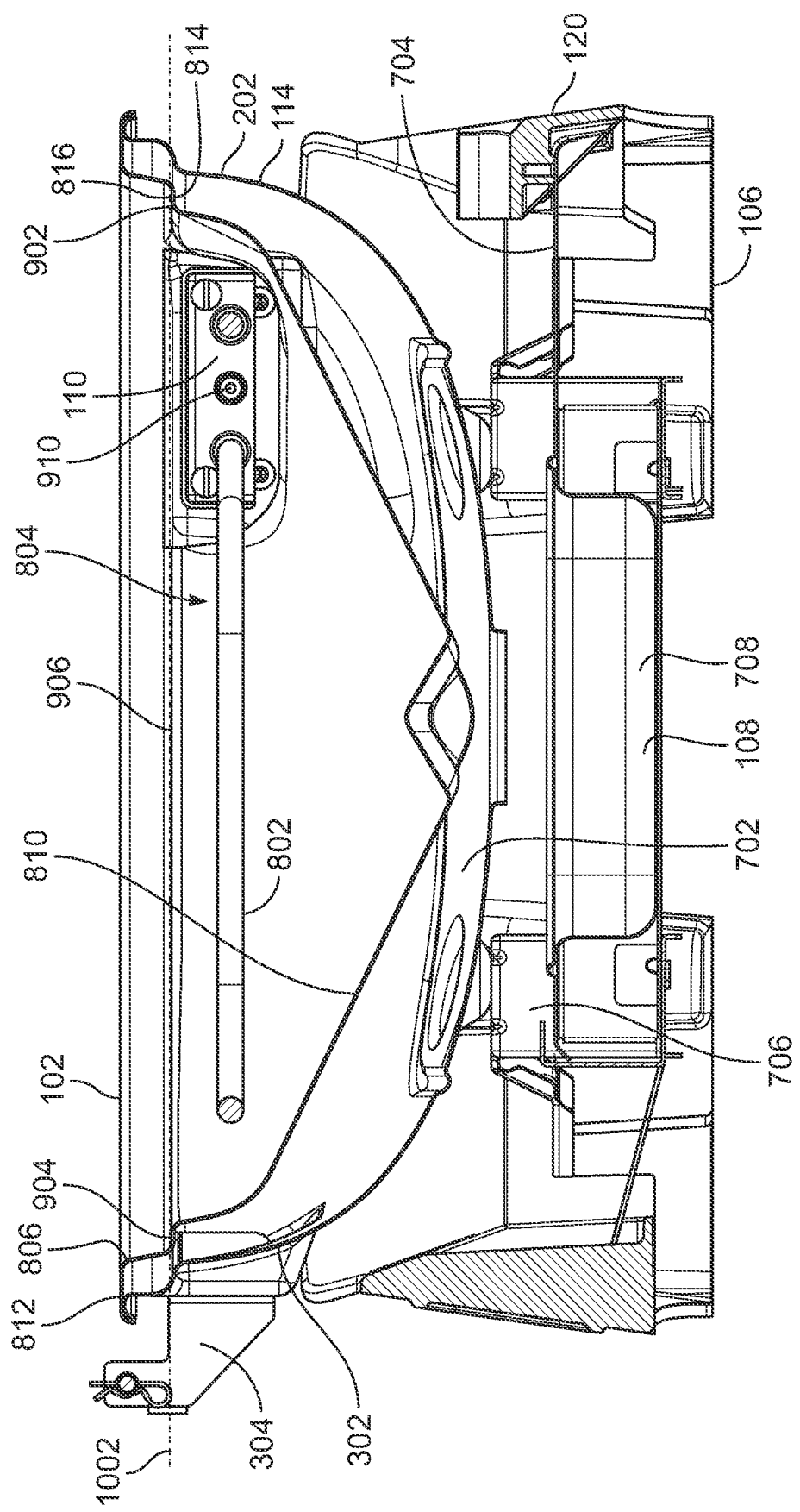
FIG. 11 is a cross-sectional view of the portable grill of FIGS. 1-10 taken along section C-C of FIG. 9.

As shown in FIGS. 1-7, the lid 104 of the portable grill 100 is in a closed position relative to the cookbox 102 of the portable grill 100. FIG. 8 is a perspective view of the portable grill 100 of FIGS. 1-7, with the lid 104 of the portable grill 100 shown in an open position relative to the cookbox 102 of the portable grill 100. FIG. 9 is a top view of the portable grill 100 of FIGS. 1-8, with the lid 104 of the portable grill 100 removed to enhance the viewability of the interior of the cookbox 102 of the portable grill 100. FIG. 10 is a cross-sectional view of the portable grill 100 of FIGS. 1-9 taken along section B-B of FIG. 9. FIG. 11 is a cross-sectional view of the portable grill 100 of FIGS. 1-10 taken along section C-C of FIG. 9.

The cookbox 102 of FIGS. 1-11 is configured to support, carry, and/or house one or more component(s) of the portable grill 100 including, for example, the lid 104, the base 106, the waste management assembly 108, the power supply receptacle 110, the power supply 112, an example heating element 802, and/or one or more cooking surface(s) (e.g., one or more grilling grate(s), a water pan of a reversible steam tray assembly, etc.). In instances where one or more of the aforementioned component(s) of the portable grill 100 is/are not supported, carried, and/or housed by the cookbox 102, such component(s) can alternatively be supported, carried, and/or housed by one or more other structure(s) of the portable grill 100 including, for example, the lid 104, the base 106, and/or the power supply receptacle 110 of the portable grill 100.

The cookbox 102 of the portable grill 100 can be of any configuration suitable for supporting, holding, and/or containing one or more cooking surface(s) and/or one or more item(s) of food to be cooked. In this regard, an upper portion (e.g., an upper rim) of the cookbox 102 circumscribes and/or defines an example upper opening 806 having a configuration suitable to allow access to an example cooking chamber 804 of the portable grill 100. In some examples, a lower portion (e.g., a bottom wall) of the cookbox 102 includes one or more lower opening(s) 808 having a configuration suitable to allow cooking waste (e.g., grease and/or other residual cooking matter) to pass downwardly from the cookbox 102 into the waste management assembly 108 of the portable grill 100.

In the illustrated example of FIGS. 1-11, the cookbox 102 has a generally box-shaped configuration (e.g., a box having curved and/or contoured corners) including and/or defined by an example front wall 202, an example rear wall 302 located opposite the front wall 202, an example right sidewall 402 extending between the front wall 202 and the rear wall 302, an example left sidewall 502 located opposite the right sidewall 402 and extending between the front wall 202 and the rear wall 302, and an example bottom wall 702 extending inwardly from and/or between one or more of the front wall 202, the rear wall 302, the right sidewall 402, and/or the left sidewall 502. In other examples, the cookbox 102 can instead have a barrel-shaped configuration or a bowl-shaped (e.g., kettle-shaped) configuration, either of which may include one or more curved or contoured wall segment(s).

The cookbox 102 of FIGS. 1-11 is a double-walled structure having an example exterior wall 114 (e.g., including and/or defined by the front wall 202, the rear wall 302, the right sidewall 402, the left sidewall 502, and/or the bottom wall 702), and an example interior wall 810 located inwardly (e.g., radially inwardly) from the exterior wall 114. As shown in FIGS. 10 and 11, one or more portion(s) of the interior wall 810 of the cookbox 102 is/are spaced apart from the surrounding exterior wall 114 of the cookbox 102 such that one or more gap(s) is/are present between the exterior wall 114 and the interior wall 810. In other examples, the interior wall 810 can instead fully contact the exterior wall 114, thereby eliminating the presence of such gap(s). In still other example, the cookbox 102 can instead be implemented as a single-walled structure, with the single wall of the cookbox 102 having an exterior surface and an interior surface.

As shown in FIGS. 8-11, the cookbox 102 further includes an example upper rim 812 that circumscribes and/or defines the upper opening 806 of the cookbox 102. The cookbox 102 further includes an example step 814 (e.g., a ledge) formed along and/or by the interior wall 810 of the cookbox 102. As shown in FIGS. 8-11, an example upper surface 816 of the step 814 is located below the upper rim 812 of the cookbox 102 and above the heating element 802 of the portable grill 100, with the upper surface 816 of the step 814 extending inwardly (e.g., radially inwardly) relative to the upper rim 812 of the cookbox 102. The upper surface 816 of the step 814 of the cookbox 102 is accordingly located below the upper rim 812 of the cookbox 102 and above the heating element 802 of the portable grill 100, with the upper rim 812 of the cookbox 102 circumscribing the upper surface 816 of the step 814. As shown in FIGS. 10 and 11, the upper surface 816 of the step 814 defines an example horizontal plane 1002 located within the cookbox 102. In the illustrated example of FIGS. 8-11, the step 814 is implemented as a continuous structure that extends circumferentially along the interior wall 810 of the cookbox 102. In other examples, the step 814 can instead be implemented by a plurality of discrete steps that are circumferentially spaced apart from one another about the interior wall 810 of the cookbox 102.

The step 814 and/or step(s) of the cookbox 102 can be of configuration suitable for supporting one or more cooking surface(s) within the cooking chamber 804 and/or within the cookbox 102 of the portable grill 100 at a position above the heating element 802 of the portable grill 100. For example, as shown in FIGS. 9-11, the step 814 includes an example front portion 902, an example rear portion 904, an example right side portion 906, and an example left side portion 908, all of which are located above the heating element 802 of the portable grill 100. The front portion 902 of the step 814 is configured to support one or more front portion(s) of one or more cooking surface(s) (e.g., a front portion of a grilling grate, a front portion of a water pan, etc.) such that one or more lower surface(s) of the front portion(s) of the cooking surface(s) is/are seated on (e.g., in face-to-face contact with) the upper surface 816 of the front portion 902 of the step 814. The rear portion 904 of the step 814 is configured to support one or more rear portion(s) of one or more cooking surface(s) (e.g., a rear portion of a grilling grate, a rear portion of a water pan, etc.) such that one or more lower surface(s) of the rear portion(s) of the cooking surface(s) is/are seated on (e.g., in face-to-face contact with) the upper surface 816 of the rear portion 904 of the step 814. The right side portion 906 of the step 814 is configured to support one or more right side portion(s) of one or more cooking surface(s) (e.g., a right side portion of a grilling grate, a right side portion of a water pan, etc.) such that one or more lower surface(s) of the right side portion(s) of the cooking surface(s) is/are seated on (e.g., in face-to-face contact with) the upper surface 816 of the right side portion 906 of the step 814. The left side portion 908 of the step 814 is configured to support one or more left side portion(s) of one or more cooking surface(s) (e.g., a left side portion of a grilling grate, a left side portion of a water pan, etc.) such that one or more lower surface(s) of the left side portion(s) of the cooking surface(s) is/are seated on (e.g., in face-to-face contact with) the upper surface 816 of the left side portion 908 of the step 814.

The lid 104 of the portable grill 100 is configured to cover and/or enclose the cookbox 102 of the portable grill 100 when the lid 104 is in a closed position. As shown in FIGS. 1-8, the lid 104 is movably (e.g., pivotally) coupled to the cookbox 102 via example hinges 304 such that the lid 104 can be moved (e.g., pivoted) relative to the cookbox 102 between a closed position (e.g., as shown in FIGS. 1-7) and an open position (e.g., as shown in FIG. 8). In other examples, the lid 104 can instead be removably positioned on the cookbox 102 without there being any direct mechanical coupling between the lid 104 and the cookbox 102. In some such other examples, the lid 104 can be movably (e.g., pivotally) coupled to one or more structure(s) of the portable grill 100 other than the cookbox 102. For example, the lid 104 can be movably (e.g., pivotally) coupled to the base 106 of the portable grill 100. Movement of the lid 104 between the closed position (e.g., as shown in FIGS. 1-7) and the open position (e.g., as shown in FIG. 8) can be facilitated via user interaction with an example handle 116 that is coupled to the lid 104.

The cookbox 102 and the lid 104 of the portable grill 100 collectively define the cooking chamber 804 of the portable grill 100. The cooking chamber 804 becomes accessible to a user of the portable grill 100 (e.g., via the upper opening 806 of the cookbox 102) when the lid 104 is in the open position (e.g., as shown in FIG. 8). Conversely, the cooking chamber 804 is generally inaccessible to the user of the portable grill 100 when the lid 104 is in the closed position (e.g., as shown in FIGS. 1-7). User access to the cooking chamber 804 of the portable grill 100 may periodically become necessary, for example, to add an item of food to the cooking chamber 804 (e.g., at or toward the beginning of a cooking process), to remove an item of food from the cooking chamber 804 (e.g., at or toward the end of a cooking process), to flip, rotate, relocate, or otherwise move an item of food within the cooking chamber 804 (e.g., during the middle of a cooking process), and/or to change an arrangement of the cooking surface(s) located within the cooking chamber 804 (e.g., to change a cookbox configuration of the portable grill 100, as further described herein). The cooking chamber 804 of the portable grill 100 may be of any configuration suitable for supporting, holding, and/or containing one or more cooking surface(s) to be located therein, and/or suitable for supporting, holding, and/or containing one or more item(s) of food to be cooked therein.

The portable grill 100 further includes an example temperature sensor 118 coupled to the lid 104. In the illustrated example of FIGS. 1-8, the temperature sensor 118 is implemented as a temperature gauge having a sensing portion located within and/or extending into the cooking chamber 804 of the portable grill 100, and a display portion that is located outside of and/or viewable externally from the cooking chamber 804 of the portable grill 100. As shown in FIGS. 1-8, the temperature sensor 118 is mounted to the lid 104 such that the display portion of the temperature gauge is flush with the exterior surface of the lid 104. Data, information, and/or signals sensed, measured, detected, and/or displayed by the temperature sensor 118 can be of any quantity, type, form, and/or format.

The base 106 of the portable grill 100 includes one or more support element(s) configured to support the cookbox 102 and/or the waste management assembly 108 above an underlying surface (e.g., a table top, a cart, a support stand, a ground surface, etc.) onto which the base 106 and/or, more generally, the portable grill 100 is placed. The support element(s) of the base 106 can include any type(s) and/or number(s) of frame member(s), leg(s), and/or foot member(s). In the illustrated example of FIGS. 1-11, the base 106 has a rigid (e.g., non-collapsible) configuration. In other examples, the base 106 can include one or more collapsible component(s) (e.g., one or more foldable component(s), one or more telescopic component(s), etc.) configured to facilitate transitioning the base 106 between an erected configuration and a collapsed configuration.

Figure 12:
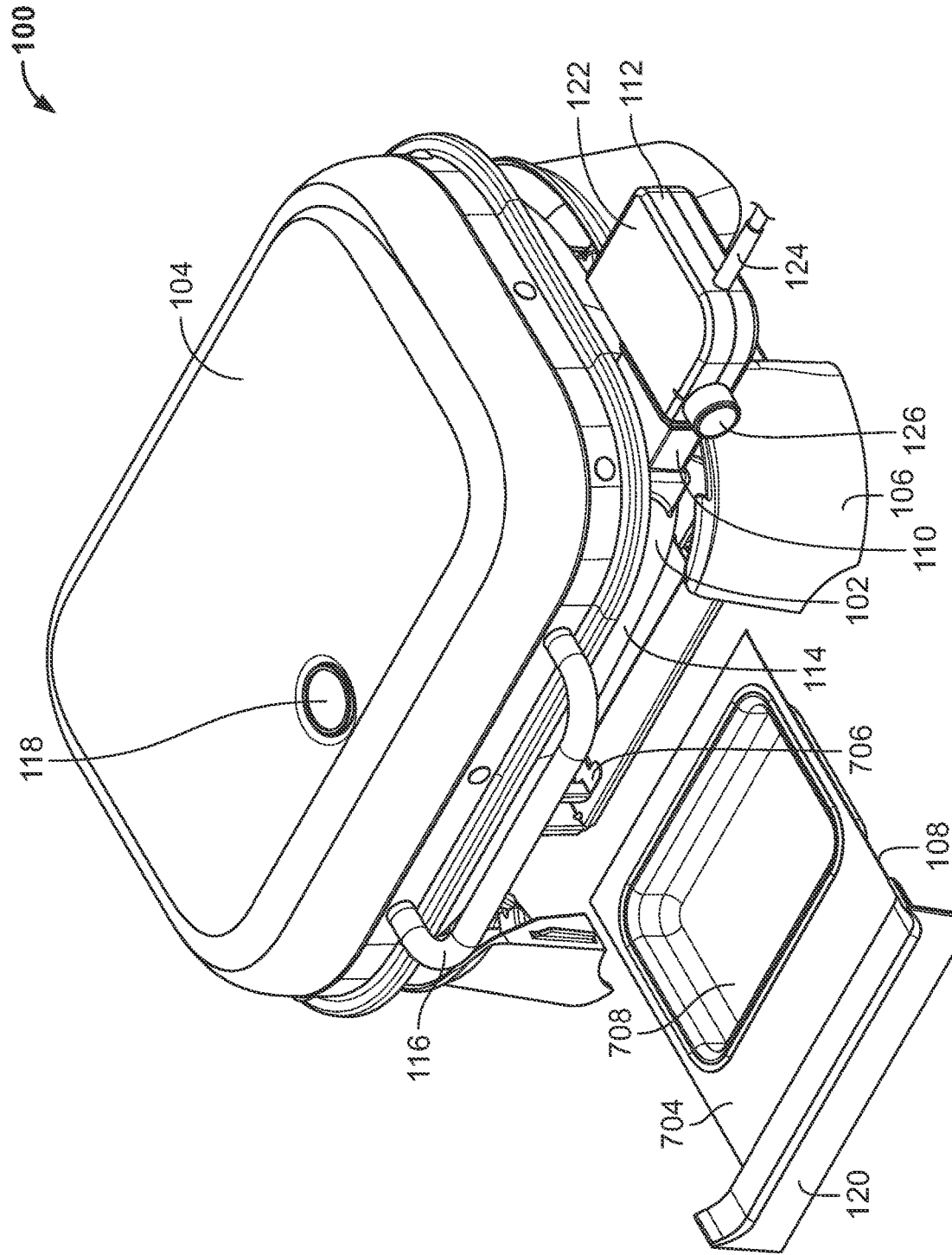
FIG. 12 is a perspective view of the portable grill of FIGS. 1-11, with the waste management assembly of the portable grill shown in an open position.

The waste management assembly 108 of the portable grill 100 is located below the cookbox 102, and is configured to receive, collect, and/or store waste (e.g., grease and/or other residual cooking matter) that passes downwardly through the lower opening(s) 808 of the cookbox 102 into the waste management assembly 108. The waste management assembly 108 includes an example waste tray 704 that is movably (e.g., slidably) coupled to a pair of example support brackets 706 such that an example waste bin 708 of the waste tray 704 can be moved (e.g., slid) relative to the cookbox 102 between a closed position (e.g., as shown in FIGS. 1-11) in which the waste bin 708 is positioned directly below (e.g., in vertical alignment with) the lower opening(s) 808 of the cookbox 102 and an open position (e.g., as shown in FIG. 12) in which the waste bin 708 is positioned forward of the cookbox 102. Movement of the waste tray 704 and/or the waste bin 708 between the closed position (e.g., as shown in FIGS. 1-11) and the open position (e.g., as shown in FIG. 12) can be facilitated via user interaction with an example tab 120 that is coupled to and/or formed by a front portion of the waste tray 704.

Figure 13:
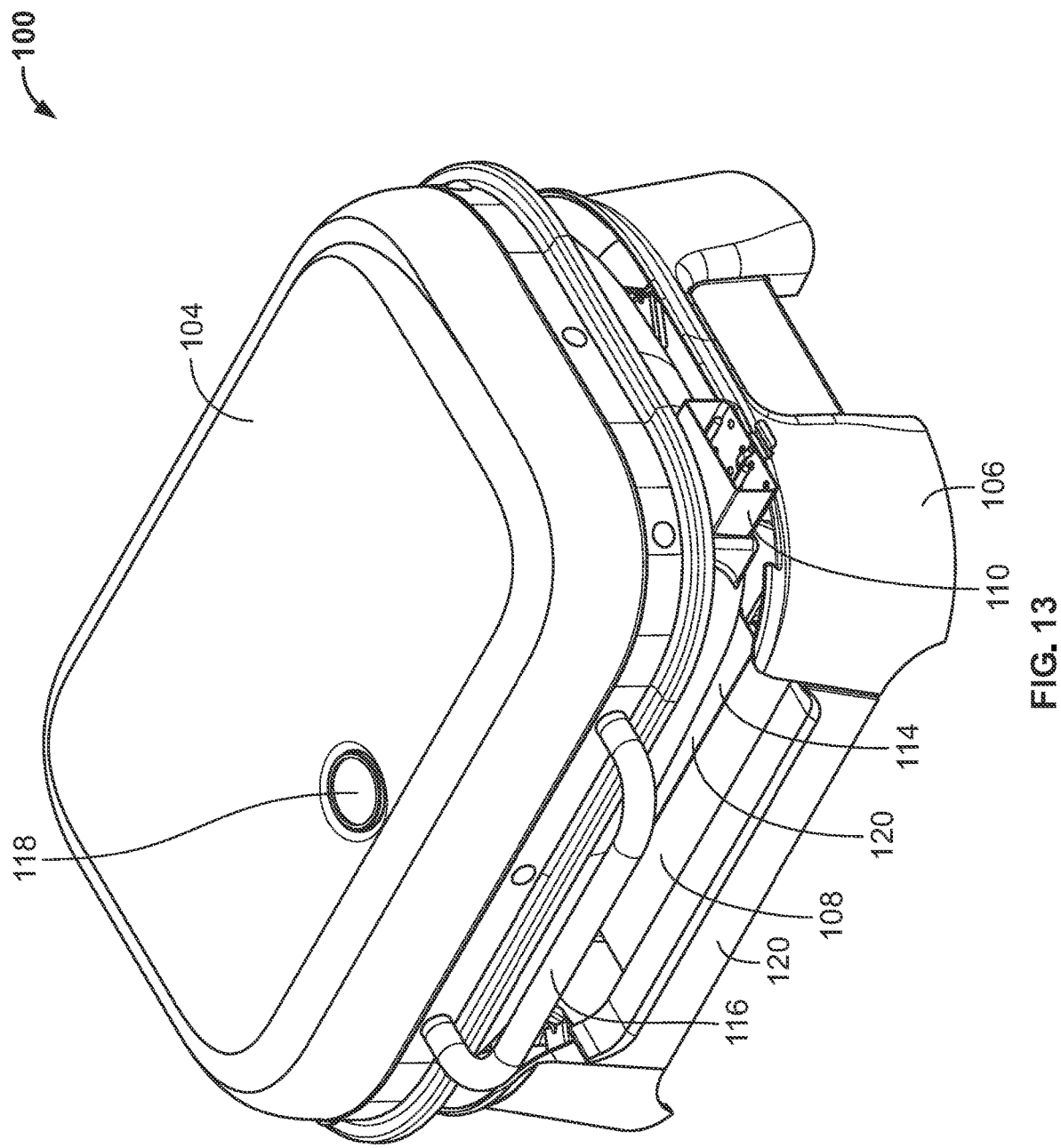
FIG. 13 is a perspective view of the portable grill of FIGS. 1-11, with the power supply of the portable grill removed to enhance the viewability of the power supply receptacle of the portable grill.

FIG. 13 is a perspective view of the portable grill 100 of FIGS. 1-11, with the power supply 112 of the portable grill 100 removed to enhance the viewability of the power supply receptacle 110 of the portable grill 100. The power supply receptacle 110 of the portable grill 100 is coupled to the cookbox 102 and to the heating element 802 of the portable grill 100. In the illustrated example of FIGS. 1-13, the power supply receptacle 110 extends outwardly (e.g., radially outwardly) from the exterior wall 114 of the cookbox 102, with the power supply receptacle 110 being located along the right sidewall 402 of the cookbox 102. In other examples, the power supply receptacle 110 can instead be located along another wall of the cookbox 102, such as the front wall 202, the rear wall 302, or the left sidewall 502 of the cookbox 102. The power supply receptacle 110 is configured to receive one or more portion(s) of the power supply 112 of the portable grill 100 to facilitate an operative coupling (e.g., electrical communication) between the power supply 112 and the heating element 802 of the portable grill 100.

Figure 14:
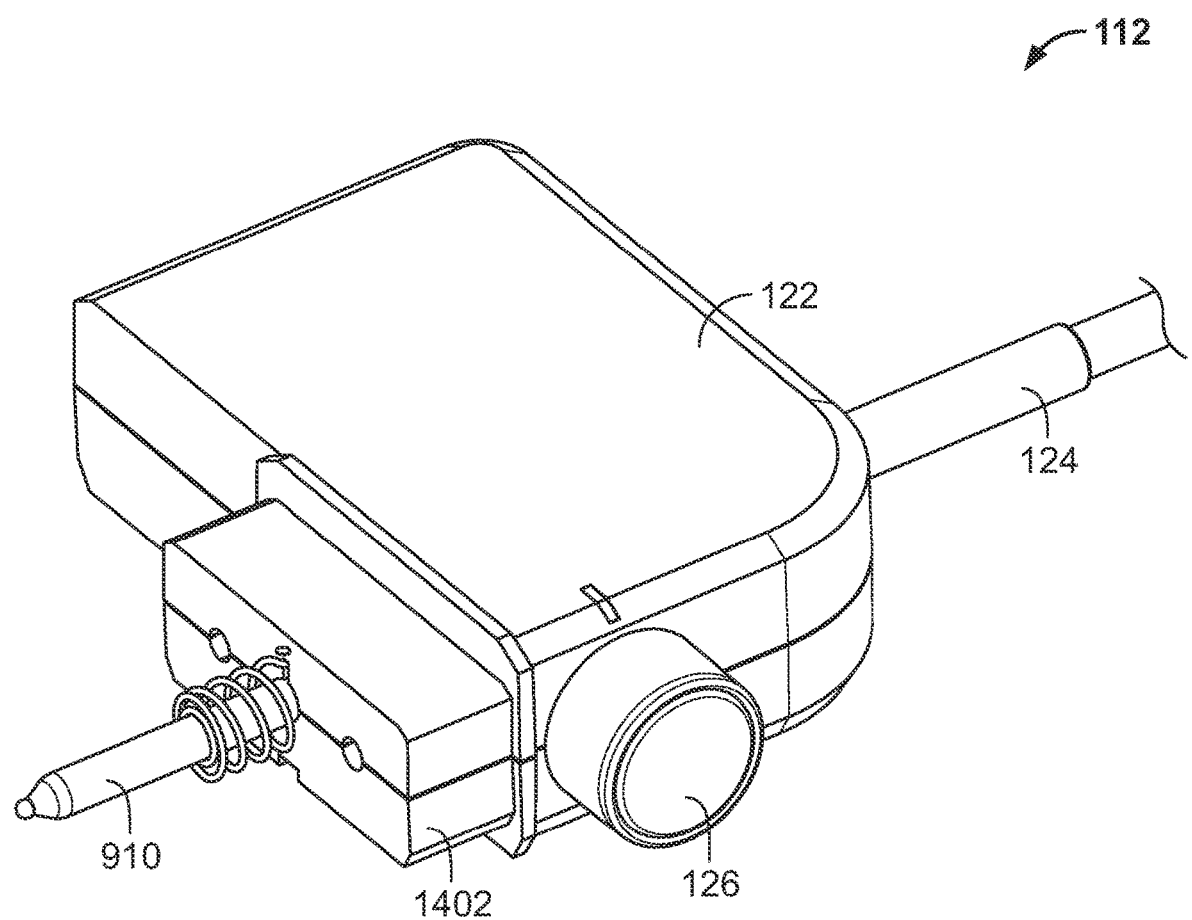
FIG. 14 is a perspective view of the power supply of the portable grill of FIGS. 1-11.

FIG. 14 is a perspective view of the power supply 112 of the portable grill 100 of FIGS. 1-11. The power supply 112 includes an example housing 122, an example power cord 124, an example control knob 126, and an example control probe 910. The housing 122 of the power supply 112 contains and/or houses power control circuitry that may include any number(s) and/or any type(s) of controller(s), processor(s) and/or other electrical component(s) that is/are configured to control and/or regulate the supply and/or distribution of electrical power (e.g., electrical current) to the heating element 802 of the portable grill 100, which in turn controls and/or regulates the temperature within the cookbox 102 and/or the cooking chamber 804 of the portable grill 100. As shown in FIG. 14, an example recessed portion 1402 of the housing 122 is configured to be received within the power supply receptacle 110 of the portable grill 100 such that the housing 122 and/or, more generally, the power supply 112 is removably couplable to the power supply receptacle 110. The power cord 124 (as partially shown in FIGS. 1-14) of the power supply 112 is configured to operatively couple the power control circuitry of the power supply 112 to an external power source (e.g., an external AC power source), as may be provided via household electricity or wall power to which the power cord 124 is connected (e.g., via a conventional electrical plug and electrical socket connection).

The control knob 126 of the power supply 112 is operatively coupled to the power control circuitry of the power supply 112 such that actuation (e.g., rotation and/or translation) of the control knob 126 by a user of the portable grill 100 modifies an operational state (e.g., an ON state or an OFF state) and/or a temperature setting associated with the heating element 802 of the portable grill 100. For example, a user may rotate the control knob 126 in a first direction (e.g., clockwise) to increase a temperature setting associated with the heating element 802, and may rotate the control knob 126 in a second direction (e.g., counterclockwise) to decrease a temperature setting associated with the heating element 802. Rotation of the control knob 126 (e.g., in either the first direction or the second direction) may also effect a transition of the heating element 802 from an ON state to an OFF state, or vice-versa. Alternatively, a user may push the control knob 126 to effect the transition of the heating element 802 from the ON state to the OFF state, or vice-versa.

The control probe 910 of the power supply 112 is operatively coupled to the power control circuitry of the power supply 112 such that data and/or information (e.g., temperature data and/or information) sensed, measured, and/or detected via the control probe 910 is communicated to the power control circuitry. The control probe 910 is configured to pass through an opening formed in the power supply receptacle 110 such that the control probe 910 extends into and/or is located at least partially within the cookbox 102 and/or the cooking chamber 804 of the portable grill 100 at a location proximate the heating element 802 of the portable grill 100, as shown in FIGS. 9 and 11.

The heating element 802 of the portable grill 100 is configured to generate heat within the cookbox 102 and/or the cooking chamber 804 of the portable grill 100 in response to electrical power (e.g., electrical current) supplied to the heating element 802 via the power supply 112 of the portable grill 100. The heating element 802 can have any configuration (e.g., any combination of linear, curved, and/or serpentine segments) suitable for generating heat at and/or distributing heat to one or more desired location(s) within the cookbox 102 and/or the cooking chamber 804 of the portable grill 100.

Figure 15:
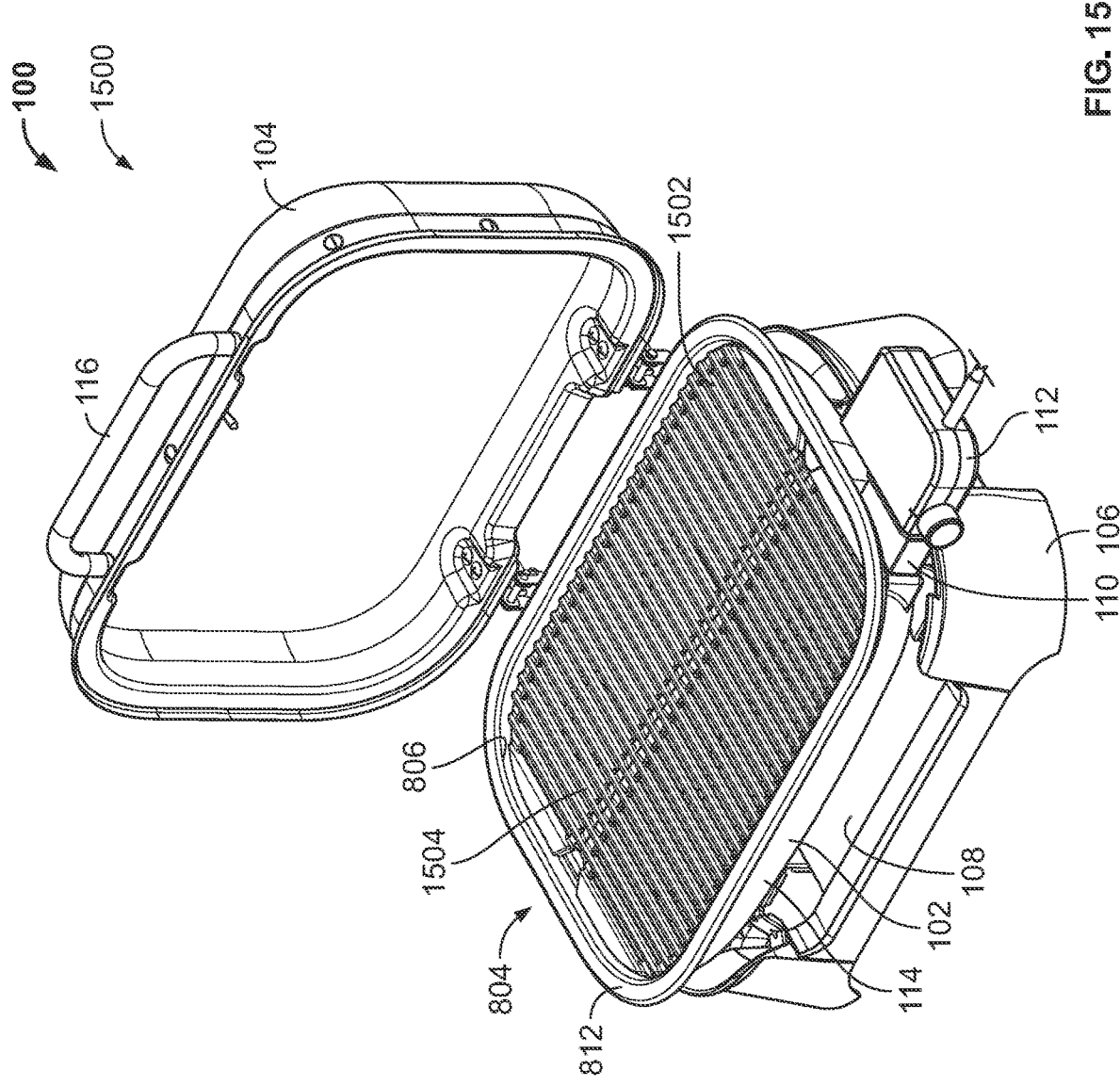
FIG. 15 is a perspective view of the portable grill of FIGS. 1-11, with the lid of the portable grill shown in the open position, and with the cookbox of the portable grill shown arranged in an example first cookbox configuration.
Figure 16:
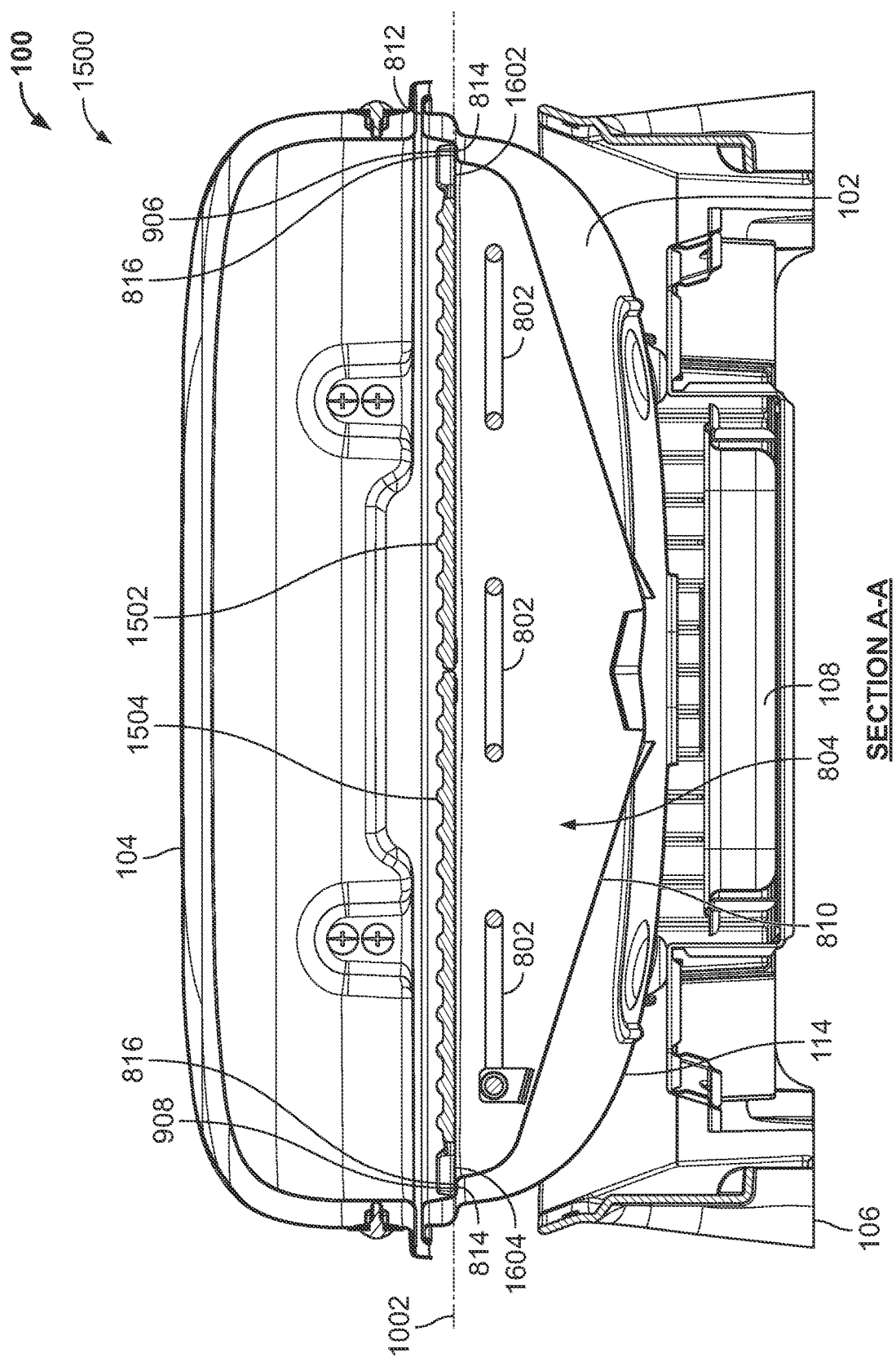
FIG. 16 is a cross-sectional view of the portable grill of FIGS. 1-11 taken along section A-A of FIG. 6, with the lid of the portable grill shown in the closed position, and with the cookbox of the portable grill shown arranged in the first cookbox configuration of FIG. 15.

FIG. 15 is a perspective view of the portable grill 100 of FIGS. 1-11, with the lid 104 of the portable grill 100 shown in the open position, and with the cookbox 102 of the portable grill 100 shown arranged in an example first cookbox configuration 1500. FIG. 16 is a cross-sectional view of the portable grill 100 of FIGS. 1-11 taken along section A-A of FIG. 6, with the lid 104 of the portable grill 100 shown in the closed position, and with the cookbox 102 of the portable grill 100 shown arranged in the first cookbox configuration 1500 of FIG. 15. When arranged in the first cookbox configuration 1500 shown in FIGS. 15 and 16, the cookbox 102 and/or the cooking chamber 804 of the portable grill 100 includes an example first grilling grate 1502 and an example second grilling grate 1504, both of which are located above the heating element 802 of the portable grill 100. In the illustrated example of FIGS. 15 and 16, the first grilling grate 1502 and the second grilling grate 1504 are configured in a side-by-side arrangement within the cookbox 102, with the first grilling grate 1502 and the second grilling grate 1504 collectively filling and/or occupying the substantial entirety of the horizontal plane 1002 of the cookbox 102 that is defined by the upper surface 816 of the step 814 formed along the interior wall 810 of the cookbox 102. The first grilling grate 1502 and/or the second grilling grate 1504 of FIGS. 15 and 16 can be removed (e.g., manually removed, by a user of the portable grill 100) from the cookbox 102 to facilitate transitioning the cookbox 102 from the first cookbox configuration 1500 of FIGS. 15 and 16 to a different cookbox configuration, as further described below.

In the illustrated example of FIGS. 15 and 16, the first grilling grate 1502 substantially fills and/or occupies (e.g., along the horizontal plane 1002) the right half of the cookbox 102, and the second grilling grate 1504 substantially fills and/or occupies (e.g., along the horizontal plane 1002) the left half of the cookbox 102. In other examples, the first grilling grate 1502 can be configured to substantially fill and/or occupy (e.g., along the horizontal plane 1002) more than half (e.g., two thirds) of the cookbox 102, and the second grilling grate 1504 can be configured to substantially fill and/or occupy (e.g., along the horizontal plane 1002) less than half (e.g., one third) of the cookbox 102. In still other examples, the first grilling grate 1502 can be configured to substantially fill and/or occupy (e.g., along the horizontal plane 1002) less than half (e.g., one third) of the cookbox 102, and the second grilling grate 1504 can be configured to substantially fill and/or occupy (e.g., along the horizontal plane 1002) more than half (e.g., two thirds) of the cookbox 102 and/or the cooking chamber 804.

In other examples, the first grilling grate 1502 and the second grilling grate 1504 shown in the first cookbox configuration 1500 of FIGS. 15 and 16 can instead be integrated to form a single grilling grate that fills and/or occupies (e.g., along the horizontal plane 1002) the substantial entirety of the cookbox 102. In still other examples, the first grilling grate 1502 and/or the second grilling grate 1504 shown in the first cookbox configuration 1500 of FIGS. 15 and 16 can instead be divided into a greater number (e.g., three, four, etc.) of grilling grates that collectively fill and/or occupy (e.g., along the horizontal plane 1002) the substantial entirety of the cookbox 102.

In the illustrated example of FIGS. 15 and 16, the first grilling grate 1502 is seated on the upper surface 816 of the step 814. More specifically, the first grilling grate 1502 of FIGS. 15 and 16 includes one or more example lower surface(s) 1602 that is/are seated on (e.g., in face-to-face contact with) the upper surface 816 of the front portion 902 of the step 814, the upper surface 816 of the rear portion 904 of the step 814, and the upper surface 816 of the right side portion 906 of the step 814. In other examples, the lower surface(s) 1602 of the first grilling grate 1502 can be configured to be seated on (e.g., in face-to-face contact with) the upper surface 816 of the front portion 902 of the step 814 and the upper surface 816 of the rear portion 904 of the step 814, but not on the upper surface 816 of the right side portion 906 of the step 814. As further shown in FIGS. 15 and 16, the second grilling grate 1504 is likewise seated on the upper surface 816 of the step 814. More specifically, the second grilling grate 1504 of FIGS. 15 and 16 includes one or more example lower surface(s) 1604 that is/are seated on (e.g., in face-to-face contact with) the upper surface 816 of the front portion 902 of the step 814, the upper surface 816 of the rear portion 904 of the step 814, and the upper surface 816 of the left side portion 908 of the step 814. In other examples, the lower surface(s) 1604 of the second grilling grate 1504 can be configured to be seated on (e.g., in face-to-face contact with) the upper surface 816 of the front portion 902 of the step 814 and the upper surface 816 of the rear portion 904 of the step 814, but not on the upper surface 816 of the left side portion 908 of the step 814.

Figure 17:
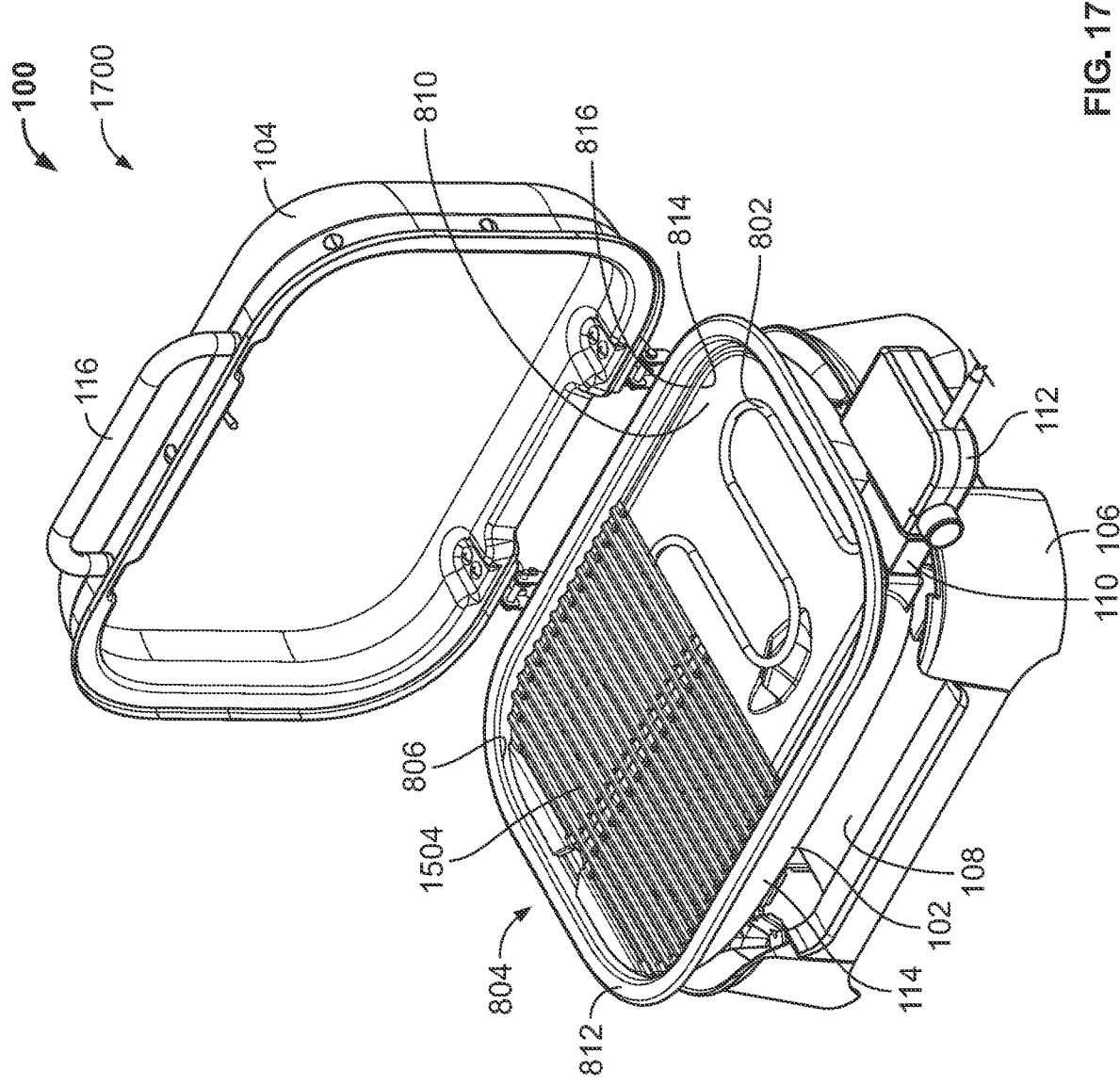
FIG. 17 is a perspective view of the portable grill of FIGS. 1-11, with the lid of the portable grill shown in the open position, and with the cookbox of the portable grill shown arranged in an example second cookbox configuration.
Figure 18:
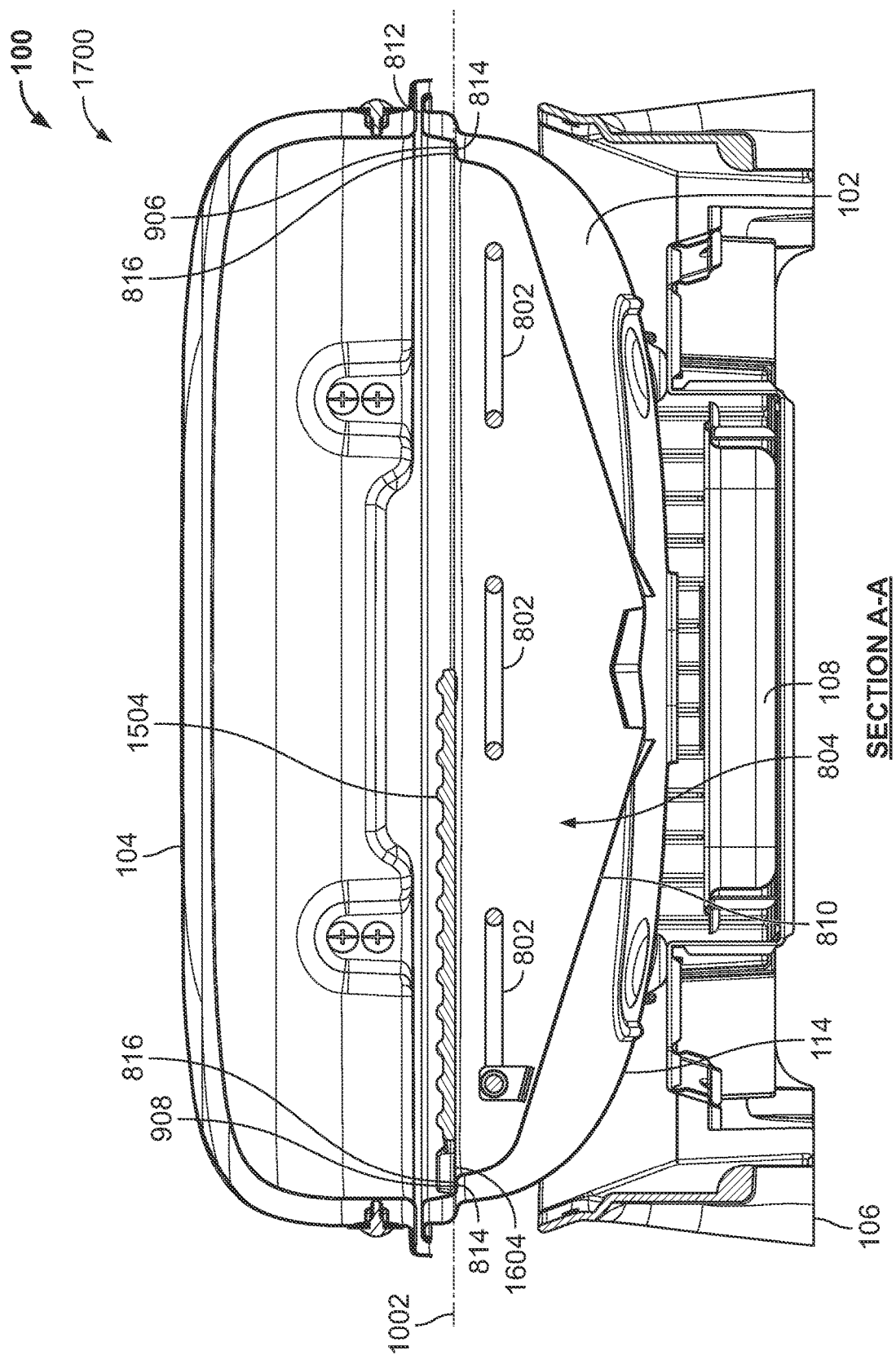
FIG. 18 is a cross-sectional view of the portable grill of FIGS. 1-11 taken along section A-A of FIG. 6, with the lid of the portable grill shown in the closed position, and with the cookbox of the portable grill shown arranged in the second cookbox configuration of FIG. 17.

FIG. 17 is a perspective view of the portable grill 100 of FIGS. 1-11, with the lid 104 of the portable grill 100 shown in the open position, and with the cookbox 102 of the portable grill 100 shown arranged in an example second cookbox configuration 1700. FIG. 18 is a cross-sectional view of the portable grill 100 of FIGS. 1-11 taken along section A-A of FIG. 6, with the lid 104 of the portable grill 100 shown in the closed position, and with the cookbox 102 of the portable grill 100 shown arranged in the second cookbox configuration 1700 of FIG. 17. The second cookbox configuration 1700 of FIGS. 17 and 18 differs from the first cookbox configuration 1500 of FIGS. 15 and 16 in that the cookbox 102 includes both the first grilling grate 1502 and the second grilling grate 1504 when arranged in the first cookbox configuration 1500, but includes only the second grilling grate 1504 when arranged in the second cookbox configuration 1700.

The cookbox 102 can be transitioned from the first cookbox configuration 1500 of FIGS. 15 and 16 into the second cookbox configuration 1700 of FIGS. 17 and 18 by raising (e.g., manually raising, by a user of the portable grill 100) the first grilling grate 1502 away from its seated position on the upper surface 816 of the step 814, and thereafter removing the first grilling grate 1502 from the cookbox 102. Removal of the first grilling grate 1502 from the cookbox 102 results in the formation of an open space and/or area (e.g., the right half of the cookbox 102 existing along the horizontal plane 1002) that can thereafter be substantially filled and/or occupied by one or more other cooking surface(s) (e.g., a water pan of a reversible steam tray assembly) that is/are configured to be interchangeable with the first grilling grate 1502. In this regard, such other cooking surface(s) include one or more lower surface(s) configured to be seated on (e.g., in face-to-face contact with) the upper surface 816 of the front portion 902 of the step 814, the upper surface 816 of the rear portion 904 of the step 814, and/or the upper surface 816 of the right side portion 906 of the step 814, as further described below.

Figure 19:
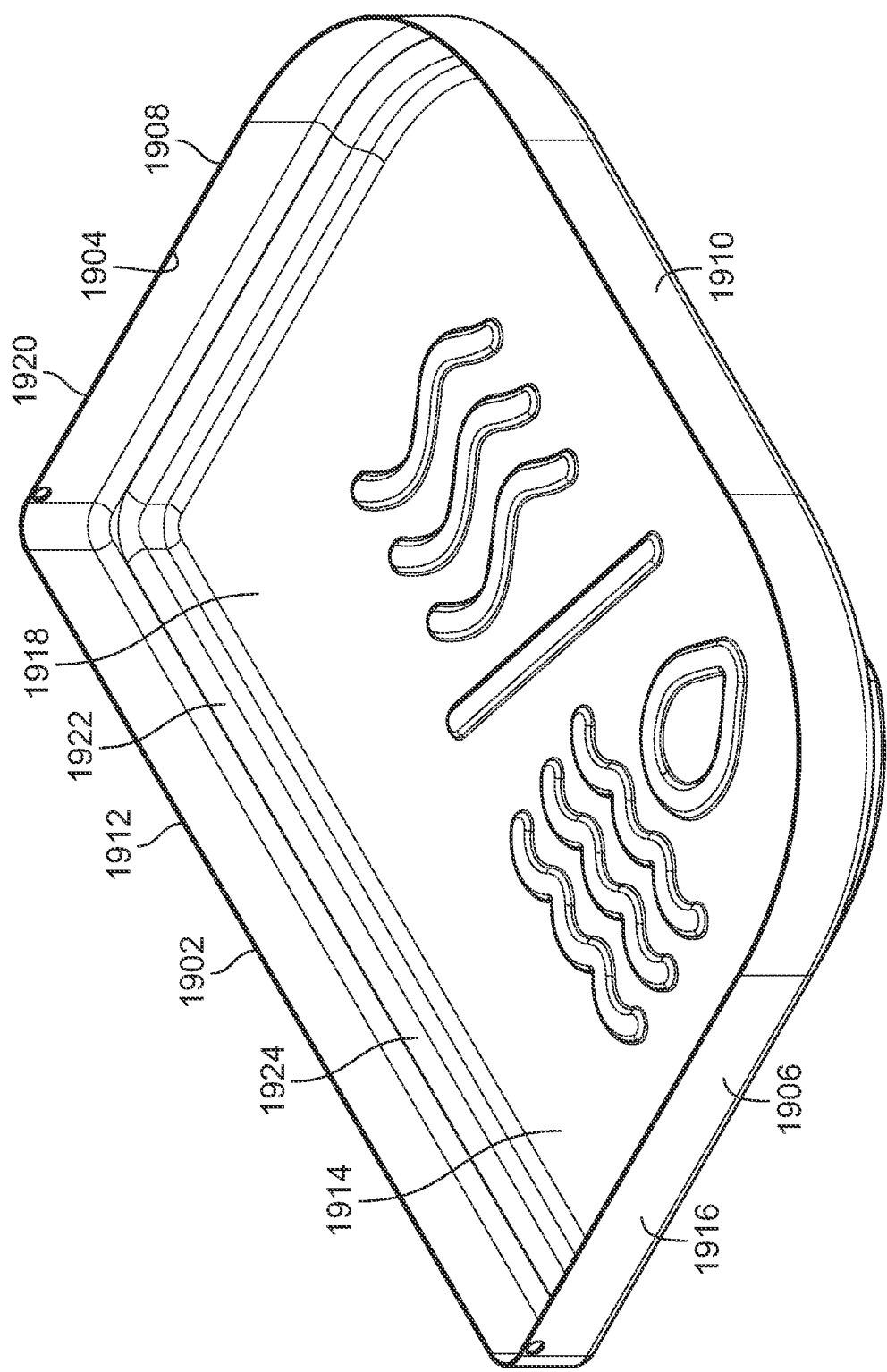
FIG. 19 is a perspective view of an example water pan.
Figure 20:
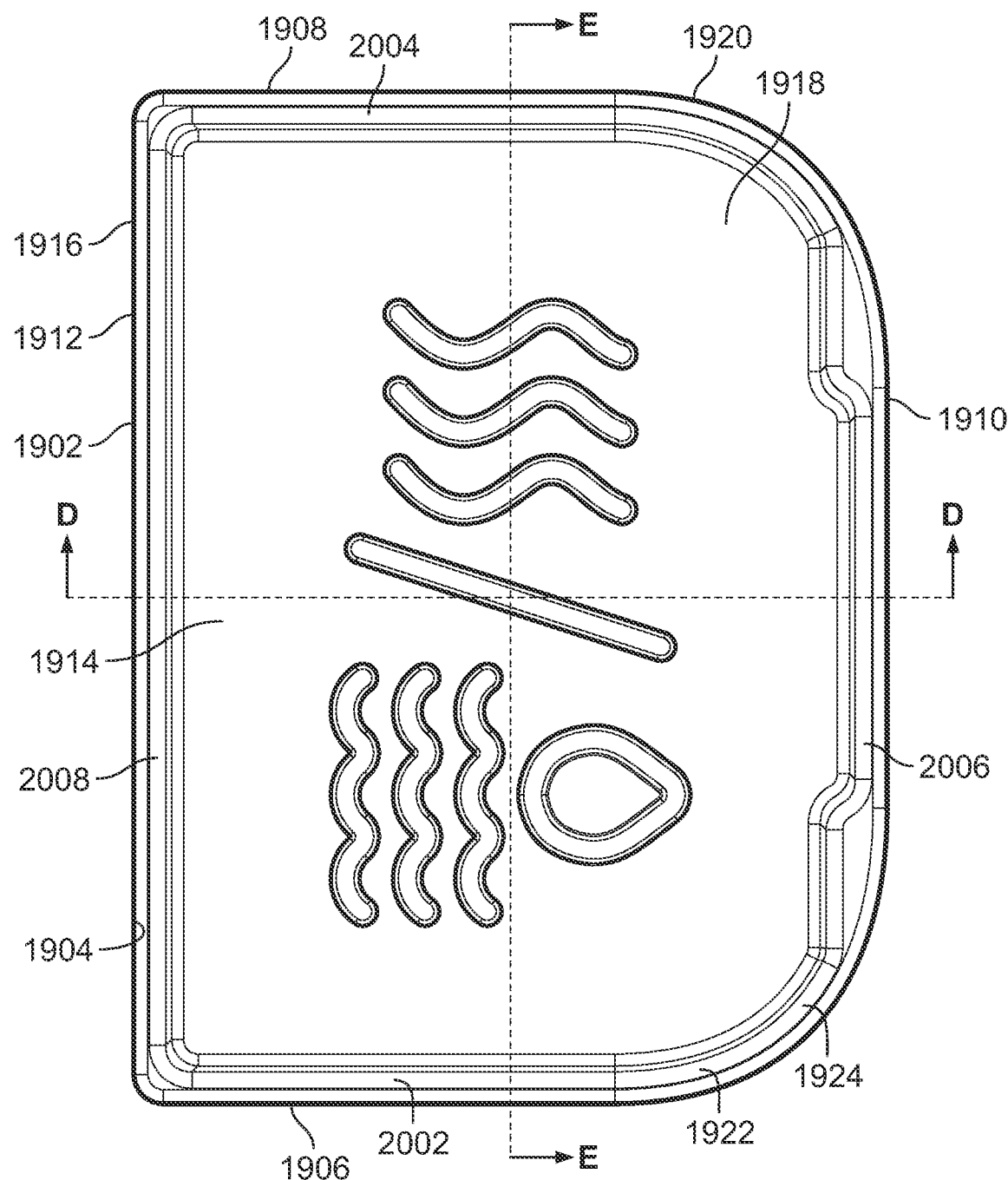
FIG. 20 is a top view of the water pan of FIG. 19.
Figure 21:
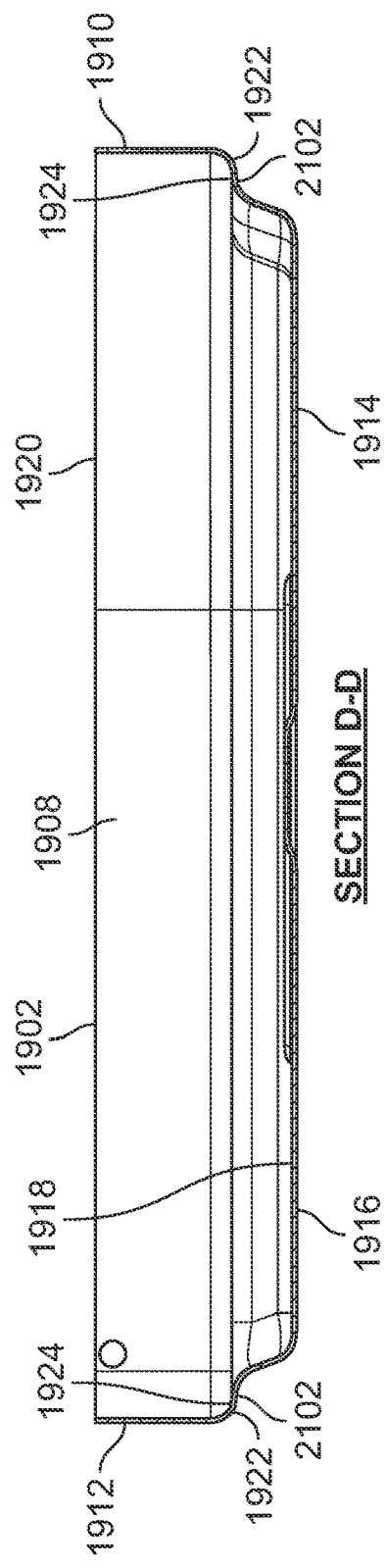
FIG. 21 is a cross-sectional view of the water pan of FIGS. 19 and 20 taken along section D-D of FIG. 20.
Figure 22:
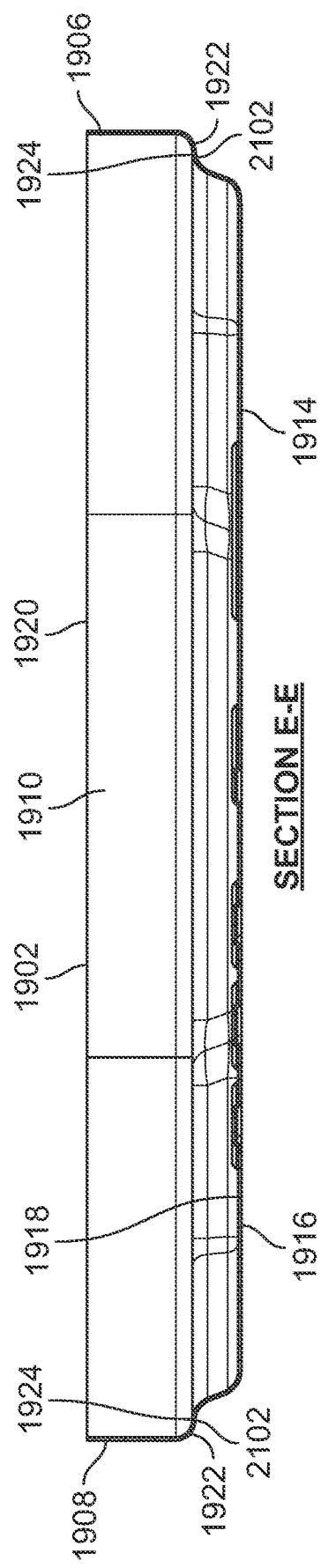
FIG. 22 is a cross-sectional view of the water pan of FIGS. 19-21 taken along section E-E of FIG. 20.

FIG. 19 is a perspective view of an example water pan 1902. FIG. 20 is a top view of the water pan 1902 of FIG. 19. FIG. 21 is a cross-sectional view of the water pan 1902 of FIGS. 19 and 20 taken along section D-D of FIG. 20. FIG. 22 is a cross-sectional view of the water pan 1902 of FIGS. 19-21 taken along section E-E of FIG. 20. The water pan 1902 of FIGS. 19-22 is configured to be filled with and/or to hold fluid (e.g., water). Fluid held within the water pan 1902 advantageously produces humidity and/or steam when the water pan 1902 is heated by the heating element 802 of the portable grill 100. The water pan 1902 can be of any configuration suitable for holding and/or containing fluid. In this regard, an upper portion (e.g., an upper rim) of the water pan 1902 circumscribes and/or defines an example upper opening 1904 having a configuration suitable to allow fluid to be added to the water pan 1902, and/or suitable to allow a steam tray to be inserted within (e.g., nested within) the water pan 1902.

In the illustrated example of FIGS. 19-22, the water pan 1902 has a generally box-shaped configuration (e.g., a box having curved and/or contoured corners) including and/or defined by an example front wall 1906, an example rear wall 1908 located opposite the front wall 1906, an example right sidewall 1910 extending between the front wall 1906 and the rear wall 1908, an example left sidewall 1912 located opposite the right sidewall 1910 and extending between the front wall 1906 and the rear wall 1908, and an example bottom wall 1914 extending inwardly from and/or between one or more of the front wall 1906, the rear wall 1908, the right sidewall 1910, and/or the left sidewall 1912.

The water pan 1902 of FIGS. 19-22 is a single-walled structure having an example exterior surface 1916 (e.g., including and/or defined by an exterior surface of the front wall 1906, an exterior surface of the rear wall 1908, an exterior surface of the right sidewall 1910, an exterior surface of the left sidewall 1912, and/or an exterior surface of the bottom wall 1914), and an example interior surface 1918 (e.g., including and/or defined by an interior surface of the front wall 1906, an interior surface of the rear wall 1908, an interior surface of the right sidewall 1910, an interior surface of the left sidewall 1912, and/or an interior surface of the bottom wall 1914) located opposite the exterior surface 1916.

As shown in FIGS. 19-22, the water pan 1902 further includes an example upper rim 1920 that circumscribes and/or defines the upper opening 1904 of the water pan 1902. The water pan 1902 further includes an example step 1922 (e.g., a ledge) formed along and/or by the both the exterior surface 1916 and the interior surface 1918 of the water pan 1902. As further shown in FIGS. 19-22, an example upper surface 1924 of the step 1922 is located below the upper rim 1920 of the water pan 1902 and above the bottom wall 1914 of the water pan 1902, with the upper surface 1924 of the step 1922 extending inwardly (e.g., radially inwardly) relative to the upper rim 1920 of the water pan 1902. The upper surface 1924 of the step 1922 of the water pan 1902 is accordingly located below the upper rim 1920 of the water pan 1902 and above the bottom wall 1914 of the water pan 1902, with the upper rim 1920 of the water pan 1902 circumscribing the upper surface 1924 of the step 1922. As further shown in FIGS. 21 and 22, an example lower surface 2102 of the step 1922 (e.g., facing opposite the upper surface 1924 of the step 1922) is also located below the upper rim 1920 of the water pan 1902 and above the bottom wall 1914 of the water pan 1902, with the lower surface 2102 of the step 1922 extending inwardly (e.g., radially inwardly) relative to the upper rim 1920 of the water pan 1902. The lower surface 2102 of the step 1922 of the water pan 1902 is accordingly located below the upper rim 1920 of the water pan 1902 and above the bottom wall 1914 of the water pan 1902, with the upper rim 1920 of the water pan 1902 circumscribing the lower surface 2102 of the step 1922.

In the illustrated example of FIGS. 19-22, the step 1922 is implemented as a continuous structure that extends circumferentially along the interior surface 1918 of the water pan 1902. In other examples, the step 1922 can instead be implemented by a plurality of discrete steps that are circumferentially spaced apart from one another about the interior surface 1918 of the water pan 1902. The step 1922 and/or step(s) of the water pan 1902 can be of configuration suitable for: (1) supporting the water pan 1902 within the cookbox 102 and/or the cooking chamber 804 of the portable grill 100 at a position above the heating element 802 of the portable grill 100; and (2) supporting a steam tray within the water pan 1902. For example, as shown in FIGS. 20-22, the step 1922 includes an example front portion 2002, an example rear portion 2004, an example right side portion 2006, and an example left side portion 2008, all of which are located above the bottom wall 1914 of the water pan 1902. The front portion 2002 of the step 1922 of the water pan 1902 is configured to: (1) be supported by the front portion 902 of the step 814 of the cookbox 102 such that lower surface 2102 of the front portion 2002 of the step 1922 of the water pan 1902 is seated on (e.g., in face-to-face contact with) the upper surface 816 of the front portion 902 of the step 814 of the cookbox 102; and (2) support one or more front portion(s) of a steam tray such that one or more lower surface(s) of the front portion(s) of the steam tray is/are seated on (e.g., in face-to-face contact with) the upper surface 1924 of the front portion 2002 of the step 1922 of the water pan 1902. The rear portion 2004 of the step 1922 of the water pan 1902 is configured to: (1) be supported by the rear portion 904 of the step 814 of the cookbox 102 such that lower surface 2102 of the rear portion 2004 of the step 1922 of the water pan 1902 is seated on (e.g., in face-to-face contact with) the upper surface 816 of the rear portion 904 of the step 814 of the cookbox 102; and (2) support one or more rear portion(s) of a steam tray such that one or more lower surface(s) of the rear portion(s) of the steam tray is/are seated on (e.g., in face-to-face contact with) the upper surface 1924 of the rear portion 2004 of the step 1922 of the water pan 1902.

As further shown in FIGS. 20-22, the right side portion 2006 of the step 1922 of the water pan 1902 is configured to: (1) be supported by the right side portion 906 of the step 814 of the cookbox 102 such that lower surface 2102 of the right side portion 2006 of the step 1922 of the water pan 1902 is seated on (e.g., in face-to-face contact with) the upper surface 816 of the right side portion 906 of the step 814 of the cookbox 102; and (2) support one or more right side portion(s) of a steam tray such that one or more lower surface(s) of the right side portion(s) of the steam tray is/are seated on (e.g., in face-to-face contact with) the upper surface 1924 of the right side portion 2006 of the step 1922 of the water pan 1902. The left side portion 2008 of the step 1922 of the water pan 1902 is configured to support one or more left side portion(s) of a steam tray such that one or more lower surface(s) of the left side portion(s) of the steam tray is/are seated on (e.g., in face-to-face contact with) the upper surface 1924 of the left side portion 2008 of the step 1922 of the water pan 1902.

Figure 23:
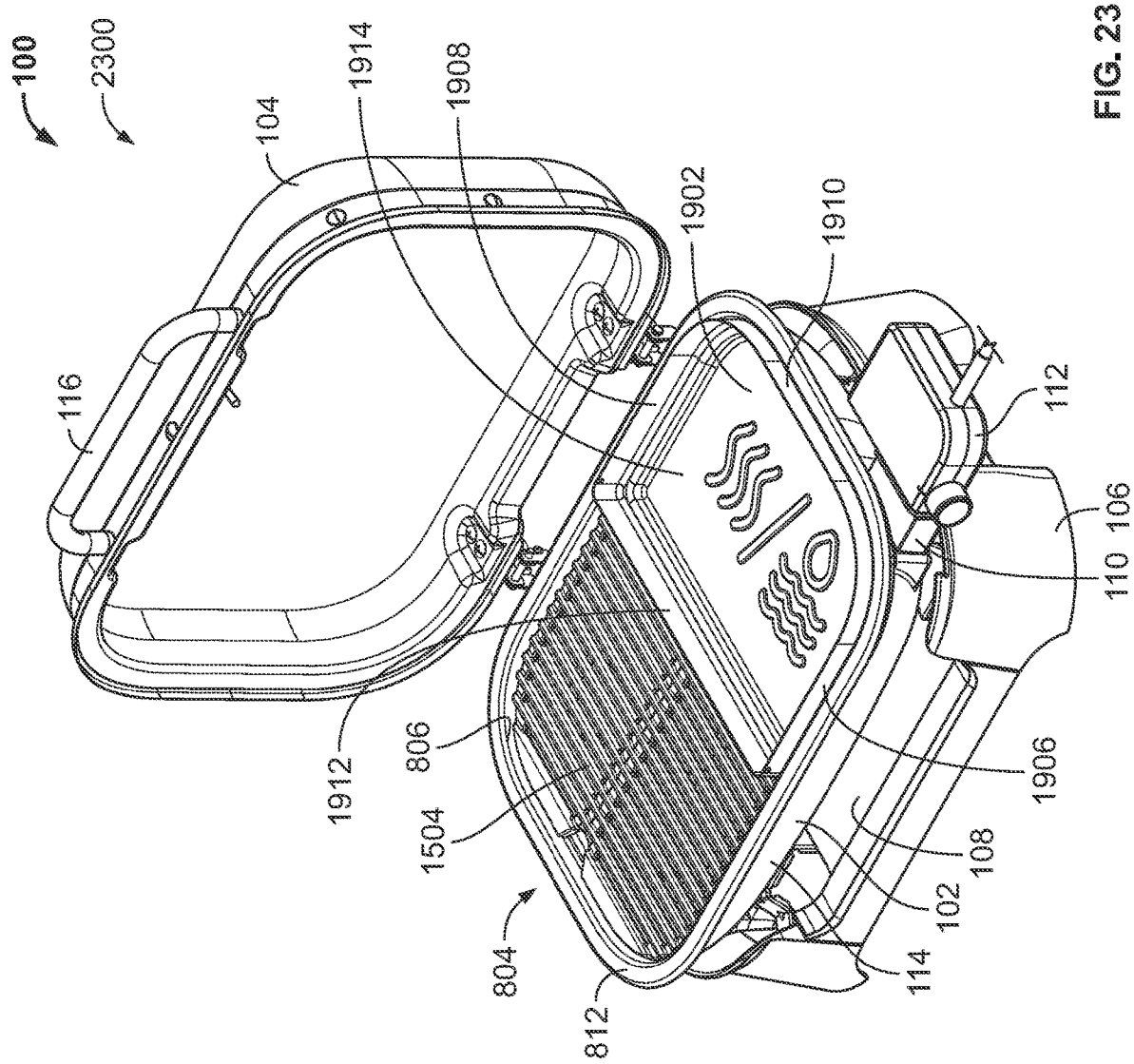
FIG. 23 is a perspective view of the portable grill of FIGS. 1-11, with the lid of the portable grill shown in the open position, and with the cookbox of the portable grill shown arranged in an example third cookbox configuration.
Figure 24:
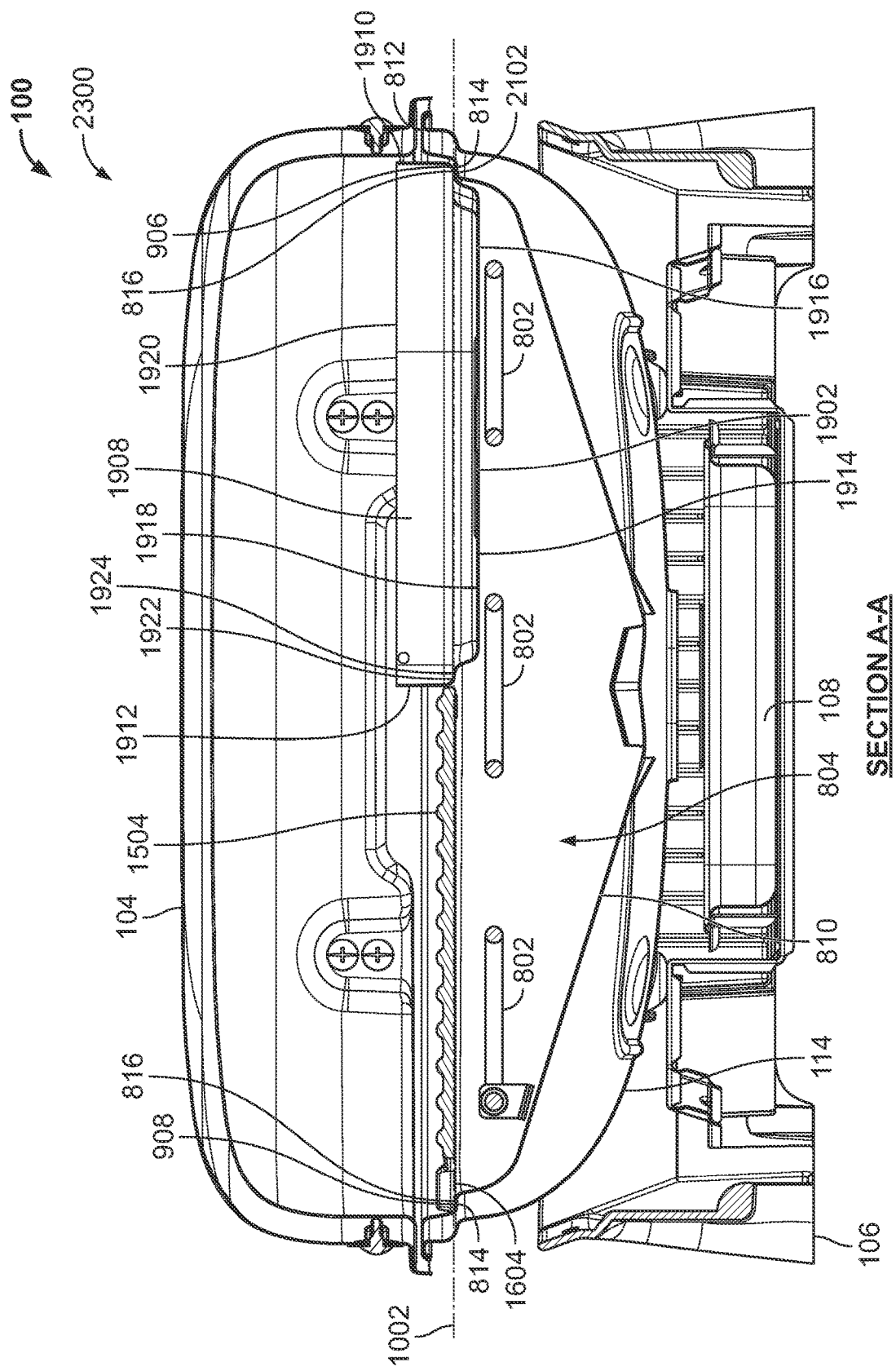
FIG. 24 is a cross-sectional view of the portable grill of FIGS. 1-11 taken along section A-A of FIG. 6, with the lid of the portable grill shown in the closed position, and with the cookbox of the portable grill shown arranged in the third cookbox configuration of FIG. 23.

FIG. 23 is a perspective view of the portable grill 100 of FIGS. 1-11, with the lid 104 of the portable grill 100 shown in the open position, and with the cookbox 102 of the portable grill 100 shown arranged in an example third cookbox configuration 2300. FIG. 24 is a cross-sectional view of the portable grill 100 of FIGS. 1-11 taken along section A-A of FIG. 6, with the lid 104 of the portable grill 100 shown in the closed position, and with the cookbox 102 of the portable grill 100 shown arranged in the third cookbox configuration 2300 of FIG. 23. When arranged in the third cookbox configuration 2300 shown in FIGS. 23 and 24, the cookbox 102 and/or the cooking chamber 804 of the portable grill 100 includes the water pan 1902 and the second grilling grate 1504, both of which are located above the heating element 802 of the portable grill 100. In the illustrated example of FIGS. 23 and 24, the water pan 1902 and the second grilling grate 1504 are configured in a side-by-side arrangement within the cookbox 102, with the water pan 1902 and the second grilling grate 1504 collectively filling and/or occupying the substantial entirety of the horizontal plane 1002 of the cookbox 102 that is defined by the upper surface 816 of the step 814 formed along the interior wall 810 of the cookbox 102. The water pan 1902 and/or the second grilling grate 1504 of FIGS. 23 and 24 can be removed (e.g., manually removed, by a user of the portable grill 100) from the cookbox 102 to facilitate transitioning the cookbox 102 from the third cookbox configuration 2300 of FIGS. 23 and 24 to a different cookbox configuration, as further described below.

The third cookbox configuration 2300 of FIGS. 23 and 24 differs from the second cookbox configuration 1700 of FIGS. 17 and 18 in that the cookbox 102 includes the water pan 1902 when arranged in the third cookbox configuration 2300, but does not include the water pan 1902 when arranged in the second cookbox configuration 1700. The cookbox 102 can be transitioned from the second cookbox configuration 1700 of FIGS. 17 and 18 into the third cookbox configuration 2300 of FIGS. 23 and 24 by introducing the water pan 1902 into the cookbox 102, and by thereafter lowering (e.g., manually lowering, by a user of the portable grill 100) the water pan 1902 into its seated position on the upper surface 816 of the step 814 of the cookbox 102. Adding the water pan 1902 into the cookbox 102 results in an open space and/or area (e.g., the right half of the cookbox 102 existing along the horizontal plane 1002) being substantially filled and/or occupied by the water pan 1902. The water pan 1902 is accordingly interchangeable with the first grilling grate 1502 shown in the first cookbox configuration 1500 of FIGS. 15 and 16.

In the illustrated example of FIGS. 23 and 24, the water pan 1902 substantially fills and/or occupies (e.g., along the horizontal plane 1002) the right half of the cookbox 102, and the second grilling grate 1504 substantially fills and/or occupies (e.g., along the horizontal plane 1002) the left half of the cookbox 102. In other examples, the water pan 1902 can be configured to substantially fill and/or occupy (e.g., along the horizontal plane 1002) more than half (e.g., two thirds) of the cookbox 102, and the second grilling grate 1504 can be configured to substantially fill and/or occupy (e.g., along the horizontal plane 1002) less than half (e.g., one third) of the cookbox 102. In still other examples, the water pan 1902 can be configured to substantially fill and/or occupy (e.g., along the horizontal plane 1002) less than half (e.g., one third) of the cookbox 102, and the second grilling grate 1504 can be configured to substantially fill and/or occupy (e.g., along the horizontal plane 1002) more than half (e.g., two thirds) of the cookbox 102 and/or the cooking chamber 804.

In the illustrated example of FIGS. 23 and 24, the water pan 1902 is seated on the upper surface 816 of the step 814 of the cookbox 102. More specifically, the lower surface 2102 of the front portion 2002 of the step 1922 of the water pan 1902 is seated on (e.g., in face-to-face contact with) the upper surface 816 of the front portion 902 of the step 814 of the cookbox 102, the lower surface 2102 of the rear portion 2004 of the step 1922 of the water pan 1902 is seated on (e.g., in face-to-face contact with) the upper surface 816 of the rear portion 904 of the step 814 of the cookbox 102, and the lower surface 2102 of the right side portion 2006 of the step 1922 of the water pan 1902 is seated on (e.g., in face-to-face contact with) the upper surface 816 of the right side portion 906 of the step 814 of the cookbox 102. In other examples, the lower surface 2102 of the front portion 2002 of the step 1922 of the water pan 1902 can be configured to be seated on (e.g., in face-to-face contact with) the upper surface 816 of the front portion 902 of the step 814 of the cookbox 102, and the lower surface 2102 of the rear portion 2004 of the step 1922 of the water pan 1902 can be configured to be seated on (e.g., in face-to-face contact with) the upper surface 816 of the rear portion 904 of the step 814 of the cookbox 102, without the lower surface 2102 of the right side portion 2006 of the step 1922 of the water pan 1902 being configured to be seated on (e.g., in face-to-face contact with) the upper surface 816 of the right side portion 906 of the step 814 of the cookbox 102.

Figure 25:
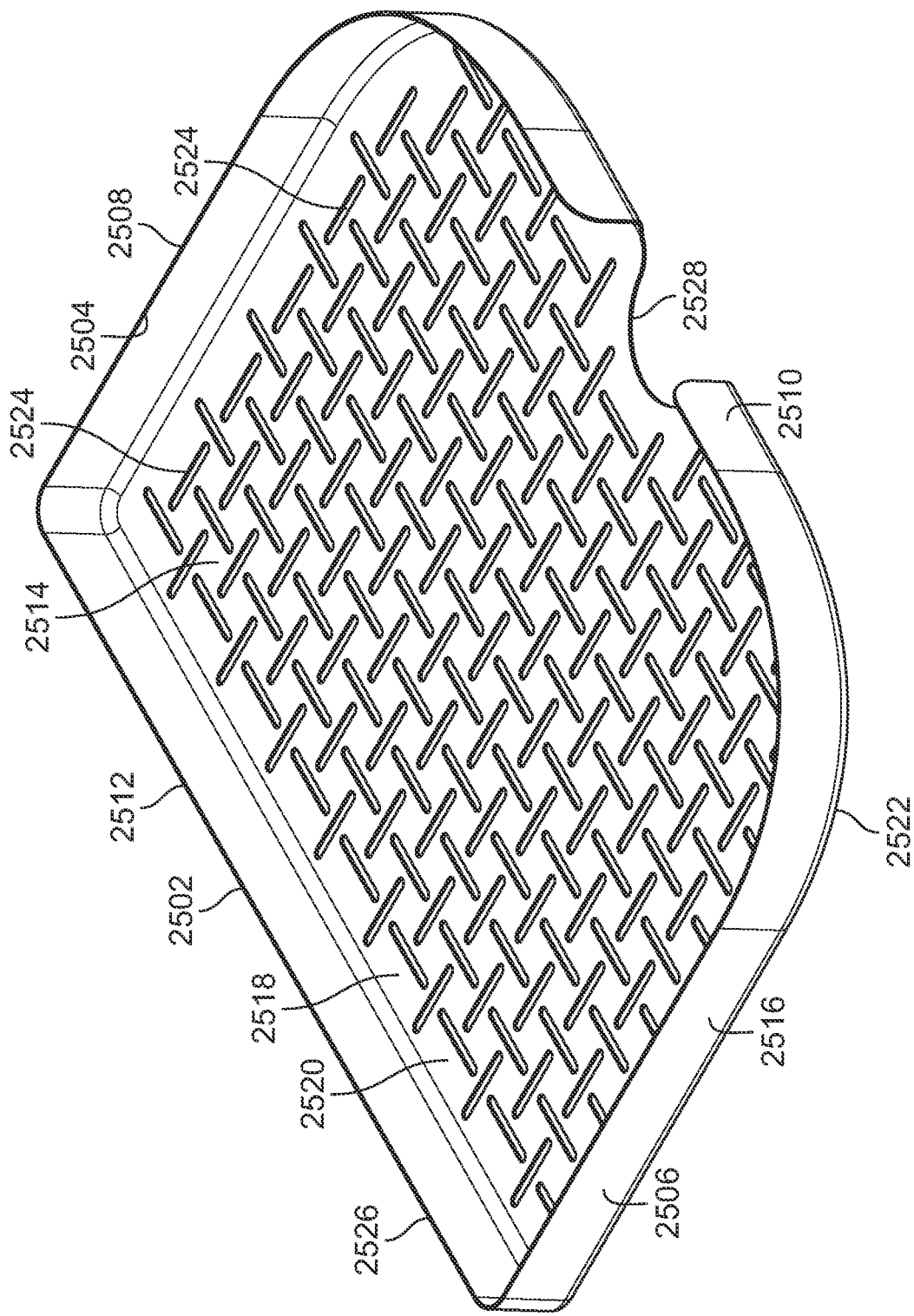
FIG. 25 is a first perspective view of an example steam tray.
Figure 26:
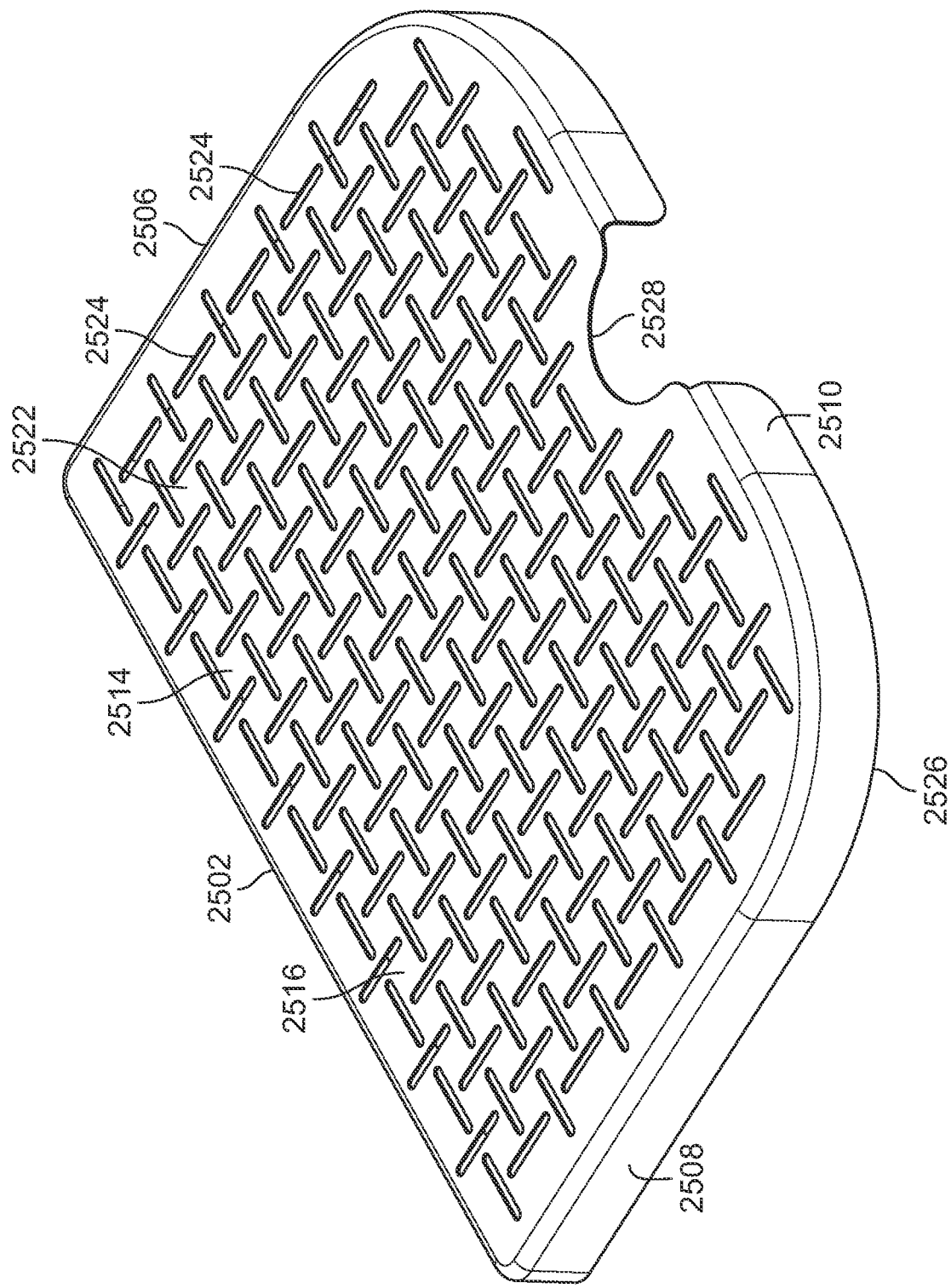
FIG. 26 is a second perspective view of the steam tray of FIG. 25.

FIG. 25 is a first perspective view of an example steam tray 2502. FIG. 26 is a second perspective view of the steam tray 2502 of FIG. 25. The steam tray 2502 of FIGS. 25 and 26 is configured to support and/or hold one or more item(s) of food above and/or over the bottom wall 1914 of the water pan 1902 to facilitate steaming of the item(s) of food in response to the production of humidity and/or steam when the water pan 1902 is filled with fluid and heated by the heating element 802 of the portable grill 100. The steam tray 2502 can be of any configuration suitable for supporting and/or holding one or more item(s) of food. In this regard, a portion (e.g., a rim) of the steam tray 2502 circumscribes and/or defines an example opening 2504 having a configuration suitable to allow one or more item(s) of food to be added to the steam tray 2502.

In the illustrated example of FIGS. 25 and 26, the steam tray 2502 has a generally box-shaped configuration (e.g., a box having curved and/or contoured corners) including and/or defined by an example front wall 2506, an example rear wall 2508 located opposite the front wall 2506, an example right sidewall 2510 extending between the front wall 2506 and the rear wall 2508, an example left sidewall 2512 located opposite the right sidewall 2510 and extending between the front wall 2506 and the rear wall 2508, and an example support wall 2514 (e.g., a horizontally-oriented wall) extending inwardly from and/or between one or more of the front wall 2506, the rear wall 2508, the right sidewall 2510, and/or the left sidewall 2512.

The steam tray 2502 of FIGS. 25 and 26 is a single-walled structure having an example exterior surface 2516 (e.g., including and/or defined by an exterior surface of the front wall 2506, an exterior surface of the rear wall 2508, an exterior surface of the right sidewall 2510, an exterior surface of the left sidewall 2512, and/or an exterior surface of the support wall 2514), and an example interior surface 2518 (e.g., including and/or defined by an interior surface of the front wall 2506, an interior surface of the rear wall 2508, an interior surface of the right sidewall 2510, an interior surface of the left sidewall 2512, and/or an interior surface of the support wall 2514) located opposite the exterior surface 2516. The support wall 2514 of the steam tray 2502 includes an example first surface 2520 (e.g., defined by a portion of the interior surface 2518 of the steam tray 2502), an example second surface 2522 (e.g., defined by a portion of the exterior surface 2516 of the steam tray 2502), and a plurality of openings 2524 (e.g., holes and/or slots) extending from the first surface 2520 of the support wall 2514 through to the second surface 2522 of the support wall 2514. The openings 2524 formed in the support wall 2514 of the steam tray 2502 are configured to facilitate the passage of humidity and/or steam from the water pan 1902 through the support wall 2514 of the steam tray 2502.

As shown in FIGS. 25 and 26, the steam tray 2502 further includes an example rim 2526 that circumscribes and/or defines the opening 2504 of the steam tray 2502. The rim 2526 and/or the support wall 2514 of the steam tray includes an example cutout 2528 (e.g., a notch) that is configured to facilitate reorienting (e.g., manually reversing, by a user of the portable grill 100) the steam tray 2502 relative to the water pan 1902. In this regard, the steam tray 2502 is configured to be positioned within (e.g., nested within) the water pan 1902 in two different orientations that are reversible relative to one another, and which result in the support wall 2514 of the steam tray 2502 being positioned at two different distances (e.g., two different heights) relative to the bottom wall 1914 of the water pan 1902 and/or relative to the heating element 802 of the portable grill 100.

In a first orientation (e.g., a "rim up" orientation) of the steam tray 2502, the first surface 2520 of the support wall 2514 of the steam tray 2502 faces away from the interior surface of the bottom wall 1914 of the water pan 1902, the second surface 2522 of the steam tray 2502 faces toward the interior surface of the bottom wall 1914 of the water pan 1902, and the rim 2526 of the steam tray 2502 is oriented in a same direction (e.g., upwardly) as the upper rim 1920 of the water pan 1902. The steam tray 2502 is configured such that one or more peripheral portion(s) of the second surface 2522 of the support wall 2514 of the steam tray 2502 will be seated on (e.g., in face-to-face contact with) the upper surface 1924 of one or more of the front portion 2002, the rear portion 2004, the right side portion 2006, and/or the left side portion 2008 of the step 1922 of the water pan 1902 when the steam tray 2502 is positioned within (e.g., nested within) the water pan 1902 in the first orientation described above.

In a second orientation (e.g., a "rim down" orientation) of the steam tray 2502, the first surface 2520 of the support wall 2514 of the steam tray 2502 faces toward the interior surface of the bottom wall 1914 of the water pan 1902, the second surface 2522 of the support wall 2514 faces away from the interior surface of the bottom wall 1914 of the water pan 1902, and the rim 2526 of the steam tray 2502 is oriented in a direction (e.g., downwardly) opposite that of the upper rim 1920 of the water pan 1902. The steam tray 2502 is configured such that one or more portion(s) of the rim 2526 of the steam tray 2502 will be seated on (e.g., in face-to-face contact with) the upper surface 1924 of one or more of the front portion 2002, the rear portion 2004, the right side portion 2006, and/or the left side portion 2008 of the step 1922 of the water pan 1902 when the steam tray 2502 is positioned within (e.g., nested within) the water pan 1902 in the second orientation described above.

Positioning the steam tray 2502 in the first orientation within the water pan 1902 results in the support wall 2514 being spaced from the bottom wall 1914 of the water pan 1902 by a first distance (e.g., the first distance "D1", as shown in FIGS. 29 and 30). In this regard, positioning the steam tray 2502 in the first orientation within the water pan 1902 results in the support wall 2514 having a relatively lower vertical position within the water pan 1902, such that the support wall 2514 is located relatively closer to the heating element 802 of the portable grill 100. By contrast, positioning the steam tray 2502 in the second orientation within the water pan 1902 results in the support wall 2514 being spaced from the bottom wall 1914 of the water pan 1902 by a second distance (e.g., the second distance "D2", as shown in FIGS. 35 and 36) that is greater than the first distance. In this regard, positioning the steam tray 2502 in the second orientation within the water pan 1902 results in the support wall 2514 having a relatively higher vertical position within the water pan 1902, such that the support wall 2514 is located relatively further away from the heating element 802 of the portable grill 100.

When the steam tray 2502 is positioned within the water pan 1902 in the first orientation, one or more item(s) of food can be placed directly on the first surface 2520 of the support wall 2514 of the steam tray 2502 to facilitate steaming the item(s) of food in response to the production of humidity and/or steam when the water pan 1902 is filled with fluid and heated by the heating element 802 of the portable grill 100. In some examples, the front wall 2506, the rear wall 2508, the right sidewall 2510, and/or the left sidewall 2512 of the steam tray 2502 form a vertical boundary that advantageously prevents the item(s) of food from falling off of the first surface 2520 of the support wall 2514 and/or, more generally, from falling out of the steam tray 2502 while the item(s) of food is/are being steamed. In some examples, the water pan 1902 is to be filled with fluid to a level not exceeding the upper surface 1924 of the step 1922 of the water pan 1902 when the stream tray 2502 is positioned in the first orientation.

When the steam tray 2502 is positioned within the water pan 1902 in the second orientation, one or more item(s) of food can be placed directly on the second surface 2522 of the support wall 2514 of the steam tray 2502 to facilitate steaming the item(s) of food in response to the production of humidity and/or steam when the water pan 1902 is filled with fluid and heated by the heating element 802 of the portable grill 100. In some examples, the water pan 1902 is to be filled with fluid to a level exceeding the upper surface 1924 of the step 1922 of the water pan 1902 but not exceeding the upper rim 1920 of the water pan 1902 when the stream tray 2502 is positioned in the second orientation. In other examples, the water pan 1902 is instead to be filled with fluid to a level not exceeding the upper surface 1924 of the step 1922 of the water pan 1902 when the stream tray 2502 is positioned in the second orientation, thereby resulting in an increased distance between the support wall 2514 of the steam tray 2502 and the fluid contained in the water pan 1902.

Figure 27:
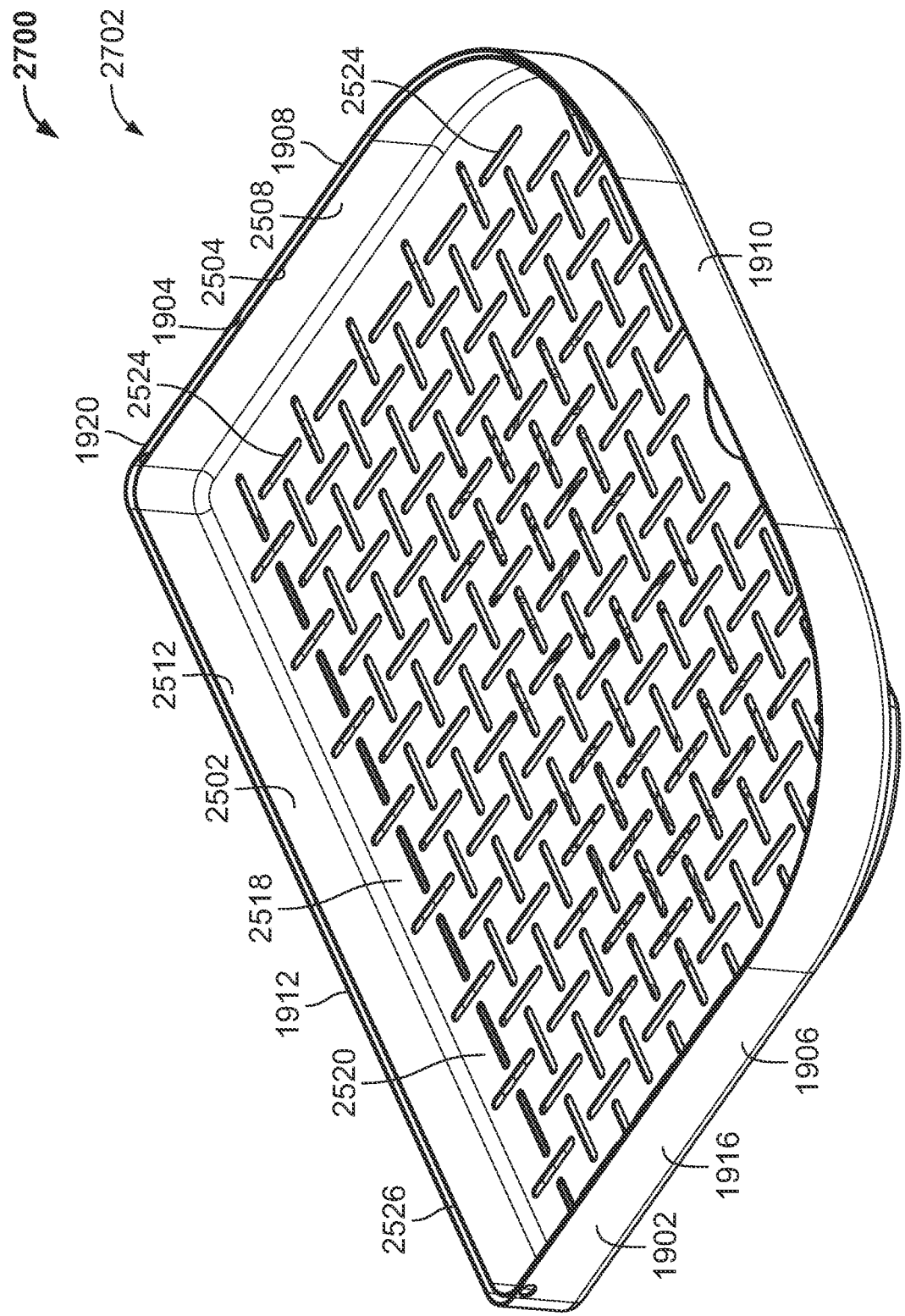
FIG. 27 is a perspective view of an example steam tray assembly, with the steam tray assembly shown arranged in an example first steam tray configuration.
Figure 28:
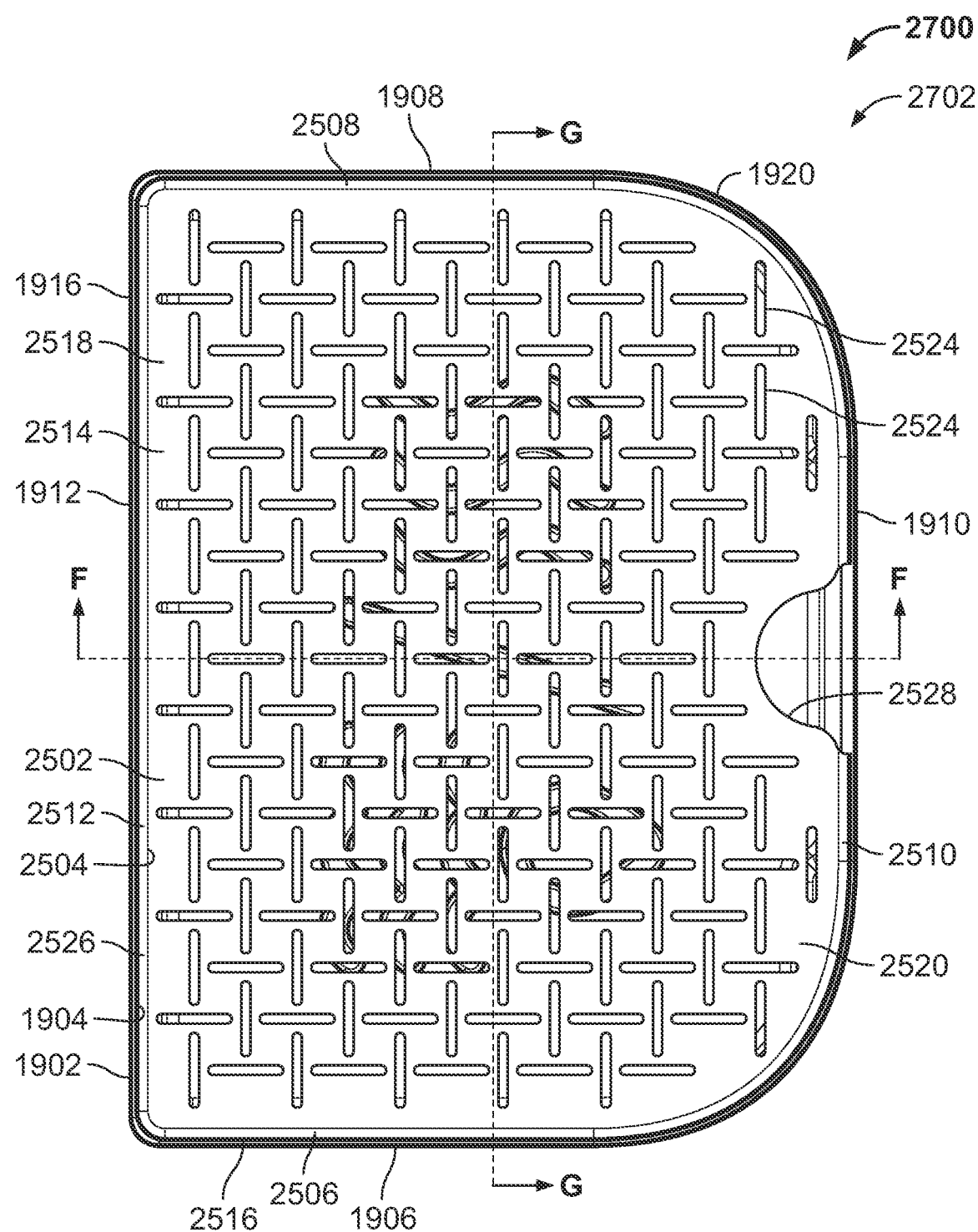
FIG. 28 is a top view of the steam tray assembly of FIG. 27, with the steam tray assembly shown arranged in the first steam tray configuration of FIG. 27.

FIG. 27 is a perspective view of an example steam tray assembly 2700, with the steam tray assembly 2700 shown arranged in an example first steam tray configuration 2702. FIG. 28 is a top view of the steam tray assembly 2700 of FIG. 27, with the steam tray assembly 2700 shown arranged in the first steam tray configuration 2702 of FIG. 27. FIG. 29 is a cross-sectional view of the steam tray assembly 2700 of FIGS. 27 and 28 taken along section F-F of FIG. 28, with the steam tray assembly 2700 shown arranged in the first steam tray configuration 2702 of FIGS. 27 and 28. FIG. 30 is a cross-sectional view of the steam tray assembly 2700 of FIGS. 27-29 taken along section G-G of FIG. 28, with the steam tray assembly 2700 shown arranged in the first steam tray configuration 2702 of FIGS. 27-29. As shown in FIGS. 27-30, the steam tray assembly 2700 includes the water pan 1902 of FIGS. 19-24 and the steam tray 2502 of FIGS. 25 and 26, with the steam tray 2502 being positioned within (e.g., nested within) the water pan 1902 according to the first orientation (e.g., the "rim up" orientation) of the steam tray 2502 described above in connection with FIGS. 25 and 26.

As shown FIGS. 27-30, the first surface 2520 of the support wall 2514 of the steam tray 2502 faces away from the interior surface of the bottom wall 1914 of the water pan 1902, the second surface 2522 of the steam tray 2502 faces toward the interior surface of the bottom wall 1914 of the water pan 1902, and the rim 2526 of the steam tray 2502 is oriented in a same direction (e.g., upwardly) as the upper rim 1920 of the water pan 1902 when the steam tray assembly 2700 is arranged in the first steam tray configuration 2702 (e.g., when the steam tray 2502 is positioned within (e.g., nested within) the water pan 1902 in the first orientation described above). As further shown in FIGS. 27-30, one or more peripheral portion(s) of the second surface 2522 of the support wall 2514 of the steam tray 2502 is/are seated on (e.g., in face-to-face contact with) the upper surface 1924 of one or more of the front portion 2002, the rear portion 2004, the right side portion 2006, and/or the left side portion 2008 of the step 1922 of the water pan 1902 when the steam tray assembly 2700 is arranged in the first steam tray configuration 2702 (e.g., when the steam tray 2502 is positioned within (e.g., nested within) the water pan 1902 in the first orientation described above).

Arranging the steam tray assembly 2700 in the first steam tray configuration 2702 shown in FIGS. 27-30 results in the support wall 2514 being spaced from the bottom wall 1914 of the water pan 1902 by an example first distance ("D1", as shown in FIGS. 29 and 30). In this regard, arranging the steam tray assembly 2700 in the first steam tray configuration 2702 shown in FIGS. 27-30 results in the support wall 2514 having a relatively lower vertical position within the water pan 1902, such that the support wall 2514 will be located relatively closer to the heating element 802 of the portable grill 100.

When the steam tray assembly 2700 is arranged in the first steam tray configuration 2702 shown in FIGS. 27-30, one or more item(s) of food can be placed directly on the first surface 2520 of the support wall 2514 of the steam tray 2502 to facilitate steaming the item(s) of food in response to the production of humidity and/or steam when the water pan 1902 is filled with fluid and heated by the heating element 802 of the portable grill 100. In some examples, the front wall 2506, the rear wall 2508, the right sidewall 2510, and/or the left sidewall 2512 of the steam tray 2502 form a vertical boundary that advantageously prevents the item(s) of food from falling off of the first surface 2520 of the support wall 2514 and/or, more generally, from falling out of the steam tray 2502 while the item(s) of food is/are being steamed. In some examples, the water pan 1902 is to be filled with fluid to a level not exceeding the upper surface 1924 of the step 1922 of the water pan 1902 when the stream tray assembly 2700 is arranged in the first steam tray configuration 2702 shown in FIGS. 27-30.

Figure 32:
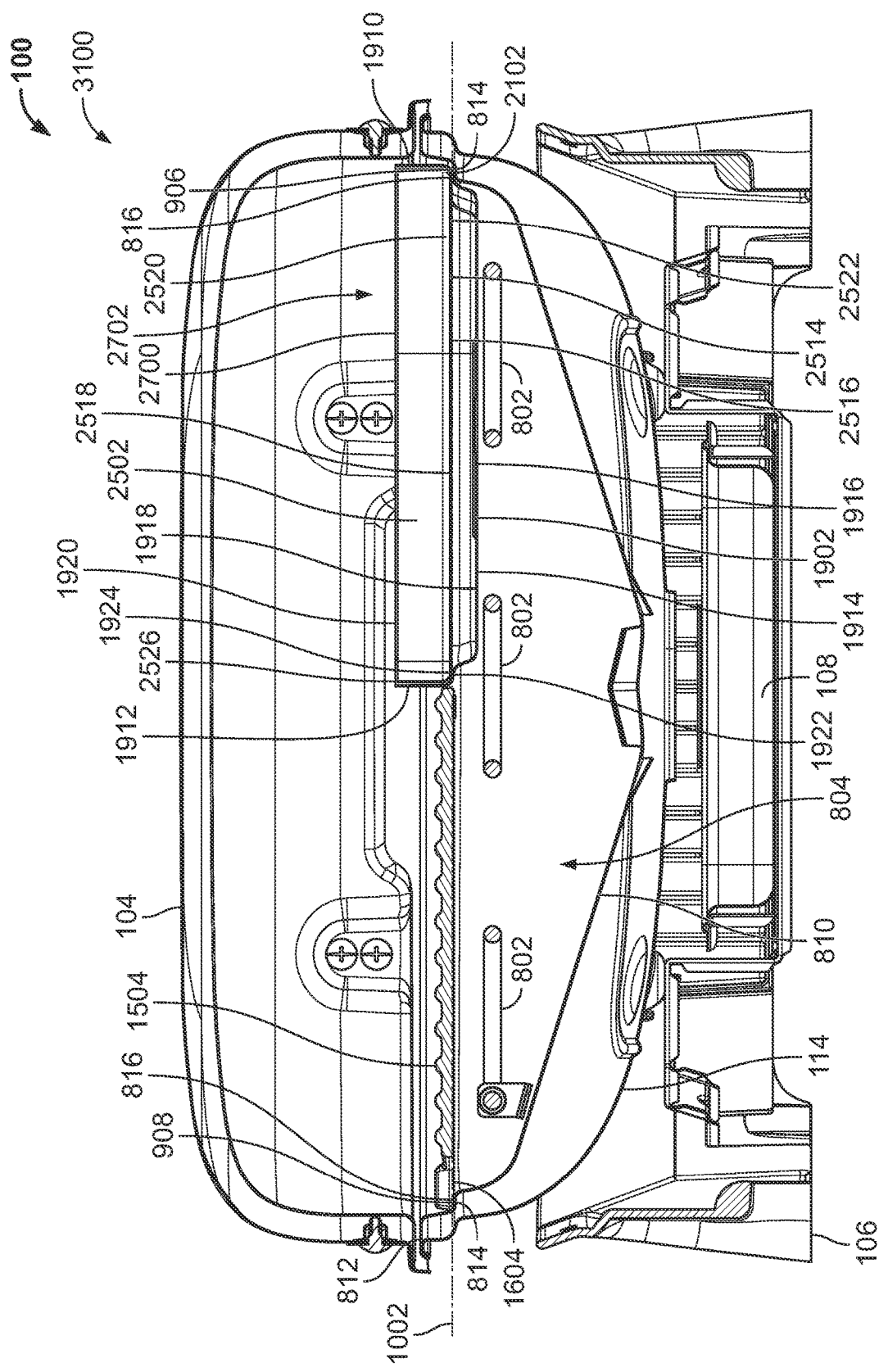
FIG. 32 is a cross-sectional view of the portable grill of FIGS. 1-11 taken along section A-A of FIG. 6, with the lid of the portable grill shown in the closed position, and with the cookbox of the portable grill shown arranged in the fourth cookbox configuration of FIG. 31.

FIG. 31 is a perspective view of the portable grill 100 of FIGS. 1-11, with the lid 104 of the portable grill 100 shown in the open position, and with the cookbox 102 of the portable grill 100 shown arranged in an example fourth cookbox configuration 3100. FIG. 32 is a cross-sectional view of the portable grill 100 of FIGS. 1-11 taken along section A-A of FIG. 6, with the lid 104 of the portable grill 100 shown in the closed position, and with the cookbox 102 of the portable grill 100 shown arranged in the fourth cookbox configuration 3100 of FIG. 31. When arranged in the fourth cookbox configuration 3100 shown in FIGS. 31 and 32, the cookbox 102 and/or the cooking chamber 804 of the portable grill 100 includes the steam tray 2502, the water pan 1902, and the second grilling grate 1504, all of which are located above the heating element 802 of the portable grill 100. In the illustrated example of FIGS. 31 and 32, the water pan 1902 and the second grilling grate 1504 are configured in a side-by-side arrangement within the cookbox 102, with the water pan 1902 and the second grilling grate 1504 collectively filling and/or occupying the substantial entirety of the horizontal plane 1002 of the cookbox 102 that is defined by the upper surface 816 of the step 814 formed along the interior wall 810 of the cookbox 102. The steam tray 2502 is positioned within (e.g., nested within) the water pan 1902 in an arrangement consistent with the first steam tray configuration 2702 of the steam tray assembly 2700 described above in connection with FIGS. 27-30.

The fourth cookbox configuration 3100 of FIGS. 31 and 32 differs from the third cookbox configuration 2300 of FIGS. 23 and 24 in that the cookbox 102 includes the steam tray 2502 (e.g., arranged in a first orientation relative to the water pan 1902) when arranged in the fourth cookbox configuration 3100, but does not include the steam tray 2502 when arranged in the third cookbox configuration 2300. The cookbox 102 can be transitioned from the third cookbox configuration 2300 of FIGS. 23 and 24 into the fourth cookbox configuration 3100 of FIGS. 31 and 32 by introducing the steam tray 2502 into the cookbox 102, and by thereafter lowering (e.g., manually lowering, by a user of the portable grill 100) the steam tray 2502 into its seated position on the upper surface 1924 of the step 1922 of the water pan 1902 according to the first orientation of the steam tray 2502 and/or the first steam tray configuration 2702 of the steam tray assembly 2700 described above.

In the illustrated example of FIGS. 31 and 32, the first surface 2520 of the support wall 2514 of the steam tray 2502 faces away from the interior surface of the bottom wall 1914 of the water pan 1902, the second surface 2522 of the steam tray 2502 faces toward the interior surface of the bottom wall 1914 of the water pan 1902, and the rim 2526 of the steam tray 2502 is oriented in a same direction (e.g., upwardly) as the upper rim 1920 of the water pan 1902. As further shown in FIGS. 31 and 32, one or more peripheral portion(s) of the second surface 2522 of the support wall 2514 of the steam tray 2502 is/are seated on (e.g., in face-to-face contact with) the upper surface 1924 of one or more of the front portion 2002, the rear portion 2004, the right side portion 2006, and/or the left side portion 2008 of the step 1922 of the water pan 1902. Arranging the steam tray assembly 2700 in the first steam tray configuration 2702 shown in FIGS. 31 and 32 results in the support wall 2514 having a relatively lower vertical position within the water pan 1902, such that the support wall 2514 is located relatively closer to the heating element 802 of the portable grill 100.

Figure 33:
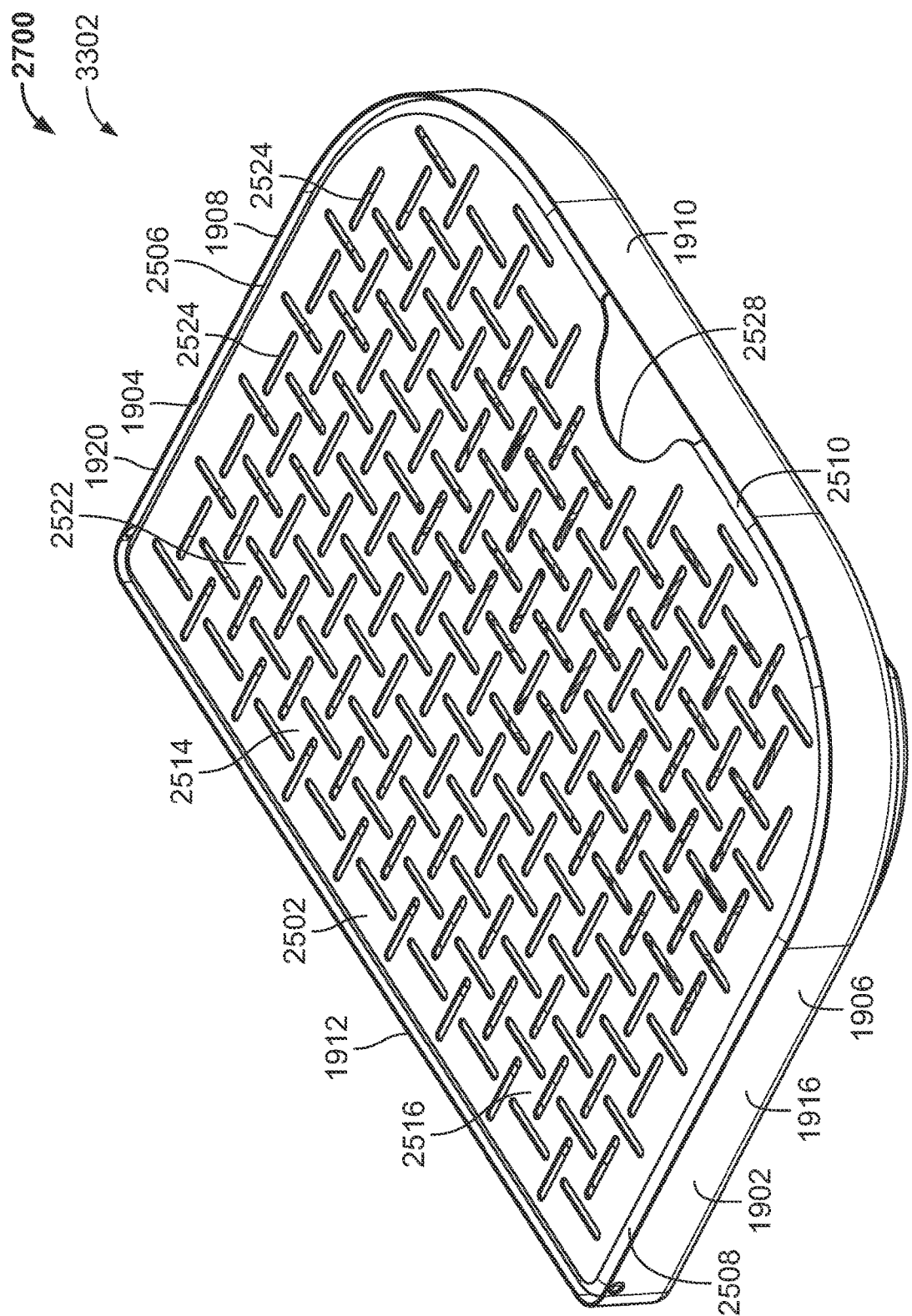
FIG. 33 is a perspective view of the steam tray assembly of FIGS. 27-32, with the steam tray assembly shown arranged in an example second steam tray configuration.
Figure 34:
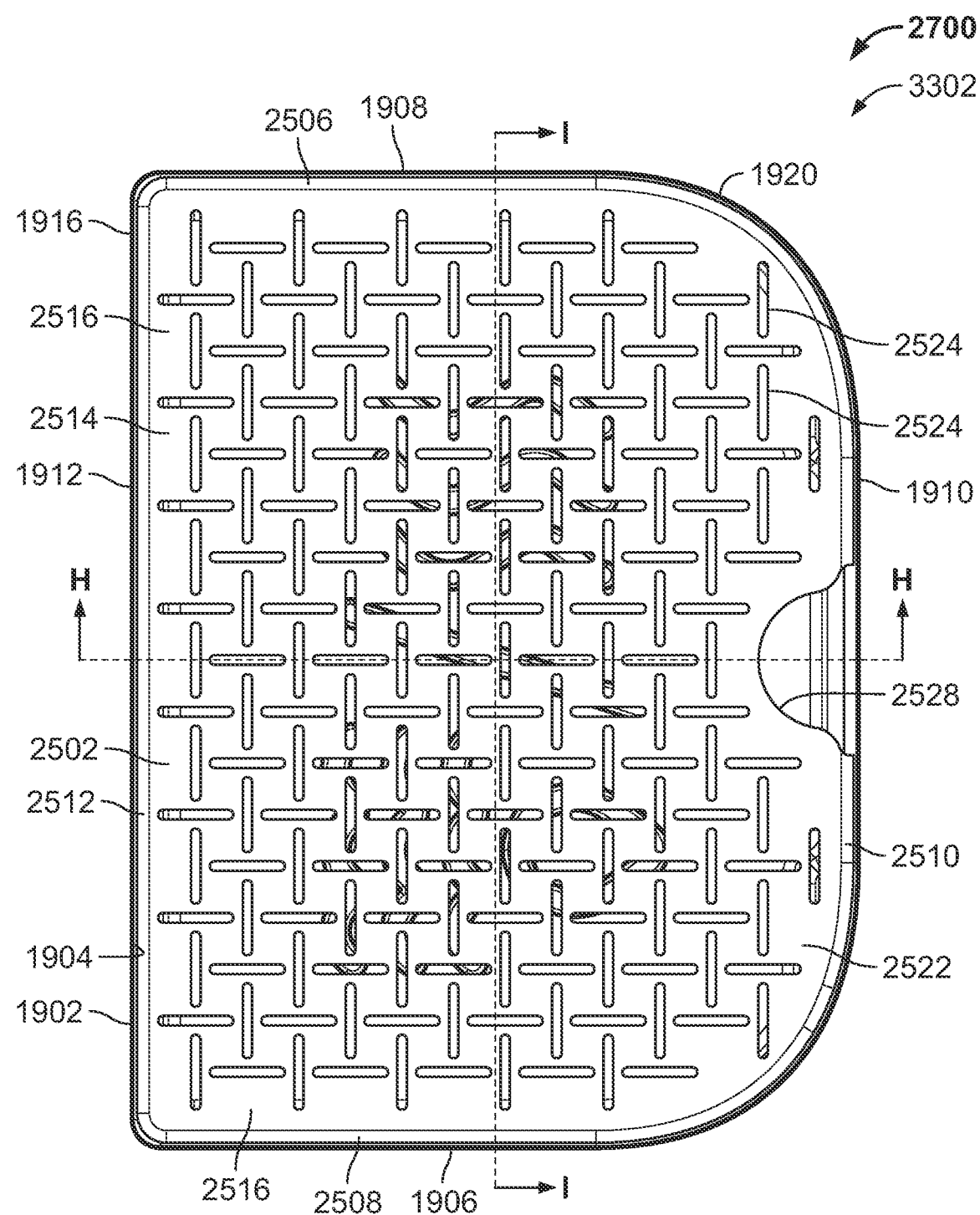
FIG. 34 is a top view of the steam tray assembly of FIGS. 27-33, with the steam tray assembly shown arranged in the second steam tray configuration of FIG. 33.

FIG. 33 is a perspective view of the steam tray assembly 2700 of FIGS. 27-32, with the steam tray assembly 2700 shown arranged in an example second steam tray configuration 3302. FIG. 34 is a top view of the steam tray assembly 2700 of FIGS. 27-33, with the steam tray assembly 2700 shown arranged in the second steam tray configuration 3302 of FIG. 33. FIG. 35 is a cross-sectional view of the steam tray assembly 2700 of FIGS. 27-34 taken along section H-H of FIG. 34, with the steam tray assembly 2700 shown arranged in the second steam tray configuration 3302 of FIGS. 33 and 34. FIG. 36 is a cross-sectional view of the steam tray assembly 2700 of FIGS. 27-35 taken along section I-I of FIG. 34, with the steam tray assembly 2700 shown arranged in the second steam tray configuration 3302 of FIGS. 33-35. As shown in FIGS. 33-36, the steam tray assembly 2700 includes the water pan 1902 of FIGS. 19-24 and the steam tray 2502 of FIGS. 25 and 26, with the steam tray 2502 being positioned within (e.g., nested within) the water pan 1902 according to the second orientation (e.g., the "rim down" orientation) of the steam tray 2502 described above in connection with FIGS. 25 and 26.

As shown in FIGS. 33-36, the first surface 2520 of the support wall 2514 of the steam tray 2502 faces toward the interior surface of the bottom wall 1914 of the water pan 1902, the second surface 2522 of the support wall 2514 faces away from the interior surface of the bottom wall 1914 of the water pan 1902, and the rim 2526 of the steam tray 2502 is oriented in a direction (e.g., downwardly) opposite that of the upper rim 1920 of the water pan 1902 when the steam tray assembly 2700 is arranged in the second steam tray configuration 3302 (e.g., when the steam tray 2502 is positioned within (e.g., nested within) the water pan 1902 in the second orientation described above). As further shown in FIGS. 33-36, one or more portion(s) of the rim 2526 of the steam tray 2502 is/are seated on (e.g., in face-to-face contact with) the upper surface 1924 of one or more of the front portion 2002, the rear portion 2004, the right side portion 2006, and/or the left side portion 2008 of the step 1922 of the water pan 1902 when the steam tray assembly 2700 is arranged in the second steam tray configuration 3302 (e.g., when the steam tray 2502 is positioned within (e.g., nested within) the water pan 1902 in the second orientation described above).

Arranging the steam tray assembly 2700 in the second steam tray configuration 2302 shown in FIGS. 33-36 results in the support wall 2514 being spaced from the bottom wall 1914 of the water pan 1902 by an example second distance ("D2", as shown in FIGS. 35 and 36) that is greater than the first distance. In this regard, arranging the steam tray assembly 2700 in the second steam tray configuration 3302 shown in FIGS. 33-36 results in the support wall 2514 having a relatively higher vertical position within the water pan 1902, such that the support wall 2514 will be located relatively further away from the heating element 802 of the portable grill 100.

When the steam tray assembly 2700 is arranged in the second steam tray configuration 3302 shown in FIGS. 33-36, one or more item(s) of food can be placed directly on the second surface 2522 of the support wall 2514 of the steam tray 2502 to facilitate steaming the item(s) of food in response to the production of humidity and/or steam when the water pan 1902 is filled with fluid and heated by the heating element 802 of the portable grill 100. In some examples, the water pan 1902 is to be filled with fluid to a level exceeding the upper surface 1924 of the step 1922 of the water pan 1902 but not exceeding the upper rim 1920 of the water pan 1902 when the stream tray assembly 2700 is arranged in the second steam tray configuration 3302 shown in FIGS. 33-36. In other examples, the water pan 1902 is instead to be filled with fluid to a level not exceeding the upper surface 1924 of the step 1922 of the water pan 1902 when the stream tray assembly 2700 is arranged in the second steam tray configuration 3302 shown in FIGS. 33-36, thereby resulting in an increased distance between the support wall 2514 of the steam tray 2502 and the fluid contained in the water pan 1902.

Figure 37:
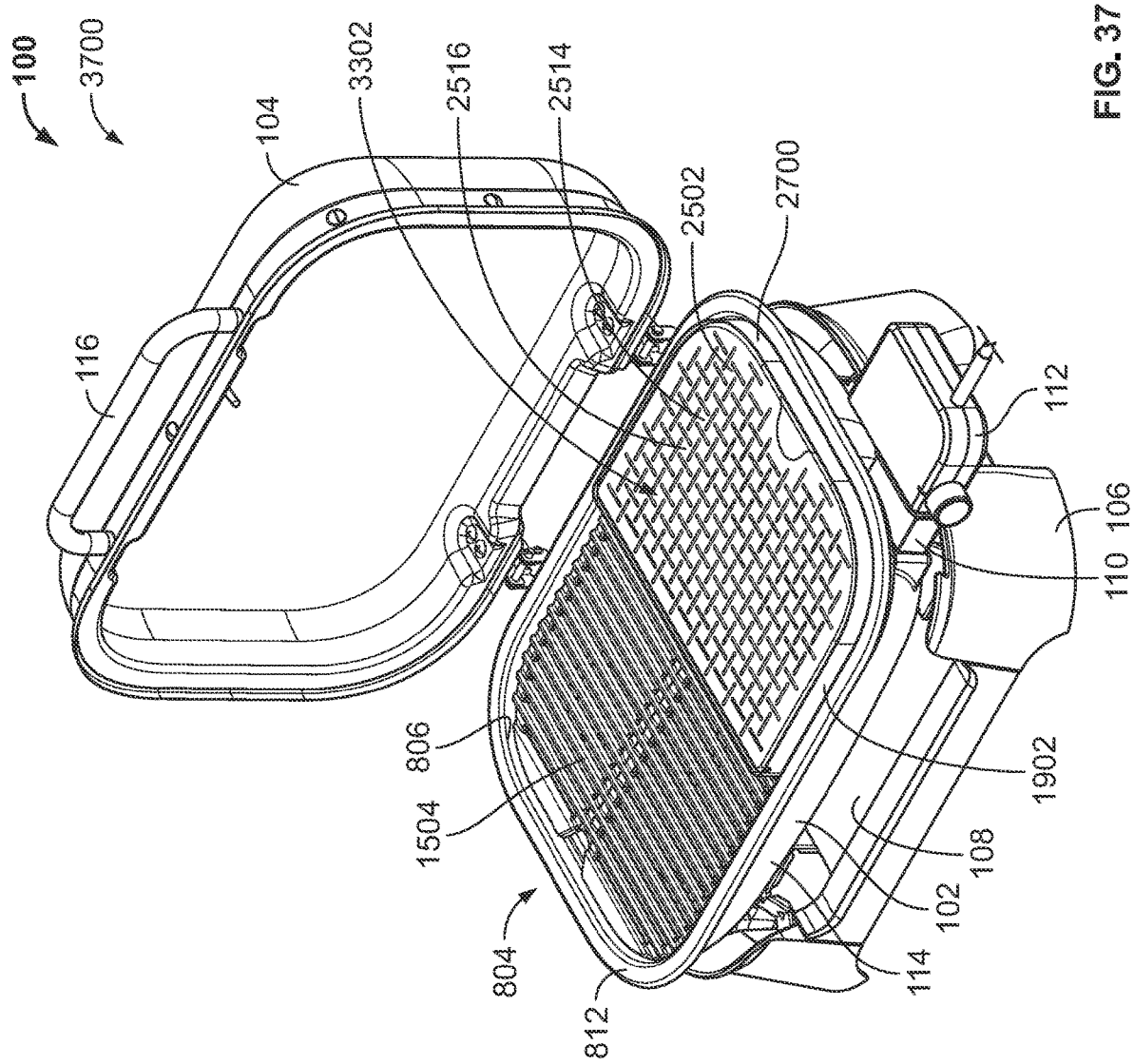
FIG. 37 is a perspective view of the portable grill of FIGS. 1-11, with the lid of the portable grill shown in the open position, and with the cookbox of the portable grill shown arranged in an example fifth cookbox configuration.

FIG. 37 is a perspective view of the portable grill of FIGS. 1-11, with the lid 104 of the portable grill 100 shown in the open position, and with the cookbox 102 of the portable grill 100 shown arranged in an example fifth cookbox configuration 3700. FIG. 38 is a cross-sectional view of the portable grill 100 of FIGS. 1-11 taken along section A-A of FIG. 6, with the lid 104 of the portable grill 100 shown in the closed position, and with the cookbox 102 of the portable grill 100 shown arranged in the fifth cookbox configuration 3700 of FIG. 37. When arranged in the fifth cookbox configuration 3700 shown in FIGS. 37 and 38, the cookbox 102 and/or the cooking chamber 804 of the portable grill 100 includes the steam tray 2502, the water pan 1902, and the second grilling grate 1504, all of which are located above the heating element 802 of the portable grill 100. In the illustrated example of FIGS. 37 and 38, the water pan 1902 and the second grilling grate 1504 are configured in a side-by-side arrangement within the cookbox 102, with the water pan 1902 and the second grilling grate 1504 collectively filling and/or occupying the substantial entirety of the horizontal plane 1002 of the cookbox 102 that is defined by the upper surface 816 of the step 814 formed along the interior wall 810 of the cookbox 102. The steam tray 2502 is positioned within (e.g., nested within) the water pan 1902 in an arrangement consistent with the second steam tray configuration 3302 of the steam tray assembly 2700 described above in connection with FIGS. 33-36.

The fifth cookbox configuration 3700 of FIGS. 37 and 38 differs from the third cookbox configuration 2300 of FIGS. 23 and 24 in that the cookbox 102 includes the steam tray 2502 (e.g., arranged in a second orientation relative to the water pan 1902) when arranged in the fifth cookbox configuration 3700, but does not include the steam tray 2502 when arranged in the third cookbox configuration 2300. The cookbox 102 can be transitioned from the third cookbox configuration 2300 of FIGS. 23 and 24 into the fifth cookbox configuration 3700 of FIGS. 37 and 38 by introducing the steam tray 2502 into the cookbox 102, and by thereafter lowering (e.g., manually lowering, by a user of the portable grill 100) the steam tray 2502 into its seated position on the upper surface 1924 of the step 1922 of the water pan 1902 according to the second orientation of the steam tray 2502 and/or the second steam tray configuration 3302 of the steam tray assembly 2700 described above.

In the illustrated example of FIGS. 37 and 38, the first surface 2520 of the support wall 2514 of the steam tray 2502 faces toward the interior surface of the bottom wall 1914 of the water pan 1902, the second surface 2522 of the steam tray 2502 faces away from the interior surface of the bottom wall 1914 of the water pan 1902, and the rim 2526 of the steam tray 2502 is oriented in a direction (e.g., downwardly) opposite that of the upper rim 1920 of the water pan 1902. As further shown in FIGS. 37 and 38, one or more portion(s) of the rim 2526 of the steam tray 2502 is/are seated on (e.g., in face-to-face contact with) the upper surface 1924 of one or more of the front portion 2002, the rear portion 2004, the right side portion 2006, and/or the left side portion 2008 of the step 1922 of the water pan 1902. Arranging the steam tray assembly 2700 in the second steam tray configuration 3302 shown in FIGS. 37 and 38 results in the support wall 2514 having a relatively higher vertical position within the water pan 1902, such that the support wall 2514 is located relatively further away from the heating element 802 of the portable grill 100.

From the foregoing, it will be appreciated that portable grills having reversible steam tray assemblies are disclosed herein. In some disclosed examples, a portable grill comprises a cookbox, a heating element, a water pan, and a steam tray. In some disclosed examples, the heating element is located within the cookbox. In some disclosed examples, the water pan is located within the cookbox above the heating element. In some disclosed examples, the water pan has a bottom wall. In some disclosed examples, the steam tray is located within the water pan. In some disclosed examples, the steam tray includes a horizontally-oriented support wall having a plurality of openings extending therethrough. In some disclosed examples, the steam tray is configured to be reversibly positioned within the water pan in a first orientation and a second orientation. In some disclosed examples, the support wall is to be spaced from the bottom wall by a first distance when the steam tray is positioned in the first orientation. In some disclosed examples, the support wall is to be spaced from the bottom wall by a second distance greater than the first distance when the steam tray is positioned in the second orientation.

In some disclosed examples, the water pan further includes an upper rim located above the bottom wall.

In some disclosed examples, the upper rim of the water pan is defined by a front wall, a rear wall, a right sidewall, and a left sidewall of the water pan.

In some disclosed examples, the water pan further includes a first step located between the bottom wall and the upper rim of the water pan. In some disclosed examples, the first step has an upper surface located along an interior surface of the water pan and a lower surface located along an exterior surface of the water pan.

In some disclosed examples, the cookbox includes an interior wall having a second step. In some disclosed examples, the second step has an upper surface. In some disclosed examples, the water pan is configured to be seated on the second step.

In some disclosed examples, the cookbox further includes an upper rim. In some disclosed examples, the second step is located below the upper rim of the cookbox and above the heating element.

In some disclosed examples, the lower surface of the first step contacts the upper surface of the second step when the water pan is seated on the second step.

In some disclosed examples, the steam tray further includes a rim.

In some disclosed examples, the rim of the steam tray is defined by a front wall, a rear wall, a right sidewall, and a left sidewall of the steam tray.

In some disclosed examples, the support wall of the steam tray has a first surface and a second surface located opposite the first surface. In some disclosed examples, the first surface is defined by a portion of an interior surface of the steam tray. In some disclosed examples, the second surface is defined by a portion of an exterior surface of the steam tray.

In some disclosed examples, the first surface of the support wall of the steam tray faces away from the bottom wall of the water pan, the second surface of the support wall of the steam tray faces toward the bottom wall of the water pan, and the rim of the steam tray is oriented in a same direction as the upper rim of the water pan when the steam tray is positioned in the first orientation.

In some disclosed examples, a peripheral portion of the second surface of the support wall of the steam tray is seated on the upper surface of the first step of the water pan when the steam tray is positioned in the first orientation.

In some disclosed examples, the first surface of the support wall of the steam tray faces toward the bottom wall of the water pan, the second surface of the support wall of the steam tray faces away from the bottom wall of the water pan, and the rim of the steam tray is oriented in a direction opposite that of the upper rim of the water pan when the steam tray is positioned in the second orientation.

In some disclosed examples, a portion of the rim of the steam tray is seated on the upper surface of the first step of the water pan when the steam tray is positioned in the second orientation.

In some disclosed examples, the portable grill further comprises a grilling grate located within the cookbox above the heating element. In some disclosed examples, the grilling grate and the water pan are arranged side-by-side within the cookbox along a horizontal plane defined by an upper surface of a step formed along an interior wall of the cookbox.

In some disclosed, a portable grill comprises a cookbox, a heating element, a grilling grate, a water pan, and a steam tray. In some disclosed examples, the cookbox includes an interior wall having a first step. In some disclosed examples, the first step includes an upper surface. In some disclosed examples, the heating element is located within the cookbox below the first step. In some disclosed examples, the grilling grate is located within the cookbox above the heating element. In some disclosed examples, the grilling grate includes a lower surface seated on the upper surface of the first step. In some disclosed examples, the water pan is located within the cookbox above the heating element. In some disclosed examples, the water pan and the grilling grate are arranged side-by-side within the cookbox along a horizontal plane defined by the upper surface of the first step. In some disclosed examples, the water pan includes a bottom wall, an upper rim, and a second step located between the bottom wall and the upper rim. In some disclosed examples, the second step includes an upper surface and a lower surface. In some disclosed examples, the lower surface of the second step is seated on the upper surface of the first step. In some disclosed examples, the steam tray is located within the water pan. In some disclosed examples, the steam tray includes a horizontally-oriented support wall having a first surface, a second surface located opposite the first surface, and a plurality of openings extending from the first surface through to the second surface. In some disclosed examples, the first surface is defined by a portion of an interior surface of the steam tray. In some disclosed examples, the second surface is defined by a portion of an exterior surface of the steam tray. In some disclosed examples, the steam tray is configured to be reversibly positioned within the water pan in a first orientation and a second orientation. In some disclosed examples, the support wall is to be spaced from the bottom wall by a first distance when the steam tray is positioned in the first orientation. In some disclosed examples, the support wall is to be spaced from the bottom wall by a second distance greater than the first distance when the steam tray is positioned in the second orientation.

In some disclosed examples, the first surface of the support wall of the steam tray faces away from the bottom wall of the water pan, the second surface of the support wall of the steam tray faces toward the bottom wall of the water pan, and a rim of the steam tray is oriented in a same direction as the upper rim of the water pan when the steam tray is positioned in the first orientation.

In some disclosed examples, a peripheral portion of the second surface of the support wall of the steam tray is seated on the upper surface of the first step of the water pan when the steam tray is positioned in the first orientation.

In some disclosed examples, the first surface of the support wall of the steam tray faces toward the bottom wall of the water pan, the second surface of the support wall of the steam tray faces away from the bottom wall of the water pan, and a rim of the steam tray is oriented in a direction opposite that of the upper rim of the water pan when the steam tray is positioned in the second orientation.

In some disclosed examples, a portion of the rim of the steam tray is seated on the upper surface of the first step of the water pan when the steam tray is positioned in the second orientation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A portable grill, comprising:
a cookbox including an upper rim and an interior wall, the interior wall including a bottom portion having a lower waste disposal opening extending therethrough, the interior wall further including a first step located above the bottom portion of the interior wall of the cookbox and below the upper rim of the cookbox, the first step including an upper surface;
an electric heating element located within the cookbox below the first step;
a grilling grate located within the cookbox above the electric heating element, the grilling grate including a lower surface, the lower surface of the grilling grate seated on the upper surface of the first step;
a water pan located within the cookbox above the electric heating element, the water pan and the grilling grate being arranged side-by-side within the cookbox along a horizontal plane defined by the upper surface of the first step, the water pan being separate from the grilling grate such that the water pan and the grilling grate are independently removable from the cookbox, the water pan including a bottom wall, an upper rim, and a second step, the second step located above the bottom wall of the water pan and below the upper rim of the water pan, the second step including an upper surface located along an interior surface of the water pan and a lower surface located along an exterior surface of the water pan, the lower surface of the second step seated on the upper surface of the first step; and
a steam tray located within the water pan, the steam tray including a horizontally-oriented support wall having a first surface, a second surface located opposite the first surface, and a plurality of openings extending from the first surface through to the second surface, the first surface defined by a portion of an interior surface of the steam tray, the second surface defined by a portion of an exterior surface of the steam tray, the steam tray further including a plurality of sidewalls extending away from and angled relative to the support wall of the steam tray, respective ones of the plurality of sidewalls terminating in and defining a rim of the steam tray, the steam tray configured to be reversibly positioned within the water pan in a first orientation and a second orientation, wherein the support wall of the steam tray is spaced from the bottom wall of the water pan by a first distance, the first surface of the support wall of the steam tray faces away from the bottom wall of the water pan, the second surface of the support wall of the steam tray faces toward the bottom wall of the water pan, the rim of the steam tray is oriented in a same direction as the upper rim of the water pan, and a peripheral portion of the second surface of the support wall of the steam tray is seated on the upper surface of the second step of the water pan when the steam tray is positioned in the first orientation, and wherein the support wall of the steam tray is spaced from the bottom wall of the water pan by a second distance greater than the first distance, the first surface of the support wall of the steam tray faces toward the bottom wall of the water pan, the second surface of the support wall of the steam tray faces away from the bottom wall of the water pan, the rim of the steam tray is oriented in a direction opposite that of the upper rim of the water pan, and a portion of the rim of the steam tray is seated on the upper surface of the second step of the water pan when the steam tray is positioned in the second orientation.

2. The portable grill of claim 1, wherein the upper rim of the water pan is defined by a front wall, a rear wall, a right sidewall, and a left sidewall of the water pan.

3. The portable grill of claim 1, wherein the rim of the steam tray is defined by a front wall, a rear wall, a right sidewall, and a left sidewall of the steam tray.

4. A portable grill, comprising:
a cookbox including an upper rim and an interior wall, the interior wall including a bottom portion having a lower waste disposal opening extending therethrough, the interior wall further including a first step located above the bottom portion of the interior wall of the cookbox and below the upper rim of the cookbox, the first step including an upper surface;
an electric heating element located within the cookbox below the first step;
a grilling grate located within the cookbox above the electric heating element, the grilling grate including a lower surface, the lower surface of the grilling grate seated on the upper surface of the first step;
a water pan located within the cookbox above the electric heating element, the water pan and the grilling grate being arranged side-by-side within the cookbox along a horizontal plane defined by the upper surface of the first step, the water pan being separate from the grilling grate such that the water pan and the grilling grate are independently removable from the cookbox, the water pan including a bottom wall, an upper rim, and a second step located above the bottom wall of the water pan and below the upper rim of the water pan, the second step including an upper surface and a lower surface, the lower surface of the second step seated on the upper surface of the first step; and
a steam tray located within the water pan, the steam tray including a horizontally-oriented support wall having a first surface, a second surface located opposite the first surface, and a plurality of openings extending from the first surface through to the second surface, the first surface defined by a portion of an interior surface of the steam tray, the second surface defined by a portion of an exterior surface of the steam tray, the steam tray configured to be reversibly positioned within the water pan in a first orientation and a second orientation, wherein the support wall of the steam tray is spaced from the bottom wall of the water pan by a first distance when the steam tray is positioned in the first orientation, and wherein the support wall of the steam tray is spaced from the bottom wall of the water pan by a second distance greater than the first distance when the steam tray is positioned in the second orientation.

5. The portable grill of claim 4, wherein the first surface of the support wall of the steam tray faces away from the bottom wall of the water pan, the second surface of the support wall of the steam tray faces toward the bottom wall of the water pan, and a rim of the steam tray is oriented in a same direction as the upper rim of the water pan when the steam tray is positioned in the first orientation.

6. The portable grill of claim 5, wherein a peripheral portion of the second surface of the support wall of the steam tray is seated on the upper surface of the second step of the water pan when the steam tray is positioned in the first orientation.

7. The portable grill of claim 4, wherein the first surface of the support wall of the steam tray faces toward the bottom wall of the water pan, the second surface of the support wall of the steam tray faces away from the bottom wall of the water pan, and a rim of the steam tray is oriented in a direction opposite that of the upper rim of the water pan when the steam tray is positioned in the second orientation.

8. The portable grill of claim 7, wherein a portion of the rim of the steam tray is seated on the upper surface of the second step of the water pan when the steam tray is positioned in the second orientation.

9. The portable grill of claim 1, wherein the support wall of the steam tray includes a cutout configured to facilitate transitioning the steam tray between the first orientation and the second orientation.

10. The portable grill of claim 1, wherein the cookbox is double-walled, the cookbox including an exterior wall spaced apart from the interior wall of the cookbox by one or more gaps.

11. The portable grill of claim 1, further including a power supply configured to electrically power the electric heating element, the power supply removably coupled to a power supply receptacle of the portable grill, the power supply receptable coupled to the cookbox.

12. The portable grill of claim 11, wherein the power supply includes a control probe extending through the power supply receptacle into a cooking chamber of the cookbox at a location proximate the electric heating element.

13. The portable grill of claim 4, wherein the support wall of the steam tray includes a cutout configured to facilitate transitioning the steam tray between the first orientation and the second orientation.

14. The portable grill of claim 4, wherein the steam tray further includes a plurality of vertically-oriented sidewalls extending away from and transversely angled relative to the horizontally-oriented support wall of the steam tray, wherein respective ones of the plurality of vertically-oriented sidewalls terminate in and define a rim of the steam tray.

15. The portable grill of claim 4, wherein the cookbox is double-walled, the cookbox including an exterior wall spaced apart from the interior wall of the cookbox by one or more gaps.

16. The portable grill of claim 4, further including a power supply configured to electrically power the electric heating element, the power supply removably coupled to a power supply receptacle of the portable grill, the power supply receptable coupled to the cookbox.

17. The portable grill of claim 16, wherein the power supply includes a control probe extending through the power supply receptacle into a cooking chamber of the cookbox at a location proximate the electric heating element.

18. The portable grill of claim 1, further comprising a waste management assembly including a waste bin located below the lower waste disposal opening, wherein the portable grill is configured to allow waste to pass from within the cookbox downwardly through the lower waste disposal opening into the waste bin.

19. The portable grill of claim 1, wherein the plurality of sidewalls of the steam tray includes a plurality of vertically-oriented sidewalls extending away from and transversely angled relative to the horizontally-oriented support wall of the steam tray, wherein respective ones of the plurality of vertically-oriented sidewalls of the steam tray terminate in and define the rim of the steam tray.

20. The portable grill of claim 19, wherein the bottom wall of the water pan is horizontally oriented, wherein the water pan further includes a plurality of vertically-oriented sidewalls extending upwardly from the second step of the water pan and transversely angled relative to the horizontally-oriented bottom wall of the water pan, wherein respective ones of the plurality of vertically-oriented sidewalls of the water pan terminate in and define the upper rim of the water pan.

* * * * *